US012655030B2

(12) United States Patent
 Papouchado et al.

(10) Patent No.: US 12,655,030 B2
(45) Date of Patent: Jun. 16, 2026

(54) SYSTEMS AND METHODS TO TREAT FLUE GAS DESULFURIZATION AND METAL-BEARING WASTE STREAMS TO RECOVER VALUE-ADDED MATERIALS

(71) Applicant: Davy Powersports Inc., Bainbridge Island, WA (US)

(72) Inventors: Lucien M. Papouchado, Aiken, SC (US); Barry E. Scheetz, Lemont, PA (US); Joseph D. Preston, Bainbridge Island, WA (US)

(73) Assignee: Davy Powersports Inc., Bainbridge Island, WA (US)

( * ) Notice: Subject to any disclaimer, the term of this patent is extended or adjusted under 35 U.S.C. 154(b) by 1292 days.

(21) Appl. No.: 17/382,054

(22) Filed: Jul. 21, 2021

(65) Prior Publication Data

US 2021/0347648 A1    Nov. 11, 2021

Related U.S. Application Data

(63) Continuation of application No. PCT/US2020/015102, filed on Jan. 24, 2020, which
(Continued)

(51) Int. Cl.
 *C01C 1/244* (2006.01)
 *C01F 11/18* (2006.01)
(52) U.S. Cl.
 CPC ............ *C01C 1/244* (2013.01); *C01F 11/182* (2013.01); *C01P 2004/50* (2013.01)
(58) Field of Classification Search
 CPC ............................... C01C 1/244; C01F 11/182
 See application file for complete search history.

(56) References Cited

U.S. PATENT DOCUMENTS 8,758,719 B2    6/2014    Hasinoff et al.
9,193,601 B2    11/2015   Ghosh et al.
(Continued)

FOREIGN PATENT DOCUMENTS

CN      105671304 A      6/2016
CN      105087934 B      5/2018
(Continued)

OTHER PUBLICATIONS

Weibel, Gisela. Optimized metal recovery from fly ash from municipal solid waste incineration. Diss. Philosophisch-naturwissenschaftliche FakultÃ¤t UniversitÃ¤t Bern, 2017 (Year: 2017).*
(Continued)

*Primary Examiner* — Anthony J Zimmer
*Assistant Examiner* — Eric Scott Sherman
(74) *Attorney, Agent, or Firm* — Polsinelli PC

(57)    ABSTRACT

Disclosed herein are systems and methods from processing flue gas desulfurization (FGD) gypsum feedstock and ash feedstocks, either separately or together. FGD gypsum conversion comprises reacting FGD gypsum (e.g. calcium sulfate) feedstock, in either batch or continuous mode, with ammonium carbonate reagent to produce commercial products wherein the commercial products comprise ammonium sulfate and calcium carbonate. Ash conversion comprises a leach process followed by a precipitation process to selectively precipitate components at predetermined pHs resulting in metal hydroxides which may be optionally converted to oxides or carbonates. The processes may be controlled by use of one or more processors.

11 Claims, 50 Drawing Sheets

Related U.S. Application Data is a continuation of application No. 16/752,477, filed on Jan. 24, 2020, now Pat. No. 11,066,723, and a continuation of application No. 16/749,860, filed on Jan. 22, 2020, now Pat. No. 11,148,956.

(60) Provisional application No. 62/878,542, filed on Jul. 25, 2019, provisional application No. 62/824,523, filed on Mar. 27, 2019, provisional application No. 62/810,066, filed on Feb. 25, 2019, provisional application No. 62/796,549, filed on Jan. 24, 2019, provisional application No. 62/796,541, filed on Jan. 24, 2019, provisional application No. 62/796,550, filed on Jan. 24, 2019.

(56) References Cited

U.S. PATENT DOCUMENTS

| | | | |
|---|---|---|---|
| 9,682,868 B2 | 6/2017 | Hasinoff et al. | |
| 10,399,862 B2 | 9/2019 | Paynter et al. | |
| 2014/0044619 A1* | 2/2014 | Hasinoff | C22B 26/20 |
| | | | 423/165 |
| 2015/0075328 A1* | 3/2015 | Boudreault | C01F 17/224 |
| | | | 75/743 |
| 2015/0211094 A1* | 7/2015 | Vaisanen | C01G 55/00 |
| | | | 423/21.1 |
| 2015/0328645 A1 | 11/2015 | Filippov et al. | |
| 2015/0344318 A1 | 12/2015 | Lee et al. | |
| 2016/0221834 A1 | 8/2016 | Hasinoff et al. | |
| 2018/0265948 A1 | 9/2018 | Laudal et al. | |
| 2019/0153562 A1 | 5/2019 | Wang et al. | |

FOREIGN PATENT DOCUMENTS

| | | |
|---|---|---|
| CN | 109231249 A | 1/2019 |
| WO | 2016/123301 A1 | 8/2016 |
| WO | 2018/011567 A1 | 1/2018 |

OTHER PUBLICATIONS

Mattila, Hannu-Petteri, et al. "CO2 Chemistry", Jan. 1, 2014, vol. 66, pp. 347-384.

Msila, Xolani et al. "Capture and storage of CO2 into waste phosphogypsum: the modified Merseburg process" Clean Techn Environ Policy (2016) 18:2709-2715.

Extended European Search Report in EP Application No. 20744889.5 dated Aug. 26, 2022, 8 pages.

"Ammonium Sulfate WFGD Technology—Overview for General Industry Information," Marsulex Environmental Technologies, Jul. 2007, 6 pages.

Chou M.I.M., et al., "Manufacture of Ammonium Sulfate Fertilizer for Gypsum-Rich Byproduct of Flue Gas Desulfurization—A Prefeasibility Cost Estimate," Dec. 12, 1996, pp. 580-586.

International Search Report and Written Opinion for International Application No. PCT/US2020/015102, mailed Apr. 20, 2020, 9 pages.

Wazne M., et al., "Production of Ammonium Sulfate Fertilizer from Waste Gypsum," Nov. 18, 2009, pp. 1-5.

Office Action for Canadian Application No. 3,127, 106, issued Nov. 21, 2023 (6 Pages).

Zeller, E. "Factors Influencing Precipitation of Calcium Carbonate" Bulletin of the American Association of Petroleum Geologists, Jan. 1956, vol. 40, No. 1, pp. 140-152.

Matilla, H. "Production of Precipitated Calcium Carbonate from Steel Converter Slag and Other Calcium-Containing Industrial Wastes and Residues" Advances in Inorganic Chemistry, 2014, vol. 66, pp. 347-384.

Request for Ex Parte Re-Examination of U.S. Pat. No. 11,479,472 filed Feb. 1, 2024, 35 pages.

Matilla, H. "Mineral Carbonation of Phosphogypsum Waste for Production of Useful Carbonate and Sulfate Salts" Frontiers in Energy Research, 2015, vol. 3, pp. 1-8.

Office Action in U.S. Appl. No. 90/019,396 mailed Sep. 5, 2024, 14 pages.

Order Granting Request for Ex Parte Reexamination in U.S. Pat. No. 11,479,472, mailed Feb. 23, 2024, 11 pages.

Request for Ex Parte Reexamination in U.S. Pat. No. 11,148,956 filed Jan. 18, 2024, 31 pages.

Order Granting Request for Ex Parte Reexamination in U.S. Pat. No. 11,148,956, mailed Feb. 23, 2024, 13 pages.

Office Action in U.S. Appl. No. 90/019,383 mailed Jun. 13, 2024, 14 pages.

Ex Parte Reexamination Certificate issued in U.S. Appl. No. 90/019,383, issued Sep. 25, 2024.

Notice of Intent to Issue Ex Parte Reexamination Certificate in U.S. Appl. No. 90/019,383, mailed Aug. 29, 2024.

Office Action in Canadian Application No. 3,127,106 dated Dec. 16, 2024, 4 pages.

* cited by examiner

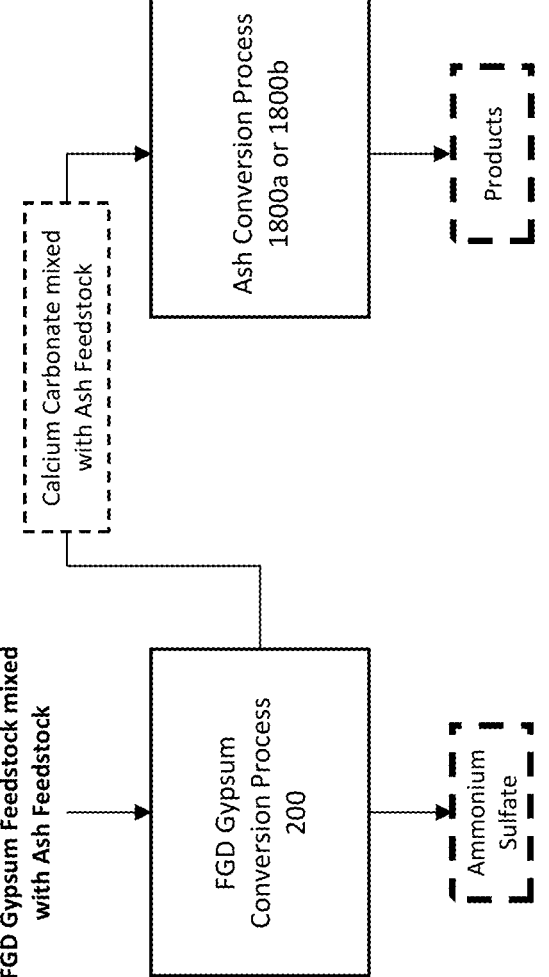
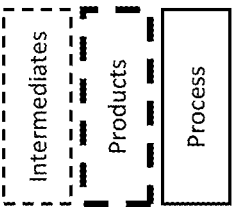
Fig. 1

FGD Gypsum Feedstock Composition

| Element | % | Element | g/t |
|---|---|---|---|
| Si | 0.25 | Ag | <2 |
| Al | 0.08 | As | <30 |
| Fe | 0.06 | Ba | 7.3 |
| Mg | 0.11 | Be | <0.03 |
| Ca | 23.3 | Bi | <20 |
| K | 0.02 | Cd | <2 |
| Ti | 0.01 | Co | <4 |
| P | <0.01 | Cu | <4 |
| Mn | <0.01 | Li | <70 |
| Cr | <0.01 | Mo | <5 |
| V | <0.01 | Na | 40 |
| LOI | 21.3 | Ni | <20 |
| S | 16.4 | Pb | <20 |
| C(t) | 0.16 | Sb | <30 |
| | | Se | <30 |
| | | Sn | <20 |
| | | Sr | 310 |
| | | Tl | <30 |
| | | U | <20 |
| | | Y | 0.7 |
| | | Zn | <7 |

Fig. 3

| Ammonium Sulfate Crystal Assay (g/t) | | | |
|---|---|---|---|
| Y | <0.2 | Cd | <2 |
| U | <20 | Co | <4 |
| Si | <700 | Cr | <4 |
| Al | 6 | Cu | <0.5 |
| Fe | 269 | Li | <5 |
| Mg | 16 | Mo | <5 |
| Ca | 489 | Ni | <20 |
| Na | <10 | Pb | <20 |
| K | <20 | Sb | <10 |
| Ti | 3.4 | Se | <30 |
| P | <30 | Sn | <20 |
| Mn | <0.3 | Sr | 13.2 |
| Ag | <2 | Tl | <30 |
| As | <30 | V | <2 |
| Ba | 4.6 | Zn | <8 |
| Be | <0.03 | C(t) | 0.09% |
| Bi | <20 | S(t) | 21.8% |
| Impurities > DL | | 0.17% | |

Fig. 6

Test Conditions

| Test ID | C3 | C5 | C6 | C7 | C9 | C10 | C11 | C12 | C13 | C14 | C15 |
|---|---|---|---|---|---|---|---|---|---|---|---|
| Feed | FGD | FGD | FGD | FGD | FGD | FGD | FGD | FGD | FGD | FGD | FGD |
| Initial % Solids | 25 | 25 | 25 | 100 | 50 | 25 | 25 | 25 | 100 | 25 | 100 |
| Final % Solids | 10 | 11 | 12 | 10 | 16 | 7 | 16 | 12 | 6 | 17 | 11 |
| Reagent | $(NH_4)_2CO_3$ | $(NH_4)_2CO_3$ | $(NH_4)_2CO_3$ | $(NH_4)_2CO_3$ | $(NH_4)_2CO_3$ | $(NH_4)_2CO_3$ | $(NH_4)_2CO_3$ | $(NH_4)_2CO_3$ | $(NH_4)_2CO_3$ | $(NH_4)_2CO_3$ | $(NH_4)_2CO_3$ |
| Reagent Strength (%) | 100 | 100 | 100 | 30 | 100 | 100 | 100 | 100 | 15 | 100 | 15 |
| Reagent Add'n Method | 130% per hour | 100% per hour | 100% per hour | 100% per hour | 100% per hour | 100% per hour | 100% at t=0 | 200% at t=0 | 100% per hour | 150% at t=0 | 200% at t=0 |
| Total Dose (% stoich.) | 390 | 300 | 300 | 300 | 300 | 300 | 100 | 200 | 300 | 150 | 200 |
| Retention Time (h) | 3 | 3 | 3 | 3 | 3 | 3 | 3 | 3 | 3 | 3 | 3 |
| Temperature (°C) | ambient | ambient | ambient | ambient | ambient | ambient | ambient | ambient | ambient | ambient | ambient |
| Seeding/Catalyst | none | none | none | none | none | none | none | none | none | none | none |
| Weight Loss (%) | 42 | 41 | 40 | 44 | 44 | 30 | 36 | 43 | 44 | 43 | 44 |
| Final Solids Colour | tan | lt. brown/grey | lt. brown/grey | lt. brown/grey | grey | v lt grey | grey | grey | grey | tan | tan |

Fig. 7

Calculated Final Product

| Test ID | Solution Grade (NH$_4$)$_2$SO$_4$ (%)[1] | CaCO$_3$ | Grade (%) |
| | | by Ca | by WRA[2] |
|---|---|---|---|
| C3 | 99.981 | 95 | 99 |
| C5 | 99.995 | 94 | 99 |
| C6 | 99.996 | 94 | 99 |
| C7 | 99.997 | 98 | 99 |
| C9 | 99.991 | 99 | 99 |
| C10 | 99.996 | 97 | 98 |
| C11 | 99.995 | 70 | 99 |
| C12 | 99.985 | 97 | 99 |
| C13 | 99.999 | 97 | 99 |
| C14 | 99.988 | 97 | 99 |
| C15 | 99.996 | 97 | 99 |
| C16 | 99.998 | 98 | 98 |
| C17 | 99.990 | 96 | 98 |
| C18 | 99.997 | 97 | 98 |
| C19 | 99.993 | 91 | 98 |
| C20 | 99.992 | 95 | 98 |
| C21 | 99.992 | 95 | 98 |
| C22 | 99.993 | 96 | 99 |

[1] Sum of elements in ICP scan above DL's, C(t) excluded

[2] Impurity Whole Rock Analysis oxide basis (100% - impurities

Fig. 8

Composition of Ammonium Sulfate Crystal Product

| Test # | Composition—Analytical | | | Composition—XRD | | | | | | |
|---|---|---|---|---|---|---|---|---|---|---|
| | Purity, % | Impurity, g/t | S% by Leco | $(NH_4)_2SO_4$ | $N_2O_5 \bullet (SO_3)_4$ | $(NH_4)_3H(SO_4)_2$ | $(NH_4)_{15}(NO_3)_3SO_4$ | N% by XRD | S% by XRD |
| PP2-Ev1 | 99.94 | 642 | 23.1 | 97.5 | 1.0 | 1.4 | - | 21.0 | 24.3 |
| PP2-Ev2 | 99.84 | 1557 | 23.5 | 98.8 | 1.2 | - | - | 21.0 | 24.3 |
| PP2-Ev3 | 99.90 | 986 | 23.3 | 96.8 | 1.0 | 0.7 | 1.5 | 21.2 | 24.1 |
| PP2-Ev4 | 99.95 | 534 | 23.1 | 98.0 | 0.9 | 0.5 | 0.6 | 21.1 | 24.2 |
| TEC-1 | 99.91 | 879 | 21.9 | 100.0 | - | - | - | 21.2 | 24.3 |
| TEC-2 | 99.98 | 233 | 22.5 | 100.0 | - | - | - | 21.2 | 24.3 |

Fig. 13

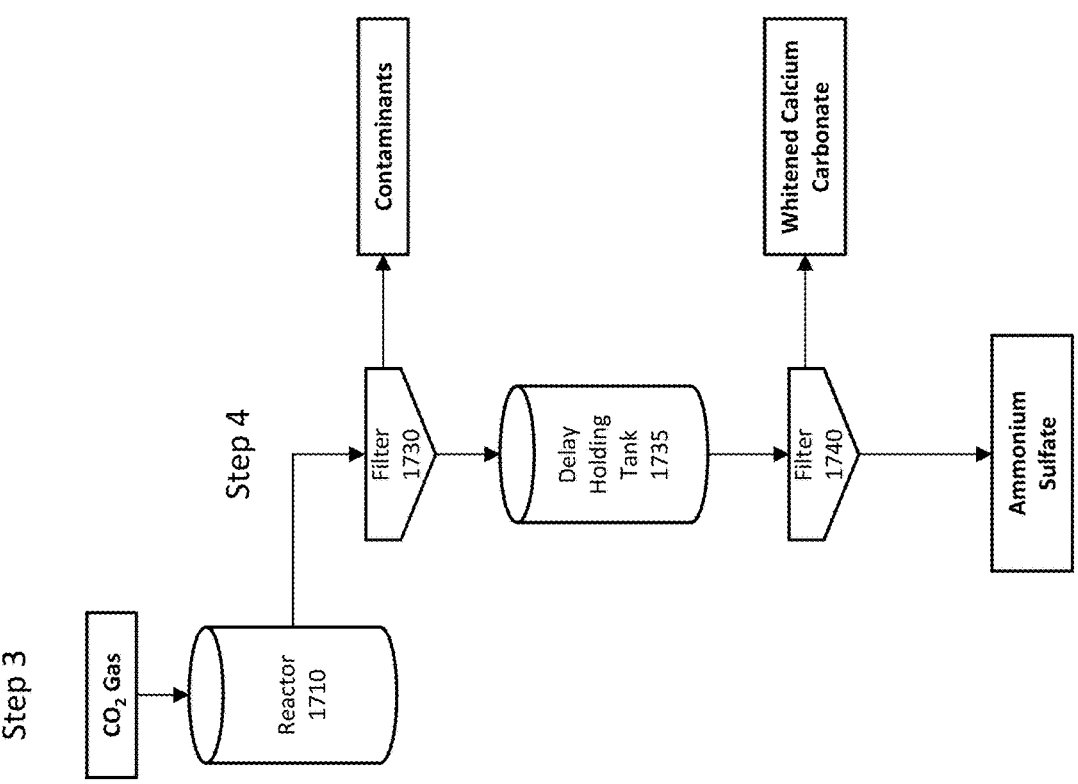
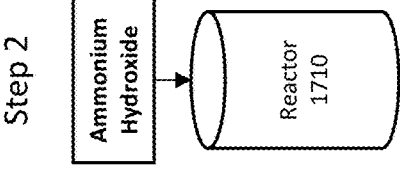
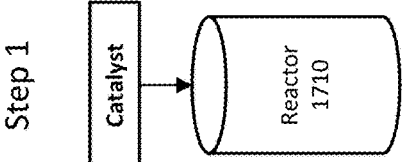
Fig. 17

| Ash Feedstock Bulk % Composition Major Earth Forming Oxides | | |
|---|---|---|
| Major Oxides | Class F | Class C |
| $SiO_2$ | 35.1 | 26.2 |
| $Al_2O_3$ | 18.1 | 16.4 |
| $Fe_2O_3$ | 16 | 8.15 |
| MgO | 1.1 | 6.28 |
| CaO | 13.3 | 25.7 |
| $Na_2O$ | 1.11 | 2.73 |
| $K_2O$ | 1.3 | 0.67 |

Fig. 22

Ash Feedstock Composition
Major, Minor, and Trace Metals

| Analyte (%) | Class F Ash | Class C Ash |
|---|---|---|
| SiO₂ | 35.1 | 26.2 |
| AL₂O₃ | 18.1 | 16.4 |
| Fe₂O₃ | 16 | 8.15 |
| MgO | 1.1 | 6.28 |
| CaO | 13.3 | 25.7 |
| Na₂O | 1.11 | 2.73 |
| K₂O | 1.31 | 0.67 |
| TiO₂ | 0.91 | 1.37 |
| P₂O₅ | 0.33 | 1.8 |
| MnO | 0.03 | 0.02 |
| Cr₂O₃ | 0.01 | 0.01 |
| V₂O₅ | 0.03 | 0.04 |
| LOI | 10 | 3.55 |
| Sum | 97.3 | 92.9 |
| C(t) | 4.74 | 2.49 |
| S | 1.59 | 2.09 |

| Analyte (g/t) | Class F Ash | Class C Ash |
|---|---|---|
| La | 47 | 65 |
| Ce | 98 | 124 |
| Pr | 11.9 | 13.5 |
| Nd | 45 | 56 |
| Sm | 10.2 | 11.6 |
| Eu | 1.9 | 2.9 |
| Gd | 9 | 10 |
| Tb | 1.6 | 1.5 |
| Dy | 7.5 | 9.1 |
| Ho | 1.6 | 1.8 |
| Y | 43.6 | 46 |
| Er | 4.2 | 5.6 |
| Tm | 0.7 | 0.9 |
| Yb | 5.7 | 4.7 |
| Lu | 1 | 0.7 |
| Sc | <25 | <25 |
| Th | 17.8 | 23.6 |
| U | 5.6 | 9.8 |

| Analyte (g/t) | Class F Ash | Class C Ash |
|---|---|---|
| Ag | <2 | <2 |
| As | <100 | <30 |
| Ba | 1370 | 7890 |
| Be | 6.97 | 4.25 |
| Bi | <20 | <20 |
| Cd | <2 | <4 |
| Co | 28 | 43 |
| Cu | 68.2 | - |
| Li | 74 | 8 |
| Mo | <9 | <30 |
| Ni | 61 | 109 |
| Pb | <60 | 102 |
| Sb | <10 | <10 |
| Se | <30 | <60 |
| Sn | <20 | <50 |
| Sr | 1750 | 3360 |
| Ti | <30 | <30 |
| Zn | 105 | 275 |

Fig. 23

Mineralogical Compositions of the Ash Feedstocks
Semi-quantitative XRD

| Formula | Mineral | Class F Ash (wt %) | Class C Ash (wt %) |
|---|---|---|---|
| $SiO_2$ | Quartz | 12.6 | 7.3 |
| $SiO_2$ | Tridymite | 5.7 | - |
| $Al_6Si_2O_{13}$ | Mullite | 18.5 | 11.4 |
| $NaAlSi_3O_8$ | Albite | 10.0 | 13.3 |
| $KAlSi_3O_8$ | Microcline | 8.1 | 2.9 |
| $(Al_2Si_2)_5(OH)_4$ | Kaolinite | - | 7.4 |
| $Fe_2O_3$ | Hematite | 6.2 | 2.5 |
| $FeCl_3$ | Iron Chloride | - | 8.2 |
| $\gamma\text{-}Fe_2O_3$ | Maghemite | 8.0 | - |
| $FeCO_3$ | Siderite | 3.4 | - |
| $FeTiO_3$ | Ilmenite | - | 2.1 |
| $CaSO_4$ | Anhydrite | 6.8 | 15.2 |
| $CaCO_3$ | Calcite | 3.2 | - |
| $Ca_5(PO_4)_3OH$ | Hydroxylapatite | - | 3.5 |
| $CaO$ | Calcium Oxide | - | 13.2 |
| $Ca(OH)_2$ | Portlandite | 10.5 | - |
| $CaO$ | Lime | - | 1.7 |
| $CaMg(CO_3)$ | Dolomite | 3.1 | - |
| $MgO$ | Periclase | - | 5.7 |
| $Ba(Sr)SO_4$ | Barite, Strontian | - | 1.6 |
| $C$ | Graphite | 3.0 | 2.4 |
| $TiO_2$ | Anatase | 0.9 | - |
| $NaCl$ | Halite | - | 1.7 |
| | TOTAL | 100 | 100 |

Fig. 24

Leaching Results (6 hrs)
3:1 6N HCl / 6N HNO$_3$ (14% Solids)

| Element | Class F<br>% Extract | Class C<br>% Extract |
|---|---|---|
| Si | 0 | 0 |
| Al | 67 | 92 |
| Fe | 88 | 93 |
| Mg | 86 | 94 |
| Ca | 95 | 89 |
| Na | 72 | 84 |
| K | 61 | 72 |
| Ti | 49 | 8 |
| P | 88 | 51 |
| Mn | 81 | 90 |
| TREE | 75 | 88 |
| C(t) | 1 | 2 |
| S(t) | 72 | 17 |

Fig. 25

Leaching Results (6 hrs)
6N H₂SO₄ + 0.006N NaF (14% Solids)

| Element | Class F % Extract | Class C % Extract |
|---------|-------------------|-------------------|
| Si      | 0                 | 1                 |
| Al      | 50                | 91                |
| Fe      | 52                | 89                |
| Mg      | 76                | 92                |
| Ca      | 3                 | 2                 |
| Na      | 58                | 79                |
| K       | 45                | 67                |
| Ti      | 37                | 81                |
| P       | 80                | 96                |
| Mn      | 68                | 83                |
| TREE    | 12                | 3                 |
| C(t)    | 1                 | 2                 |
| S(t)    | 88                | 75                |

Fig. 26

Leaching Results (6 hrs)
6N $H_2SO_4$ + 0.05% $CaF_2$ (14% Solids)

| Element | Class F % Extract | Class C % Extract |
|---|---|---|
| Si | 0 | 1 |
| Al | 56 | 87 |
| Fe | 56 | 85 |
| Mg | 79 | 89 |
| Ca | 2 | 2 |
| Na | 60 | 78 |
| K | 49 | 69 |
| Ti | 45 | 80 |
| P | 80 | 92 |
| Mn | 69 | 83 |
| TREE | 11 | 4 |
| C(t) | | |
| S(t) | 87 | 73 |

Fig. 27

Leaching Results
HCl 1.5 pH then 11% HCl
(4hr each stage)

| Element | Class F<br>% Extract | Class C<br>% Extract |
|---|---|---|
| Si | 0 | 0 |
| Al | 37 | 94 |
| Fe | 57 | 92 |
| Mg | 68 | 96 |
| Ca | 93 | 97 |
| Na | 42 | 87 |
| K | 4 | 83 |
| Ti | 27 | 6 |
| P | 81 | 54 |
| Mn | 83 | 90 |
| TREE | 49 | 78 |
| C(t) | 18 | 3 |
| S(t) | 93 | 91 |

Fig. 28

Leaching Results
HCl 1.5 pH then 30% HCl
(4hr each stage)

| Element | Class F<br>% Extract | Class C<br>% Extract |
|---|---|---|
| Si | 5 | 0 |
| Al | 55 | 92 |
| Fe | 88 | 93 |
| Mg | 81 | 94 |
| Ca | 94 | 94 |
| Na | 60 | 83 |
| K | 53 | 75 |
| Ti | 43 | 35 |
| P | 90 | 67 |
| Mn | 77 | 90 |
| TREE | 66 | 85 |
| C(t) | 1 | 5 |
| S(t) | 33 | 66 |

Fig. 29

| Leaching Results 30% HCl 24hrs | |
| --- | --- |
| Element | Class C % Extract |
| Si | 0 |
| Al | 95 |
| Fe | 98 |
| Mg | 98 |
| Ca | 97 |
| Na | 86 |
| K | 79 |
| Ti | 47 |
| P | 73 |
| Mn | 99 |
| TREE | 91 |
| C(t) | 7 |
| S(t) | 83 |

Fig. 30

| Composition | Class C Residue (wt %) | Class F Residue (wt %) |
|---|---|---|
| $NaAlSi_3O_8$ | 7.2 | 16.7 |
| $BaSO_4$ | - | 6.5 |
| $TiO_2$ | 0.9 | - |
| $CaCO_3$ | 1.5 | - |
| $CaMg(CO_3)$ | 2.5 | - |
| C | 8.1 | 5.9 |
| $Fe_2O_3$ | 7.3 | 3.1 |
| $Ca_5(PO_4)_3OH$ | - | 9.8 |
| $FeTiO_3$ | - | 2.7 |
| $Fe_3O_4$ | 4.0 | - |
| $\sim Al_6Si_3O_{15}$ | 25.4 | 1.0 |
| $KAlSi_3O_8$ | 7.2 | 4.9 |
| $SiO_2$ | 35.7 | 49.6 |
| | 100 | 100 |

Fig. 34

% Composition of Precipitate Hydroxides at Different pHs

| pH 3 | | pH 4 | | pH 5-8 | | pH 9 | | pH 10 | | pH 11 | | pH 13 | |
|---|---|---|---|---|---|---|---|---|---|---|---|---|---|
| Fe | 87.500 | Al | 88.53 | Al | 56.36 | Mn | 71.8 | Mg | 75.4 | Mg | 100 | Ca | 100 |
| Al | 6.700 | Fe | 4.01 | Mg | 11.05 | Ni | 14.1 | Ca | 24.6 | | | | |
| pH 3 | 4.800 | Na | 3.57 | Ce | 7.22 | La | 8.7 | | | | | | |
| Ti | 0.379 | Mg | 1.83 | Zn | 6.08 | Zn | 5.4 | | | | | | |
| V | 0.372 | Ca | 1.27 | Nd | 3.59 | | | | | | | | |
| Cr | 0.120 | P | 0.40 | Pb | 3.32 | | | | | | | | |
| Mo | 0.065 | Zn | 0.20 | Y | 3.07 | | | | | | | | |
| Sc | 0.023 | K | 0.07 | Mn | 2.98 | | | | | | | | |
| Th | 0.007 | Ni | 0.06 | La | 1.85 | | | | | | | | |
| U | 0.007 | V | 0.02 | Pr | 0.87 | | | | | | | | |
| | | Sr | 0.02 | Ni | 0.77 | | | | | | | | |
| | | Y | 0.02 | Sm | 0.64 | | | | | | | | |
| | | Li | 0.02 | Gd | 0.60 | | | | | | | | |
| | | U | 0.01 | Dy | 0.46 | | | | | | | | |
| | | Ce | 0.01 | Cu | 0.33 | | | | | | | | |
| | | Nd | 0.01 | Er | 0.22 | | | | | | | | |
| | | Co | 0.01 | Yb | 0.18 | | | | | | | | |
| | | Cr | 0.01 | Eu | 0.14 | | | | | | | | |
| | | Mo | 0.01 | Fe | 0.11 | | | | | | | | |
| | | | | Ho | 0.09 | | | | | | | | |
| | | | | Tb | 0.06 | | | | | | | | |
| | | | | Ag | 0.01 | | | | | | | | |

Fig. 38

% Elements Precipitated at pH 4

Fig. 40

% Elements Precipitated at pHs 5-8

Al removed to better see the smaller %

Fig. 42

Final Product Stream Composition

| Cations | mg/L | Anions |
|---------|------|--------|
| Al | 0.3 | Chloride |
| Cations | 66.7 | |
| Na | 53,000 | |
| K | 363 | |
| Ba | 2.23 | |
| Sr | 151 | |

Fig. 46

| Test # | P19 | | P21 | | P22 | | P23 | | P32 | |
|---|---|---|---|---|---|---|---|---|---|---|
| PPt weight | 17g | | 50g | | 5g | | 8g | | | |
| pH & % | 2.5 | % | 4 | % | 9 | % | 11 | % | Na₂CO₃ | % |
| Al | 1.28 | 3.45 | 19.0 | 72.5 | 6.54 | 17.68 | 0.15 | 0.37 | 0.0 | 0.03 |
| Fe | 32.5 | 87.58 | 0.50 | 1.9 | 2.51 | 6.79 | 0.06 | 0.15 | 0.0 | 0.02 |
| Mg | 1.04 | 2.80 | 0.65 | 2.5 | 25.10 | 67.86 | 37.1 | 91.83 | 0.0 | 0.02 |
| Ca | 0.44 | 1.18 | 5.52 | 21.1 | 1.30 | 3.51 | 2.91 | 7.20 | 38.5 | 99.03 |
| Na | 0.04 | 0.11 | 0.33 | 1.3 | 0.08 | 0.23 | 0.08 | 0.19 | 0.3 | 0.74 |
| K | 0.03 | 0.08 | 0.09 | 0.3 | 0.01 | 0.03 | 0.02 | 0.05 | 0.0 | 0.03 |
| P | 1.74 | 4.69 | <0.04 | 0.2 | 0.02 | 0.06 | 0.01 | 0.03 | 0.0 | 0.03 |
| Mn | 0.01 | 0.02 | 0.003 | 0.0 | 0.37 | 1.00 | 0.005 | 0.01 | 0.0 | 0.03 |
| TREE | 0.02 | | 0.03 | | 0.53 | 1.43 | 0.02 | 0.05 | | |
| La-Sm | 0.01 | | 0.03 | | 0.41 | | 0.02 | | | |
| Eu-Lu,Y | 0.00 | | 0.01 | | 0.12 | | 0.00 | | | |
| TOTALS | 37.11 | | 26.2 | | 36.99 | | 40.37 | | 38.9 | |

Fig. 48

SYSTEMS AND METHODS TO TREAT FLUE GAS DESULFURIZATION AND METAL-BEARING WASTE STREAMS TO RECOVER VALUE-ADDED MATERIALS

RELATED APPLICATIONS

The present application is a continuation of PCT Patent App. No. PCT/US2020/015102, entitled Systems and Methods to Treat Flue Gas Desulfurization and Metal-bearing Waste Streams to Recover Value-added Material, filed Jan. 24, 2020, which claims priority to U.S. patent application Ser. No. 16/752,477, entitled Systems and Methods to Chemically Treat Metal-Bearing Waste Streams to Recover Value-Added Materials, filed Jan. 24, 2020, U.S. patent application Ser. No. 16/749,860 entitled Systems and Methods to Treat Flue Gas Desulfurization Waste to Produce High Purity Ammonium Sulfate and Calcium Carbonate Products, filed Jan. 22, 2020, U.S. Patent App. No. 62/878,542, entitled Systems and Methods for Pretreatment of Feedstocks Comprising Sulfites, filed Jul. 25, 2019, U.S. Patent App. No. 62/824,523, entitled Reducing the Cost of Reagents for Treating Metal Bearing Wastes, filed Mar. 27, 2019, U.S. Patent App. No. 62/810,066, entitled Removal of Chloride from Flue Gas Desulfurization Feed, filed Feb. 25, 2019, U.S. Patent App. No. 62/796,541, entitled Systems and Methods to Treat Flue Gas Desulfurization (FGD) Waste to Produce High Purity Ammonium Sulfate and Calcium Carbonate Products, filed Jan. 24, 2019, U.S. Patent App. No. 62/796,549, entitled Systems and Methods to Chemically Treat Metal-bearing Waste Streams to Recover Value-added Materials, filed Jan. 24, 2019, and U.S. Patent App. No. 62/796,550, entitled Systems and Methods to Chemically Treat Metal-bearing Waste Streams to Recover Value-added Materials, filed Jan. 24, 2019, all of which are incorporated herein by reference in their entirety.

COPYRIGHT NOTICE

TECHNICAL FIELD

This disclosure relates generally to chemical processing of Coal Combustion Products (CCP) to produce value-added, marketable products while simultaneously minimizing or eliminating a resultant waste stream.

BACKGROUND

Coal combustion products (CCP) comprise fly ash (fine particulates collected in electrostatic precipitators), a lime or limestone absorption spray tower to separate out sulfur oxide ($SO_x$) gases, and bottom ash remaining behind after coal combustion. The lime or limestone in the absorption bed reacts with the $SO_x$ gases resulting in calcium sulfite (hannabeckite, $CaSO_3 \cdot 0.5H_2O$). The calcium sulfite is often oxidized to calcium sulfate, which is referred to as flue gas desulfurization (FGD) gypsum. In some coal plants, the calcium sulfite/sulfate byproduct is separate from the other byproducts while in others it is mixed in with the ash.

Currently, the primary applications of the calcium sulfate ($CaSO_4$) or FGD gypsum are in the wallboard industry and as a soil amendment. The fly ash commonly goes into the construction industry as a cement additive. However, significant portions of the FGD gypsum and ashes are not marketable, are stored in piles and ponds, and present a plethora of environmental issues.

Many efforts have focused on tackling specific parts of CCPs such as efforts to convert calcium sulfate to ammonium sulfate fertilizer and calcium carbonate filler. Others have attempted to extract specific elements out of the CCPs, such as aluminum or rare earth elements, discarding the remainder. To date there has not been a successful effort to treat the entire inventory and convert it to value-added, marketable products with minimal or no waste. That is the focus of this disclosure.

SUMMARY

Disclosed herein are systems and methods from processing flue gas desulfurization (FGD) gypsum feedstock and ash feedstocks, either separately or together. FGD gypsum conversion comprises reacting FGD gypsum (e.g. calcium sulfate) feedstock, in either batch or continuous mode, with ammonium carbonate reagent to produce commercial products wherein the commercial products comprise ammonium sulfate and calcium carbonate. Ash conversion comprises a leach process followed by a precipitation process to selectively precipitate components at predetermined pHs resulting in metal hydroxides which may be optionally converted to oxides or carbonates. The processes may be controlled by use of one or more processors.

In one aspect, a method for processing a waste stream includes configuring a processor to operate a process comprising loading a first powder feedstock into a first reactor, wherein the first powder feedstock comprises a calcium sulfate component, and introducing an ammonium carbonate reagent to the first reactor to produce ammonium sulfate and calcium carbonate in a reaction slurry. The process further comprises pumping the reaction slurry to a second reactor when a reaction to produce ammonium sulfate and calcium carbonate is complete thereby forming a reacted slurry, filtering the reacted slurry resulting in a calcium carbonate residue and ammonium sulfate filtrate liquor, loading a second powder feedstock into a third reactor, wherein the second powder feedstock comprises a metal-bearing component, a silica component, and an aluminosilicate component, and leaching the second powder feedstock by at least one of contacting, passing, and percolating an acid through the second powder feedstock and collecting a metal-bearing leachate formed in the third reactor, wherein after collecting the metal bearing leachate, the third reactor comprises dried solids comprising silicates. The process further comprises responsive to collecting the metal-bearing leachate, adjusting a pH value of the metal-bearing leachate to a first predetermined pH value to precipitate a first component from the metal-bearing leachate, separating by filtration the first component, and collecting a first filtrate in a fourth reactor. The process further includes responsive to collecting the first filtrate, adjusting the first filtrate to a second predetermined pH value to precipitate a second component from the first filtrate, separating by filtration the second component to result in a second filtrate, and collecting the second filtrate in a fifth reactor.

In another aspect, a system for processing a waste stream comprises a processor to operate a process comprising loading a first powder feedstock into a first reactor, wherein the first powder feedstock comprises a calcium sulfate component, and introducing an ammonium carbonate reagent to the first reactor to produce ammonium sulfate and calcium carbonate in a reaction slurry. The process further includes pumping the reaction slurry to a second reactor when a reaction to produce ammonium sulfate and calcium carbonate is complete thereby forming a reacted slurry, filtering the reacted slurry resulting in a calcium carbonate residue and ammonium sulfate filtrate liquor, and loading a second powder feedstock into a third reactor, wherein the second powder feedstock comprises a metal-bearing component, a silica component, and an aluminosilicate component. The process further includes leaching the second powder feedstock by at least one of contacting, passing, and percolating an acid through the second powder feedstock and collecting a metal-bearing leachate formed in the third reactor, wherein after collecting the metal bearing leachate, the third reactor comprises dried solids comprising silicates. The process further includes responsive to collecting the metal-bearing leachate, adjusting a pH value of the metal-bearing leachate to a first predetermined pH value to precipitate a first component from the metal-bearing leachate, separating by filtration the first component, and collecting a first filtrate in a fourth reactor. The process further includes responsive to collecting the first filtrate, adjusting the first filtrate to a second predetermined pH value to precipitate a second component from the first filtrate, separating by filtration the second component to result in a second filtrate, and collecting the second filtrate in a fifth reactor.

In another aspect, a method for processing a waste stream comprises loading a first powder feedstock into a first reactor, wherein the first powder feedstock comprises a calcium sulfate component, introducing an ammonium carbonate reagent to the first reactor to produce ammonium sulfate and calcium carbonate in a reaction slurry, pumping the reaction slurry to a second reactor when a reaction to produce ammonium sulfate and calcium carbonate is complete thereby forming a reacted slurry, and filtering the reacted slurry resulting in a calcium carbonate residue and ammonium sulfate filtrate liquor. The method further comprises loading a second powder feedstock into a third reactor, wherein the second powder feedstock comprises a metal-bearing component, a silica component, and an aluminosilicate component, and leaching the second powder feedstock by at least one of contacting, passing, and percolating an acid through the second powder feedstock and collecting a metal-bearing leachate formed in the third reactor, wherein after collecting the metal bearing leachate, the third reactor comprises dried solids comprising silicates. The method further comprises responsive to collecting the metal-bearing leachate, adjusting a pH value of the metal-bearing leachate to a first predetermined pH value to precipitate a first component from the metal-bearing leachate, separating by filtration the first component, and collecting a first filtrate in a fourth reactor. The method further includes responsive to collecting the first filtrate, adjusting the first filtrate to a second predetermined pH value to precipitate a second component from the first filtrate, separating by filtration the second component to result in a second filtrate, and collecting the second filtrate in a fifth reactor.

In another aspect, a system comprises a first reactor to react a metal-bearing sulfur waste with an ammonium carbonate reagent to form a reacted slurry comprising a liquid product and a solid product, wherein the solid product comprises a metal-bearing calcium carbonate, and wherein the liquid product comprises ammonium sulfate. The system further includes a second reactor to dissolve the solid product in a second reagent resulting in a processed liquor, a first filter to separate at least one of impurities and contaminants from the processed liquor, a third reactor to selectively precipitate at least one metal component from the second processed liquor by adding a first quantity of a base to the third reactor to elevate a pH of the processed liquor to a first predetermined pH level, wherein the first predetermined pH level causes the at least one metal component to precipitate, and a second filter to separate the at least one metal component from the processed liquor.

Applicant(s) herein expressly incorporate(s) by reference all of the following materials identified in each paragraph below. The incorporated materials are not necessarily "prior art".

U.S. patent application Ser. No. 15/669,870, entitled System and Method for Distributed Trading Platform, filed Aug. 4, 2017, herein incorporated by reference in its entirety.

U.S. patent application Ser. No. 15/675,697, entitled Systems and Methods for Using Smart Contracts to Control the Trade, Supply, Manufacture, and Distribution of Commodities, filed Aug. 11, 2017, herein incorporated by reference in its entirety.

If it is believed that any of the above-incorporated material constitutes "essential material" within the meaning of 37 CFR 1.57(d)(1)-(3), applicant(s) reserve the right to amend the specification to expressly recite the essential material that is incorporated by reference as allowed by the applicable rules.

Aspects and applications presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain, and ordinary meaning to the terms be applied to the interpretation of the specification and claims.

Further, the inventors are informed of the standards and application of the special provisions of 35 U.S.C. § 112(f). Thus, the use of the words "function," "means", or "step" in the Detailed Description or Description of the Drawings or claims is not intended to somehow indicate a desire to invoke the special provisions of 35 U.S.C. § 112(f) to define the systems, methods, processes, and/or apparatuses disclosed herein. To the contrary, if the provisions of 35 U.S.C. § 112(f) are sought to be invoked to define the embodiments, the claims will specifically and expressly state the exact phrases "means for" or "step for" and will also recite the word "function" (i.e., will state "means for performing the function of . . . "), without also reciting in such phrases any structure, material, or act in support of the function. Thus, even when the claims recite a "means for performing the function of . . . " or "step for performing the function of . . . ", if the claims also recite any structure, material, or acts in support of that means or step, then it is the clear intention of the inventors not to invoke the provisions of 35 U.S.C. § 112(f). Moreover, even if the provisions of 35

U.S.C. § 112(f) are invoked to define the claimed embodiments, it is intended that the embodiments not be limited only to the specific structures, materials, or acts that are described in the preferred embodiments, but in addition, include any and all structures, materials, or acts that perform the claimed function as described in alternative embodiments or forms, or that are well known present or later-developed equivalent structures, materials, or acts for performing the claimed function.

BRIEF DESCRIPTION OF THE DRAWINGS

A more complete understanding of the systems, methods, processes, and/or apparatuses disclosed herein may be derived by referring to the detailed description when considered in connection with the following illustrative figures. In the figures, like-reference numbers refer to like-elements or acts throughout the figures.

FIG. 1 depicts a system and method for combining an FGD gypsum conversion process with an ash conversion process.

FIG. 3 is a table showing the composition of an FGD gypsum feedstock used in preliminary testing.

FIG. 6 depicts crystallized ammonium sulfate product assays for ammonium sulfate product generated in preliminary testing of the FGD conversion process.

FIG. 7 depicts example test conditions and results from preliminary testing of the FGD conversion process.

FIG. 8 depicts calculated final product generated in preliminary testing of the FGD conversion process.

FIG. 13 depicts a composition of an ammonium sulfate product produced by the pilot production plant depicted in FIG. 9.

FIG. 17 depicts an example embodiment of a process for using a catalyst to separate impurities from calcium carbonate product produced by the FGD conversion process.

FIG. 22 is a table depicting the major earth forming oxides of a class F and a class C ash feedstock used in preliminary testing of the ash conversion process.

FIG. 23 is a table depicting the major, minor, and trace elemental composition of the class F and class C ash feedstocks used in preliminary testing of the ash conversion process.

FIG. 24 is a table depicting mineralogical composition of the class F and class C ash feedstocks used in preliminary testing of the ash conversion process.

FIG. 25 is a table depicting leaching results of class F and class C ash feedstocks using 3:1 hydrochloric acid to nitric acid.

FIG. 26 is a table depicting leaching results of class F and class C ash using sulfuric acid and sodium fluoride.

FIG. 27 is a table depicting leaching results of class F and class C ash feedstock using sulfuric acid and calcium fluoride.

FIG. 28 is a table depicting leaching results of class F and class C ash feedstock using hydrochloric acid in two stages starting with hydrochloric acid to pH 1.5 followed by 11% hydrochloric acid.

FIG. 29 is a table depicting leaching results of class F and class C ash feedstock using hydrochloric acid in two stages starting with hydrochloric acid to pH 1.5 followed by 30% hydrochloric acid.

FIG. 30 is a table depicting leaching results of class C ash feedstock using 30% hydrochloric acid for 24 hours on the residue after leaching in FIG. 29.

FIG. 34 depicts X-ray Diffraction (XRD) mineralogical compositions of class C and class F leach residues resulting from FIGS. 28 and 29 leaches.

FIG. 38 is a table depicting the percent composition of precipitate hydroxides at different pHs for class C ash feedstock.

FIG. 40 is a chart depicting percent elements precipitated at pH 4 for class C ash feedstock.

FIG. 42 is a chart depicting percent elements precipitated at pH 5-8 for class C ash feedstock with aluminum removed to show the smaller percentage more clearly.

FIG. 46 is a table depicting cations and anion for the sodium chloride final stream anions for class C ash feedstock.

FIG. 48 is a table showing results from lime precipitation testing.

Elements and acts in the figures are illustrated for simplicity and have not necessarily been rendered according to any particular sequence or embodiment.

DETAILED DESCRIPTION

Although the disclosure described herein is susceptible to various modifications and alternative iterations, specific embodiments thereof have been described in greater detail herein. It should be understood, however, that the detailed description of the systems and methods is not intended to limit the disclosure to the specific embodiments disclosed. Rather, it should be understood that the disclosure is intended to cover modifications, equivalents, and alternatives falling within the spirit and scope of the disclosure. In the following description, and for the purposes of explanation, numerous specific details, process durations, and/or specific formula values are set forth in order to provide a thorough understanding of the various aspects of exemplary embodiments. However, it will be understood by those skilled in the relevant arts that the apparatus, systems, and methods herein may be practiced without all of these specific details, process durations, and/or specific formula values. It should be noted that there are different and alternative configurations, devices, and technologies to which the disclosed embodiments may be applied. The full scope of the embodiments is not limited to the examples that are described below.

In the following examples of the illustrated embodiments, references are made to the accompanying drawings which form a part hereof, and in which is shown by way of illustration various embodiments in which the systems, methods, processes, and/or apparatuses disclosed herein may be practiced. It is to be understood that other embodiments may be utilized and structural and functional changes may be made without departing from the scope.

Headings are for organizational purposes only and are not intended to be limiting. Embodiments described under the various headings herein are interoperable with embodiments under other headings.

Overview

Figure 2:
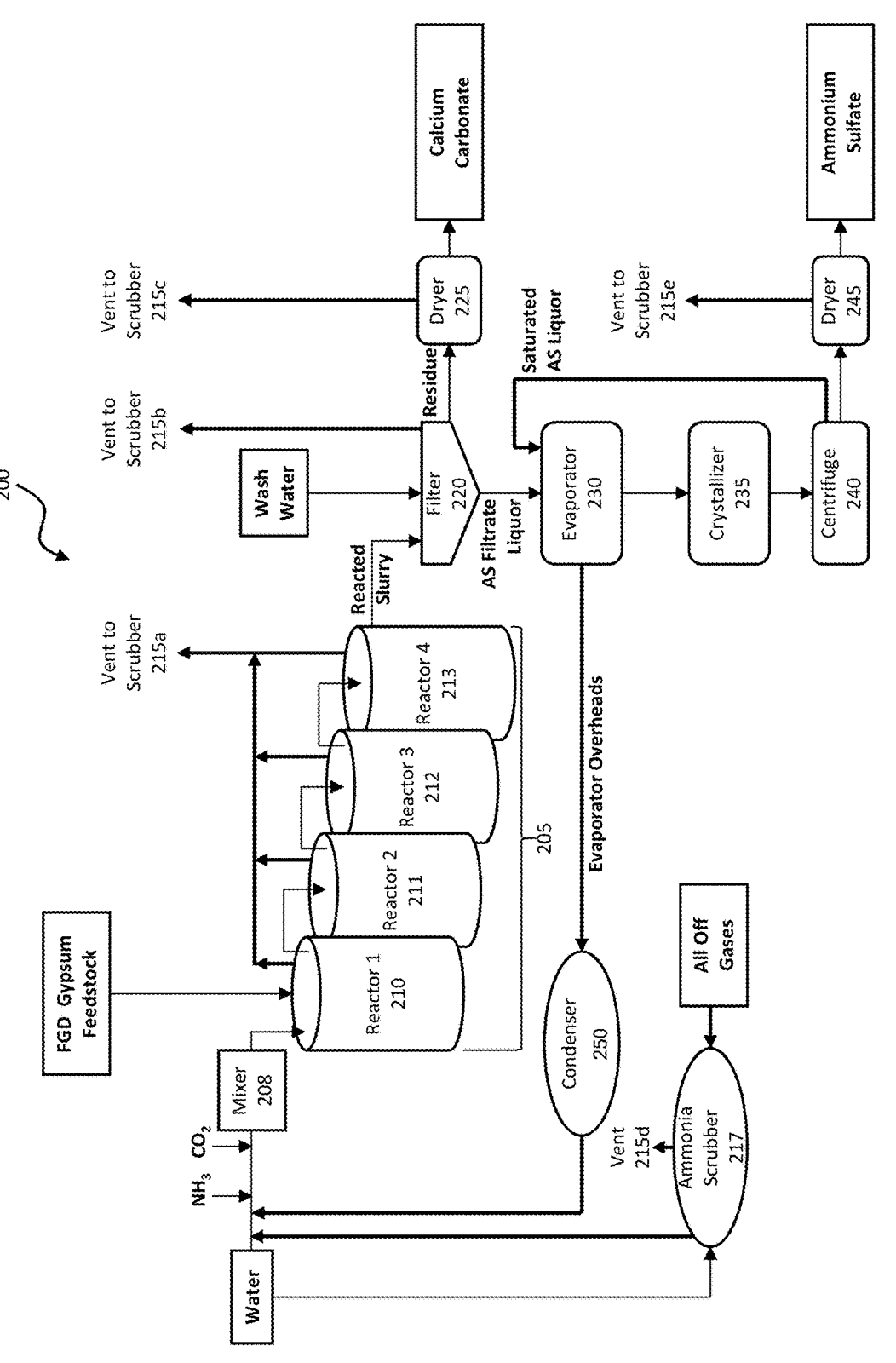
FIG. 2 depicts an embodiment of a production plant for implementing an FGD gypsum conversion process.

FIG. 1 depicts an ash conversion process 1800 combined with an FGD gypsum conversion process 200 (FIG. 2). The depicted ash conversion process 1800 may be the lime embodiment 1800*a* (FIGS. 18 and 19) or the caustic embodiment 1800*b* (FIGS. 20 and 21) or variations thereof as disclosed herein. In the depicted embodiment of the combined conversion system and method, FGD gypsum feedstock that is mixed with ash is processed in the FGD gypsum conversion process 200 resulting in an ammonium sulfate product and a calcium carbonate product that is mixed with ash. The calcium carbonate and the FGD are insoluble and are separated in the filtration process. The calcium carbonate product that is mixed with ash is processed through the ash conversion process 1800 resulting in the ash conversion process products as disclosed herein. In reference to the FIGS. 2, 18, and 20, the calcium carbonate, mixed with ash, from dryer 225 (FIG. 2) in the FGD gypsum conversion process proceeds to leach tank 1810 (FIGS. 18 and 20) in the ash conversion process.

FGD Gypsum Conversion Systems and Methods

Disclosed herein are systems and methods for reacting flue gas desulfurization (FGD) gypsum (calcium sulfate) feedstock, in either batch or continuous mode, with ammonium carbonate reagent to produce commercial products wherein the commercial products comprise ammonium sulfate and calcium carbonate. The systems and methods described herein are highly beneficial to the coal industry in that they produce higher value products from coal waste. The primary reaction is shown in equation 1 below.

$$CaSO_4 \cdot 2H_2O\text{(insoluble)} + (NH_4)_2CO_3 \text{ (soluble)} \rightarrow (NH_4)_2SO_4 \text{ (soluble)} + CaCO_3 \text{ (insoluble)} + 2H_2O \qquad (1)$$

FIG. 2 depicts an embodiment of a production plant 200 for implementing an FGD gypsum conversion process resulting in at least two commercial products. In the depicted embodiment, FGD gypsum (calcium sulfate) feedstock is fed, either in batch or continuous mode, into a reactor cascade 205 (comprising reactors 210, 211, 212, and 213) with ammonium carbonate reagent, which may be synthesized from ammonia and carbon dioxide gases or supplied as a powder. In some embodiments, the FGD gypsum feedstock may be fed to the system using a quantitative powder feeder or a gravimetric feeder optionally coupled to a screw feeder (not shown). In some embodiments, the FGD gypsum feedstock is in powder form. In embodiments where the FGD gypsum feedstock is moist it may require drying prior to feeding to avoid blockages in the feeder. In some embodiments, the FGD gypsum feedstock may be dried to 7% by weight or less moisture content.

The number of reactors in the reactor cascade 205 may vary depending on throughput required, the size and type of reactors, and the reaction time needed. In some embodiments, there may be between three and five reactors. As an example, for a two-hour reaction with four reactors having total volume V, the scaled total volume needed would be 4/3 V for three reactors and 2V for two reactors. The same rule applies when increasing the number of reactors. In some embodiments, the size of the reactors 210, 211, 212, and 213 may be reduced using weirs.

The one or more reactors 210, 211, 212, and 213 may be connected in overflow mode (material overflows from the top of a reactor to the next reactor) or underflow mode (material flows from the bottom of a reactor to the next reactor), or material may be transferred using one or more pumps between the one or more reactors. In some embodiments, the one or more reactors 210, 211, 212, and 213 may be continuously stirred tank reactors (CSTRs), stirred tank reactors, and/or in-line (located in a transfer line) reactors. In some embodiments, the first reactor 210 may be a small, high intensity reactor to thoroughly mix the FGD gypsum feedstock and reagent, followed by two to three (larger, in some embodiments) reactors 211, 212, and/or 213 to hold the mixture long enough for the reaction to reach completion (i.e. 99+% conversion of FGD gypsum feedstock) resulting in a reacted slurry. In the depicted embodiment, the reactor cascade 205 vents ammonia gas from the ammonium carbonate reagent through vent 215*a* to the scrubber 217. Either water or between 0.01 to 0.1M sulfuric acid may be used in the scrubber 217. The ammonia from the vents 215*a-e* dissolves in water to yield ammonium hydroxide or, in the case of sulfuric acid, the ammonia reacts to form ammonium sulfate. The ammonium hydroxide or ammonium sulfate from the scrubber 217 may optionally be recycled back into the reagent feed line into reactor 210, in some embodiments.

After the reaction has reached completion, the reacted slurry is pumped, underflows, or overflows from the reactor cascade 205 into a filter 220 resulting in calcium carbonate residue and ammonium sulfate filtrate liquor. Wash water is pumped through filter 220 in the depicted embodiment. Ammonia off-gases from the filter 220 vent through vent 215b to scrubber 217. In some embodiments, filter 220 may be a drum filter or other similar continuous filter. The calcium carbonate residue from filter 220 proceeds to dryer 225 to produce calcium carbonate product. In the depicted embodiment, dryer 225 vents through vent 215c ammonia to scrubber 217. In some embodiments, the calcium carbonate product may be further processed. Further processing options are discussed in the Examples.

In the depicted embodiment, ammonium sulfate (AS) filtrate liquor proceeds from filter 220 to evaporator 230 where water is evaporated from the ammonium sulfate liquor, and then to crystallizer 235 where ammonium sulfate crystals are produced in ammonium sulfate liquor (also referred to as processed liquor). Centrifuge 240 separates the ammonium sulfate crystals from the ammonium sulfate liquor (processed liquor) resulting in separated ammonium sulfate crystals and saturated ammonium sulfate liquor. Dryer 245 dries the separated ammonium sulfate crystals resulting in ammonium sulfate product. The dryer 245 vents through vent 215e to scrubber 217. In some embodiments, saturated ammonium sulfate liquor is pumped from the centrifuge 240 back into the evaporator 230. Overheads or vapors coming off the top of the evaporator 230, containing excess ammonium carbonate reagent, may optionally proceed through a condenser 250 (evaporator condensate) to be recycled back into the reactor cascade 205 to react with the FGD gypsum feedstock thus reducing reagent demand and reducing waste streams. In the depicted embodiment, water is pumped into the reactor cascade 205 and into the ammonia scrubber 217. In the depicted embodiment, all off-gases, including water vapor and ammonia in some embodiments, vent through vents 215a, 215b, 215c, 215d, 215e to ammonia scrubber 217.

In some embodiments, the ammonium sulfate may be vacuum evaporated, the salt allowed to crystallize out, and the solid product is then filtered using a solid/liquid separation device. The conditions in the crystallizer 235 may be controlled to produce larger crystals which are more desirable in some markets. The ammonium sulfate product may be greater than or equal to 99% pure. The ammonium sulfate crystallization and the centrifuge separation processes may be continuous.

Filter 220 and centrifuge 240 are both solid/liquid separators and may be substituted by other solid/liquid separators in other embodiments. For example, a belt filter may be used in place of filter 220 and a rotating drum filter may be used in place of the centrifuge 240. In some embodiments, a spray dryer may be used in place of the evaporator 230 and crystallizer 235. The spray dryer evaporates the water and forms small crystals all in one step. Continuous filtration systems other than those depicted in FIG. 2 may be utilized in the process. The equipment used in the process may be sized to fit the desired input/output. Material transfer between processes/equipment may be carried out with the use of pumps, etc.

Reagents

In the embodiment depicted in FIG. 2, ammonium carbonate reagent is synthesized using ammonia ($NH_3$) and carbon dioxide ($CO_2$) gases in flowing water. In some embodiments, the $NH_3$ and $CO_2$ gas are injected in the stoichiometric ratio of 2:1 respectively. The gases may be introduced sequentially using gas nozzles into a flowing water stream in either a batch process or a continuous process. The gases are best fed sequentially with the $NH_3$ first followed by the $CO_2$ because $NH_3$ is more soluble in water than $CO_2$ and $CO_2$ is more soluble in ammonium hydroxide than in plain water. This order of gas introduction into the water has been found to reduce the chances of an ammonia gas release. In alternative embodiments, the order of gas introduction into the water may be reversed. Sequential feed of the $NH_3$ and $CO_2$ gases reduces chance of clogging in the gas nozzle; however, the $NH_3$ and $CO_2$ gases may be premixed, in some embodiments. The $NH_3$ and $CO_2$ gases may be mixed with process water using a mixer 108 such as an in-line mixer or a reactor tank with mixer resulting in an ammonium carbonate reagent solution. In some embodiments, the gases may be fed directly into mixer 208.

The pH may optionally be monitored to ensure carbonate is formed (between pH 8.7-9.0), not bicarbonate. Conductivity and/or the specific gravity may be monitored using an electric conductivity meter and a hydrometer, respectively, to determine the concentration of ammonium carbonate reagent formed. Both conductivity and specific gravity increase as the concentration of the ammonium carbonate formed in solution increases. For example, for a 15% concentration of ammonium carbonate in solution, the conductivity is 80-90 mS/cm (milli-siemens/centimeter).

The resulting ammonium carbonate reagent may be fed directly into reactor cascade 205. In some embodiments, the ammonium carbonate reagent is added in excess (more than stoichiometric) to ensure the reaction goes to completion (i.e. that all the FGD gypsum feedstock is reacted). In some embodiments, 140% stoichiometric addition of the ammonium carbonate reagent results in the reaction going to completion. If the reaction is not complete, then the calcium carbonate product is contaminated with FGD gypsum feedstock.

Products

In some embodiments, to make the products more commercially attractive, the ammonium sulfate and/or the calcium carbonate products may be agglomerated in an agglomerator to larger, more flowable particles to facilitate product application. In some embodiments, the particles are several millimeters in size. In some embodiments the ammonium sulfate and/or calcium carbonate products may be further treated with coating agents, such as stearic acid and stearates, to improve their properties for specific markets, such as to reduce their moisture absorption. In some embodiments, the ammonium sulfate and/or calcium carbonate products may be treated with an additive to reduce the absorption of water.

Ammonium Sulfate

The ammonium sulfate product produced by production plant 200 (FIG. 2) may be used as a solution. In some embodiments, the ammonium sulfate product is greater than 99% pure. In some embodiments, the ammonium sulfate solid product is fertilizer grade. Ammonium sulfate is primarily used in the global fertilizer industry as a soil amendment to replenish depleted levels of nitrogen and sulfur to the soil. An additional use in the fertilizer industry is as an adjuvant for various insecticides, herbicides, and fungicides. Ammonium sulfate may also be used in non-agricultural products and processes such as for flameproofing of select materials, textile dyeing, a cattle feed supplement, and for certain water treatment processes.

Calcium Carbonate

The calcium carbonate product produced by production plant 200 (FIG. 2) is insoluble. In some embodiments, the calcium carbonate product may contain small amounts of impurities, such as carbon and iron, which may cause it to have a grey or tan color. In some embodiments, the calcium carbonate is 90-99% pure. In some embodiments, the calcium carbonate product may be further processed to obtain a higher purity white calcium carbonate product which typically has higher market value. Some exemplary calcium carbonate whitening processes are described in the examples under the heading Calcium Carbonate Processing.

Calcium carbonate has a plethora of uses in many diverse industries including: the oil and gas industry as drilling fluid make-up to increase the fluid density, as an additive to control fluid loss to formation, and in oilfield cementing as a loss circulation material; the building materials and construction industry for roofing shingles, tiles, and cement, brick, and concrete block manufacture; and commercial applications such as industrial filler in the paper, paint, plastics, and rubber industries.

Environmental Benefits

The processes described herein are environmentally sound with internal recycles and near zero waste. All parts of the processes where ammonia gas may be released may be exhausted to one or more water (or dilute sulfuric acid) scrubbers where the ammonia is recaptured and recycled to one or more of systems/processes. Coupling to an adjacent Haber process (a process for producing ammonia from nitrogen and hydrogen), in some embodiments, could minimize the amount of ammonia that would need to be stored on site thus reducing the hazards associated with storing large quantities of ammonia. Locating a production plant 200 (FIG. 2) near a source of carbon dioxide, such as a coal power plant in some embodiments, could allow around 10% by volume of the carbon dioxide emissions from the coal power plant to be utilized in the production plant 200 (FIG. 2) using a side stream taken from the exhaust stack. $CO_2$ gas may be provided from other processes, plants, or sources including naturally occurring or stored $CO_2$ gas which may be pumped from underground formations. Carbon capture is another potential environmental benefit of the processes described herein as $CO_2$ gas is converted to a solid carbonate compound. In some embodiments, one or more internal recycles may be incorporated to recover reagents resulting in near-zero waste stream which is of significant environmental benefit.

Examples for FGD Conversion Process

Preliminary Testing

The systems and methods for the FGD gypsum conversion process disclosed herein were first developed by testing batch reactions under different conditions to arrive at initial operating conditions for a continuous demonstration. The following data was generated in preliminary testing with a particular feedstock and should not be considered limiting. Other operating conditions are anticipated.

Figure 4:
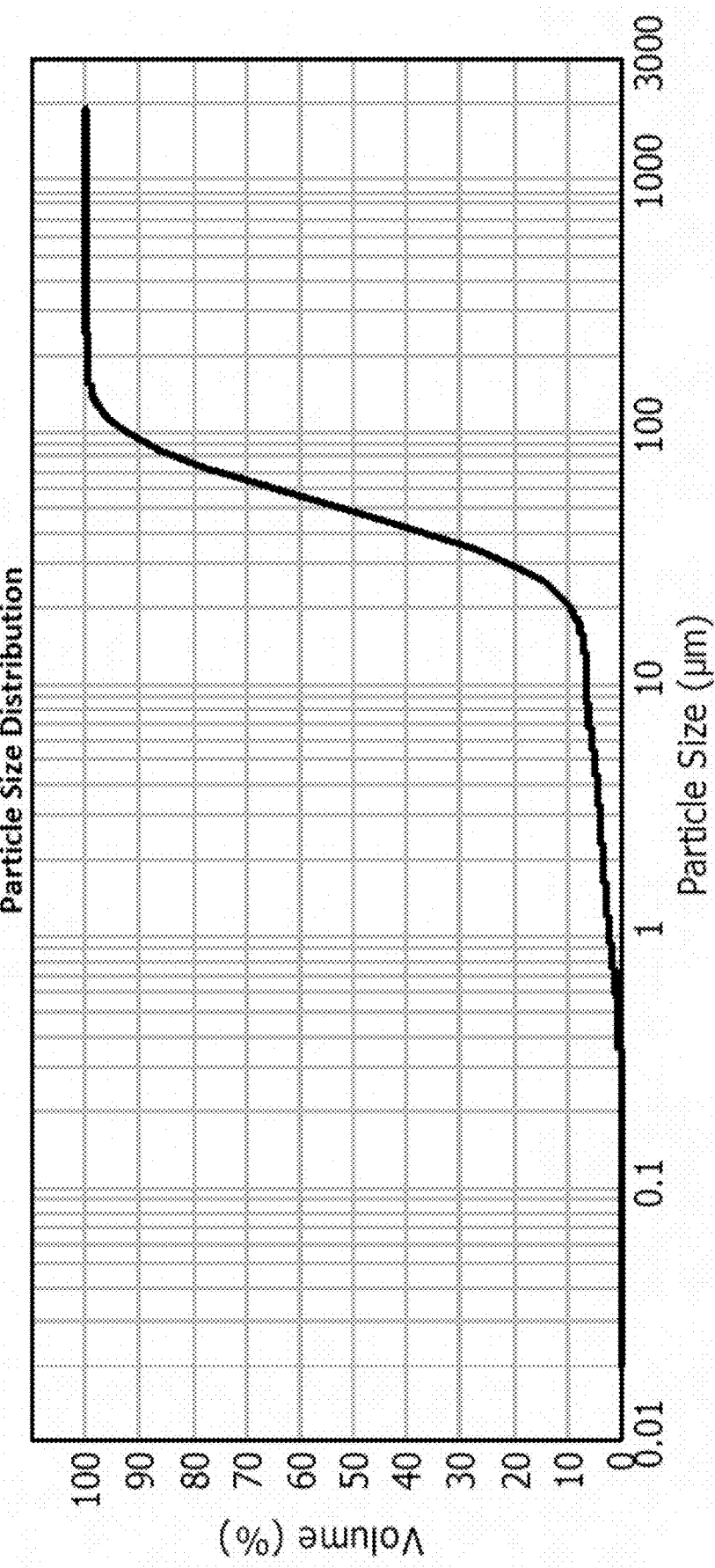
FIG. 4 depicts a particle size distribution analysis for the FGD gypsum feedstock used in preliminary testing.

FGD gypsum feedstock from a typical coal power plant was used as the feedstock in preliminary testing. The composition of the FGD gypsum feedstock used in preliminary testing of the FGD conversion process is depicted in FIG. 3 and the particle size analysis of the FGD gypsum feedstock is shown in FIG. 4. Values shown "<X" are below detection limits, where X is the detection limit of the equipment used in the analysis.

Batch Process

Figure 5:
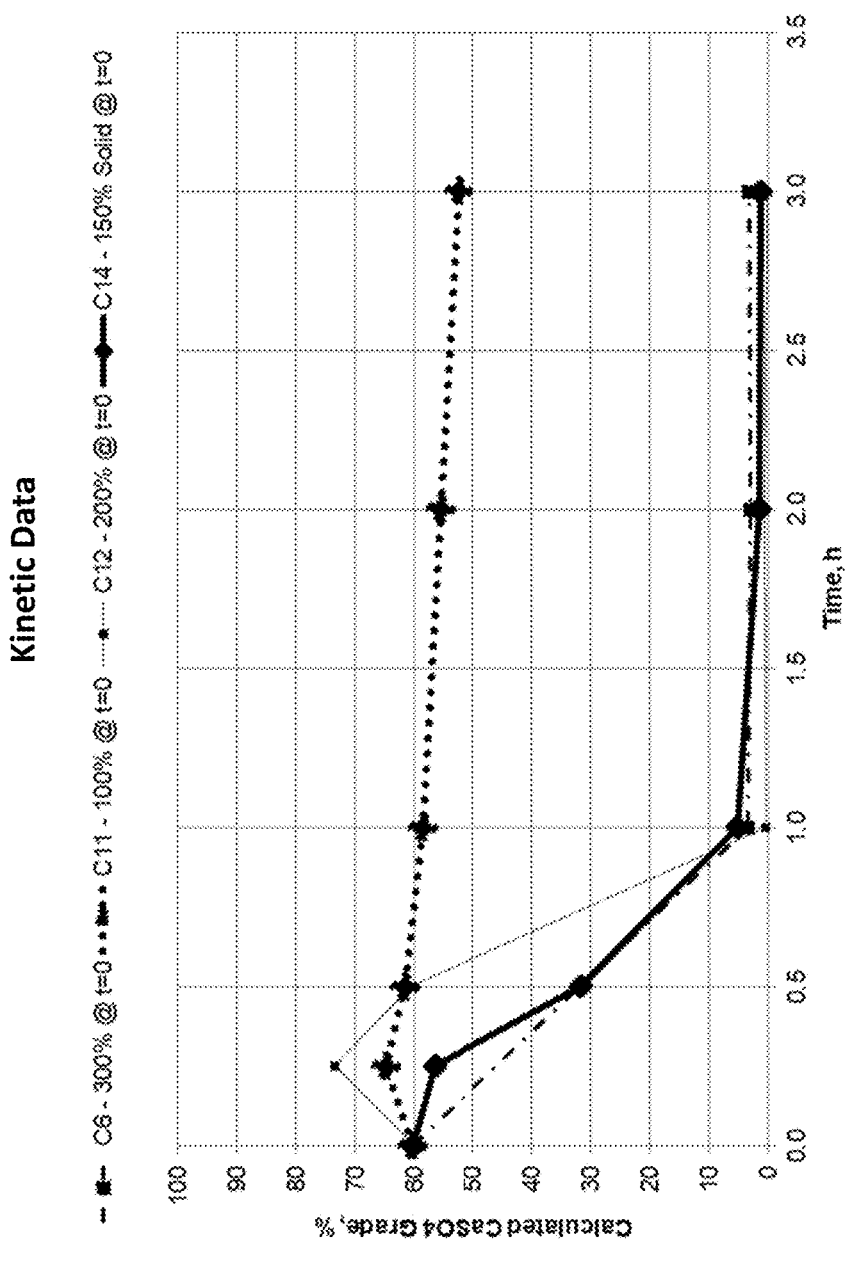
FIG. 5 depicts kinetic data for varying reagent additions in preliminary testing of the FGD gypsum conversion process.

In preliminary batch testing, FGD gypsum feedstock samples were slurried in water at 19% by weight solids and reacted with 15% concentration ammonium carbonate reagent solution at ambient temperature and pressure. Higher solids samples can also be used with equivalent increases in the ammonium carbonate reagent. Higher temperatures are not desirable because the ammonium carbonate reagent is less stable at higher temperatures. Kinetic data for varying reagent additions used in preliminary testing of the FGD conversion process, depicted in the chart in FIG. 5, shows that at 140%-150% stoichiometric additions of reagents to reactants the reaction between FGD gypsum feedstock and ammonium carbonate worked well and after one to three hours, at atmospheric pressure and ambient temperature, produced ammonium sulfate >99.9% in the liquor and 93-95% calcium carbonate product. When evaporated to dryness, the purity of the ammonium sulfate was >99.7%. Assays for the crystallized ammonium sulfate product produced in preliminary testing of the FGD conversion process are depicted in FIG. 6. The assay results were 99.7% or 99.9% depending on the assay method. Values shown "<X" are below detection limits, where X is the detection limit.

Test conditions and results of preliminary testing of the FGD conversion process are depicted in FIG. 7. Calculated final product generated in preliminary testing of the FGD conversion process is depicted in FIG. 8. Based on these tests, the optimum stoichiometry for the FGD conversion process was 140% to 150% and the FGD conversion reaction was complete after one to three hours. From 140% to 100% stoichiometry the reaction slows down as excess reagent is decreased. Stoichiometry lower than 100% resulted in less than 99% conversion of FGD gypsum feedstock, while higher than 150% stoichiometric resulted in wasted reagent. Variations in the composition of the feedstock may produce different results.

Continuous Process

As discussed herein, the FGD conversion process may be operated in a continuous mode.

Figure 9:
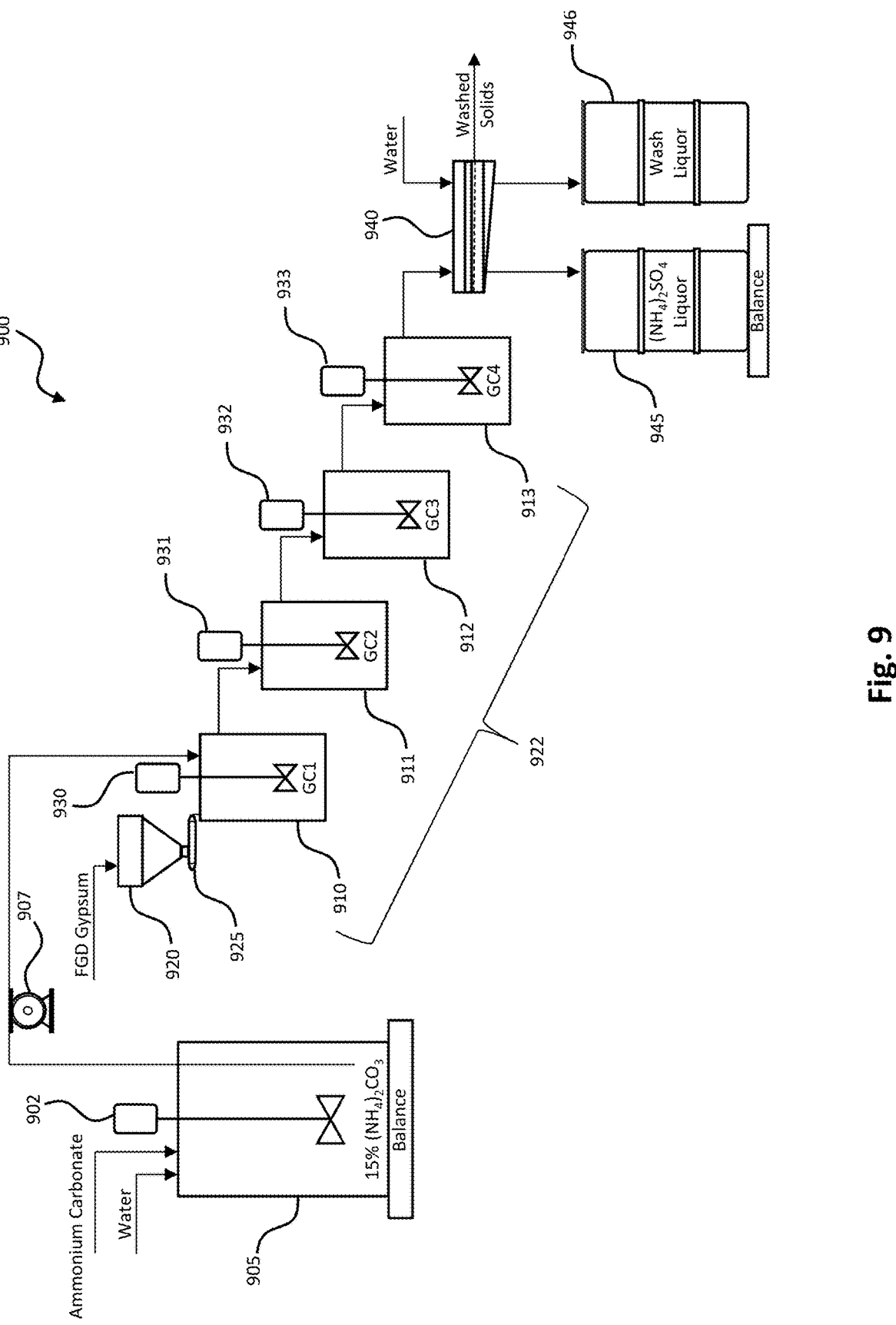
FIG. 9 depicts a schematic of a pilot production plant operating in continuous mode.

Continuous mode was demonstrated in a pilot production plant 900, depicted in FIG. 9, operated at an FGD gypsum feedstock feed rate of 1 kg/hr. Ammonium carbonate reagent was mixed by mixer 902 with water in vessel 905 to produce a 15% concentration ammonium carbonate solution that was pumped by pump 907 into the first reactor 910, operating in an overflow mode to three other reactors 911, 912, and 913, to provide sufficient reaction time for the conversion to go to completion. In some embodiments, material may be transferred between the reactors 910, 911, 912, and 913 using underflow, overflow, or a pump. The FGD gypsum feedstock was fed as a powder from bin 920 using a screw feeder 925 to the first reactor in the reactor cascade 922, comprising reactors 910, 911, 912, and 913, where it was mixed with the ammonium carbonate solution. The slurry is then kept in suspension by mixers 930, 931, 932, and 933 in each reactor 910, 911, 912, and 913 to allow sufficient time for the reaction to take place. The slurry overflowed from reactor 913 into a continuous filter 940 (alternating between two pan filters) to remove the solid calcium carbonate product (which was then washed) and the resulting filtrate, ammonium sulfate liquor, was collected in tank 945. The wash liquid was collected in tank 946.

The pilot production plant 900 depicted in FIG. 9 was operated at a constant 20° C.±3° C. and a pH ranging between 7.5 and 8.5 for 110 hours (over the course of five days) at the following conditions:

Condition 1A: 150% of the stoichiometric quantity of reactants, Day 1-2

Condition 2: 125% of the stoichiometric quantity of reactants, Day 2

Condition 1A: 150% of the stoichiometric quantity of reactants, Day 3

Condition 1B: 150% of the stoichiometric quantity of reactants+catalyst, Day 3

Condition 3: 140% of the stoichiometric quantity of reactants, Day 4

Condition 4: 150%, of the stoichiometric quantity of reactants and at double the feed rates (2 kg/hr), Day 4

Figure 10:
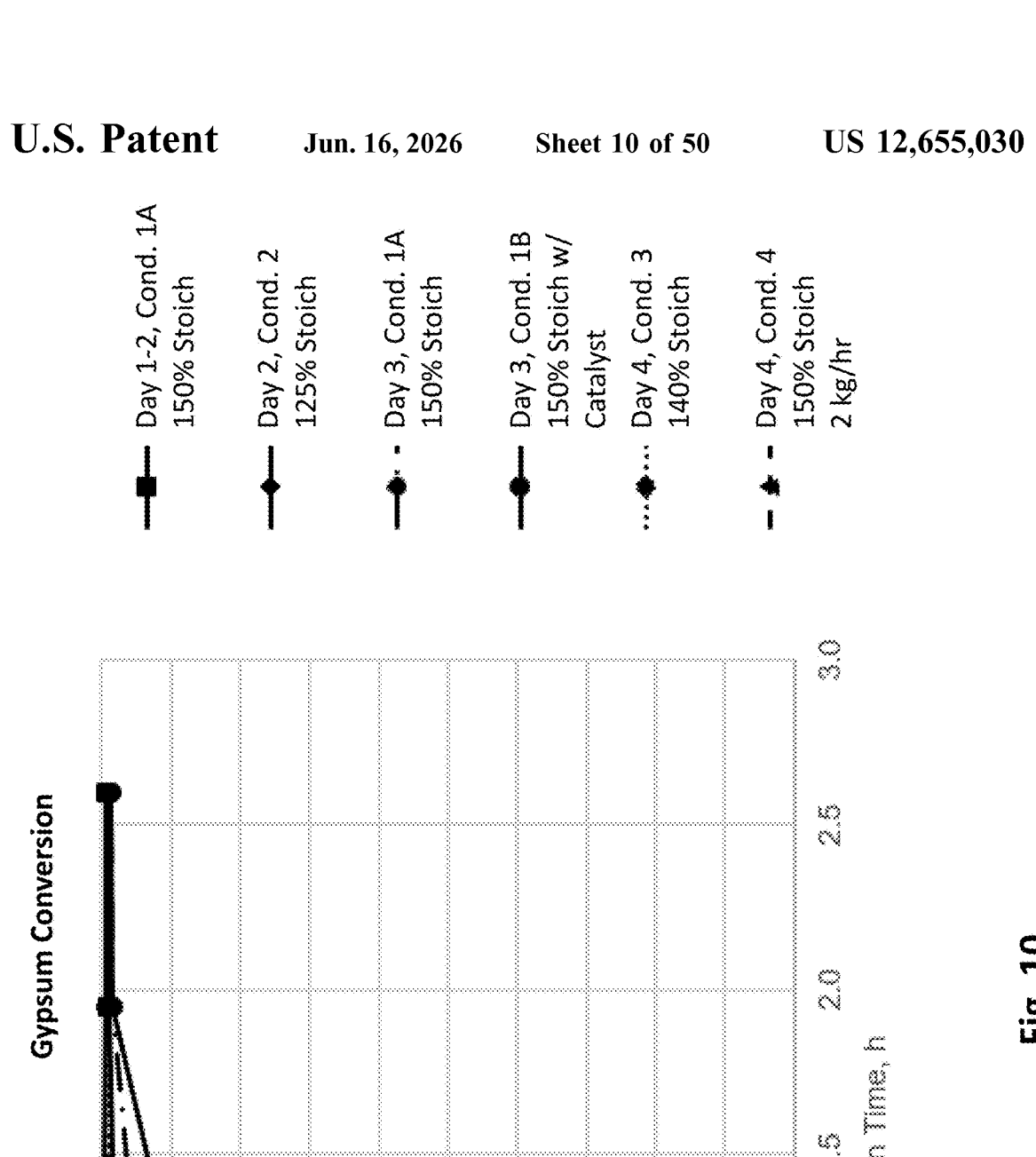
FIG. 10 depicts calculated gypsum conversion with changing conditions in the pilot production plant depicted in FIG. 8.

FIG. 10 depicts calculated gypsum conversion with changing conditions in pilot production plant 900 (FIG. 9). These tests showed that:

140%-150% stoichiometric addition of reagent with respect to the quantity of reactants was sufficient for quantitative conversion.

The catalyst addition reduced the reaction time.

Doubling the feed rates of FGD gypsum feedstock reduced the reaction time.

Figure 11:
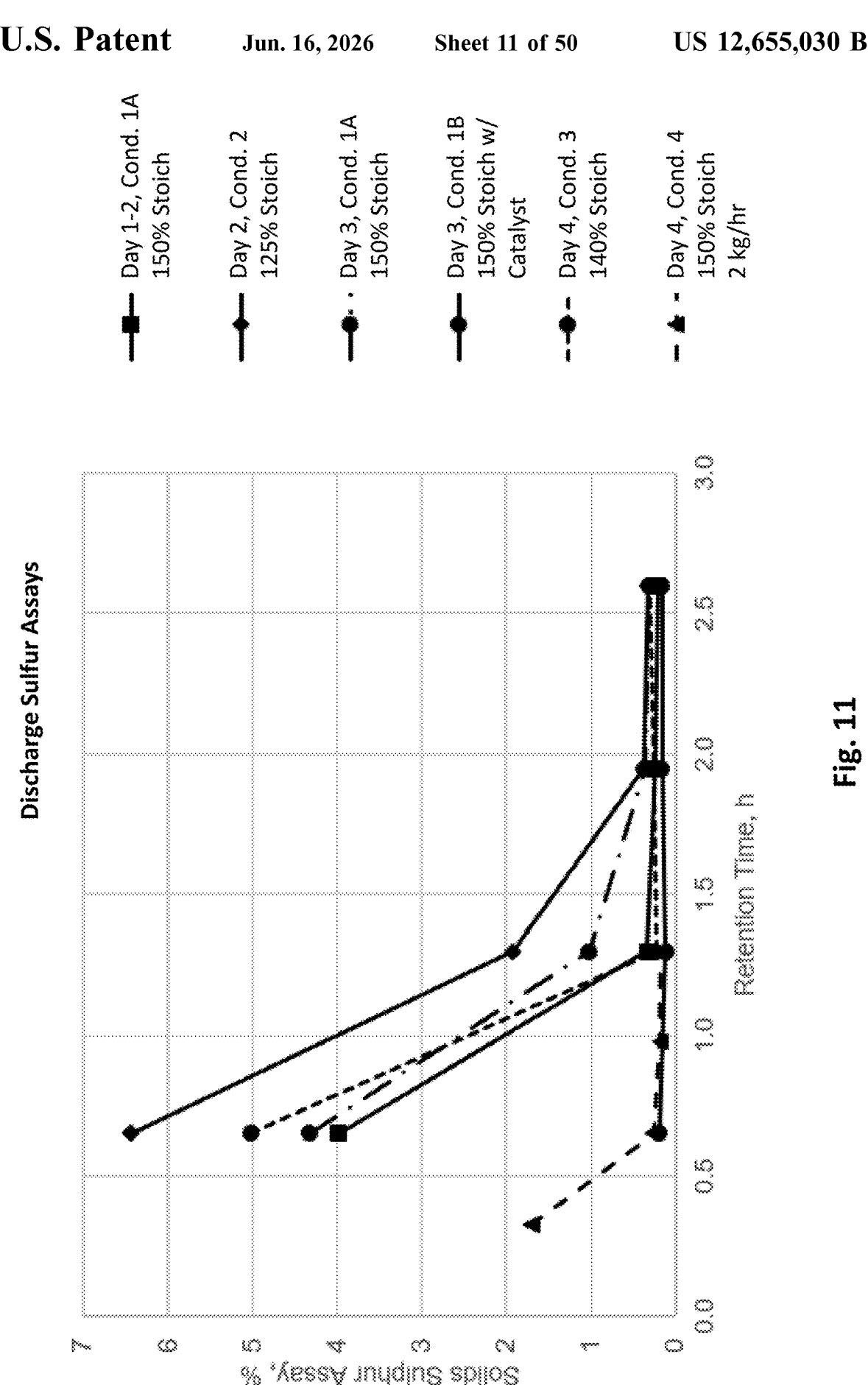
FIG. 11 depicts discharge sulfur assays from the pilot production plant depicted in FIG. 9.

FIG. 11 depicts discharge sulfur assays from the pilot production plant 900 (FIG. 9). Referencing FIG. 9, the majority of the conversion took place within the first two reactors 910, 911 (<1.5 hours for Conditions 1A and 3; and <0.75 hours for Conditions 1B and 4). The third and fourth reactors 912, 913 provided extra time to complete the reaction for the remaining gypsum.

Figure 12:
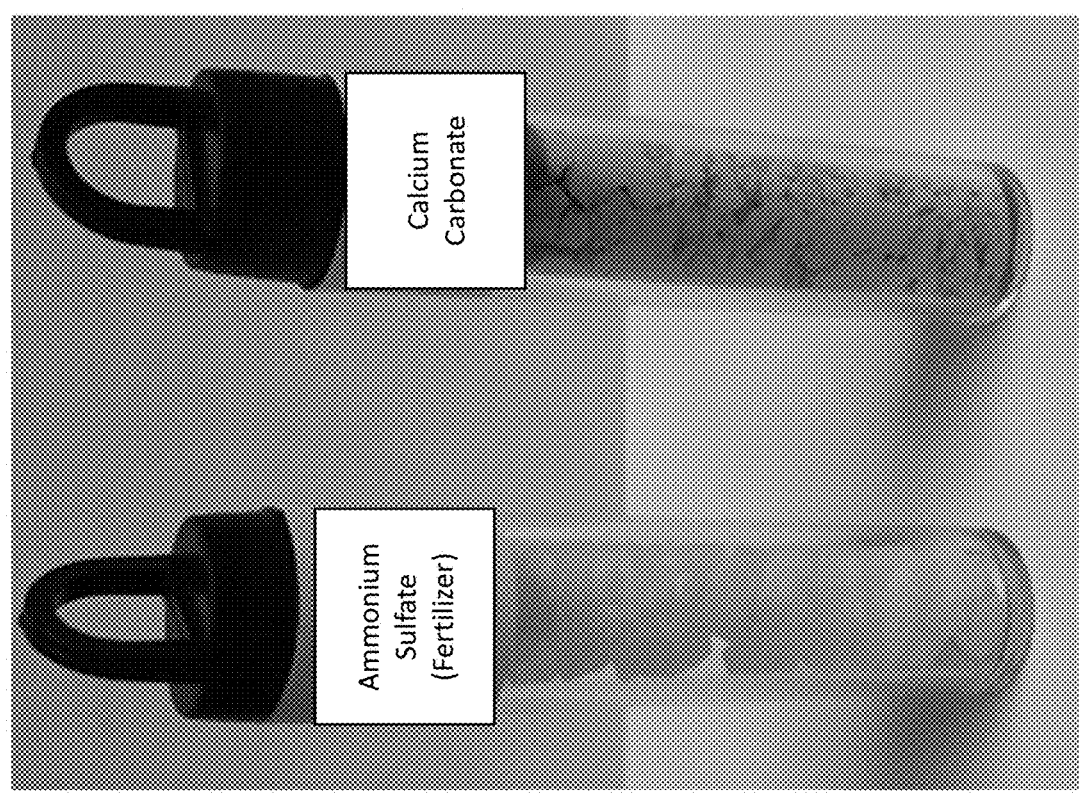
FIG. 12 depicts exemplary ammonium sulfate and calcium carbonate products produced by the pilot production plant depicted in FIG. 9.

The purity of the ammonium sulfate product produced in preliminary testing of the FGD conversion process was 99.9% (FIG. 8). The purity of the calcium carbonate produced in preliminary testing of the FGD conversion process was 93-95% (FIG. 8) with an average D50 particle size of 44 μm. While the calcium carbonate product was of good purity, the small amounts of impurities tinted the product a grey to tan color. The impurities causing the color were carbon and iron which are dependent on the impurities in the FGD gypsum feedstock. FIG. 12 depicts ammonium sulfate and calcium carbonate products generated by the pilot production plant 900 (FIG. 9). FIG. 13 depicts the composition of the ammonium sulfate crystal product produced in the pilot production plant 900 (FIG. 9). Variations in FGD gypsum feedstock may produce different results.

Variations in Feedstock

FGD Gypsum Feedstock Mixed with Ash

In some embodiments, where the FGD gypsum feedstock is mixed with coal ash, the FGD conversion process can produce a high purity ammonium sulfate and a second product that is comprised of calcium carbonate and ash. This product can be marketed as such, particularly to building material applications, or further processed in other separation schemes. The processing system and methods for FGD gypsum feedstock that is mixed with ash is the same as that depicted in FIG. 2; however, the calcium carbonate product may be lower purity than that generated from an FGD gypsum feedstock that is not mixed with ash. The amount of ash in FGD gypsum feedstock that is mixed with ash affects the purity of the calcium carbonate product when FGD gypsum feedstock mixed with ash is used in the FGD gypsum conversion process. FIG. 1 depicts a process where FGD feedstock mixed with ash can be processed in the FGD conversion process and the calcium carbonate mixed with ash can be processed in the ash conversion process depicted in FIGS. 18 through 21.

Removal of Chloride from Flue Gas Desulfurization Gypsum Feedstock

Some FGD gypsum feedstock contains levels of chloride that are too high for certain applications. The excess chloride is removed from FGD gypsum feedstock through a process of water leaching, in some embodiments. Water leaching may be carried out at any temperature between room temperature (20° C.) and boiling (100° C.).

An example chloride removal process used in testing is described below. The following process could be scaled according to processing requirements. Testing was carried out at 75° C. with two water leaches.

1) First add 1000 g of hot 75° C. deionized water in a reactor. Add 250 g of FGD gypsum feedstock sample. The mixture results in a slurry. Equip reactor with lid and impellor. The reactor and/or lid may be glass in some embodiments.

2) Agitate the slurry for half an hour.

3) After half hour slurry time, filter the leached FGD gypsum feedstock solids and collect the filtrate. Record filtration properties.

4) Add 1000 g of hot 75° C. water to the reactor along with the solids from step 3. Agitate for half an hour.

5) After the half hour agitation time, filter out the leached solids from step 4 and collect the filtrate, record filtration properties.

6) Combine 25 mL of filtrate 1 (step 3) with 25 mL of filtrate 2 (step 5) and submit for assay.

7) Dry the leached FGD gypsum feedstock at 95° C. or lower until the weight does not change.

8) Submit samples for assay by inductively coupled plasma-mass spectrometry (ICP-MS) and Chloride analysis.

The results obtained on an FGD gypsum feedstock sample that contained around 0.5% by weight chloride, showed that >99% of the chloride can be leached out in the chloride removal process. The concentration of chloride in the wash water was 1033 ppm. The cations associated with the chloride were calcium at 894 ppm and magnesium at 166 ppm. The chloride level in the washed FGD gypsum feedstock was reduced to around 100 ppm.

There are several techniques to remove impurities from the filtrate after the water leach before discharge including ion exchange columns, reverse osmosis, and other similar deionization techniques known in the art.

A test was run to determine where the chloride in FGD gypsum feedstock winds up when processed through the FGD gypsum conversion process. In the test, FGD gypsum feedstock containing 0.5% by weight chloride was processed by reacting with ammonium carbonate to convert the calcium sulfate to calcium carbonate and ammonium sulfate. That test showed that the $CaCO_3$ product had 16 ppm chloride and the ammonium sulfate had chloride at 434 ppm. The filtrate from the ammonium sulfate crystallization had 672 ppm chloride. On a weight percentage basis, the filtrate from the ammonium sulfate crystallization contains most of the chloride at 94.2%, the ammonium sulfate contained 5.2% and the calcium carbonate 0.6%. These results showed that water leaching to remove chlorides in the FGD gypsum feedstock prior to FGD conversion processing greatly enhances the qualities of the ammonium sulfate and calcium carbonate products by reducing the chloride impurity from 0.5% by weight to 100 ppm.

If the washed FGD gypsum feedstock was processed through the FGD gypsum conversion process depicted in FIG. 2, for example, negative impacts are not expected on the product quality due to chloride since 98% of the chlorides may be removed by washing.

Sulfite to Sulfate Conversion

Coal combustion products (CCP) are comprised of fly ash (fine particulates from the combustion process collected in filters), a lime or limestone absorption bed to clean out sulfur dioxide ($SO_2$) gases, and bottom ash remaining behind after coal combustion. The absorption bed is converted to calcium sulfate after absorption of $SO_x$ and oxidation of calcium sulfite to calcium sulfate. The calcium sulfate is the FGD gypsum feedstock.

Figure 14:
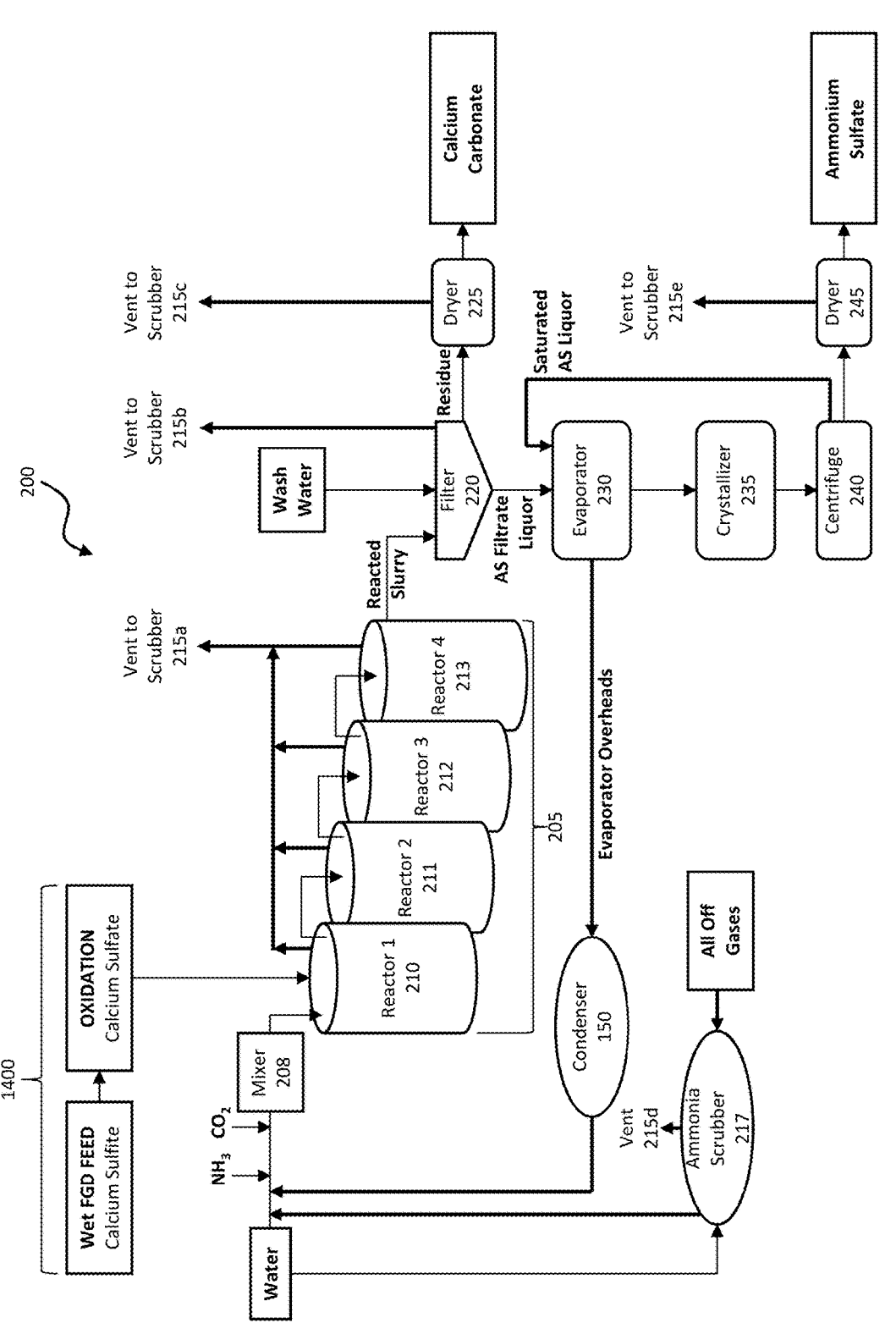
FIG. 14 depicts an embodiment of a calcium sulfite oxidation process added to FIG. 2 to treat the FGD gypsum feedstock prior to feeding into the FGD gypsum conversion process.

In some cases, the FGD gypsum feedstock may be in the form of a calcium sulfite slurry. In such embodiments, an oxidation step may be required to convert calcium sulfite to calcium sulfate. While there are several well-established methods to oxidize calcium sulfite to calcium sulfate, none have been coupled to a more comprehensive conversion process. The conversion of calcium sulfite to calcium sulfate (gypsum) is a well-developed technology, which is widely practiced and generally understood. There are a number of oxidation methods that may be coupled to the FGD conversion process depicted in FIG. 2. FIG. 14 depicts a modified production plant 200 (FIG. 2) with the addition of an oxidation step 1400 for calcium sulfite to calcium sulfate conversion prior to feeding into the FGD gypsum conversion process.

Forced Air Oxidation: There are conventional sparger oxidation bubble towers which are expensive to build, can be up to 60 feet in height, and require 200% excess air to achieve complete conversion of calcium sulfite to calcium sulfite. A newer and less expensive approach uses air turbine oxidizer systems. These could be sited remotely and greatly reduce the conventional air oxidation retrofit. This process is also accomplished in an acidic environment. The calcium sulfite is extremely soluble in an acid medium and the sulfite ion in solution oxidizes very quickly in an agitated solution to a sulfate ion. Once the calcium sulfate forms, it precipitates to a gypsum slurry very rapidly. Other approaches use mechanical agitation for froth flotation with added air oxidation.

Air Oxidation over Time: Calcium sulfite will eventually convert to calcium sulfate when exposed to air and in the presence of water or in a slurry. The reaction is very slow and does not meet normal process requirements. However, inventories that have been stored outdoors for a long period of time may have mostly converted to calcium sulfate and can be used directly in the FGD gypsum conversion processes described herein. The mere fact that calcium sulfite is recognized as a mineral suggests that the sulfite to sulfate conversion kinetics are extremely slow.

Oxidation with Oxygen: The oxidation of calcium sulfite to calcium sulfate can be accelerated by using oxygen in place of air. Oxygen concentrations as low as 5% by volume may be effective. In another embodiment, a low concentration of a metal ion is added as a catalyst to the reaction. An example would be 5 to 10 ppm ferric ion, manganese(II), or cobalt(II).

Hydrogen Peroxide Oxidation: Sulfur dioxide, and/or its aqueous byproduct sulfite, can be oxidized to sulfate with hydrogen peroxide. The reaction occurs over a wide pH range but is faster at lower pHs. This is conducted in an aqueous medium and involves the oxidation of dissolved sulfite ion with peroxide to convert to the more insoluble sulfate. Calcium peroxide may be used in place of hydrogen peroxide.

Products

Calcium Carbonate Processing

Acid Dissolution

In some embodiments, the calcium carbonate product produced by the FGD gypsum conversion process may comprise contaminants such as iron, carbon, and silicates. When such contaminants are present, the calcium carbonate may proceed through further processing to remove such contaminants resulting in a purer product. In some embodiments, such as the acid dissolution calcium whitening system and process 1500 depicted in FIG. 15, the calcium carbonate product may be dissolved in dissolver 1502 in dilute acid (such as hydrochloric acid (HCl), nitric acid ($HNO_3$), or another acid forming a soluble calcium salt). The basic reaction is shown in equation 2:

$$CaCO_3(insoluble)+2HCl \rightarrow CO_2+Ca(Cl)_2(soluble)+H_2O \qquad (2)$$

The carbon dioxide generated by equation 2 in dissolver 1502, in the depicted embodiment, may proceed to scrubber 1505 containing sodium hydroxide to form sodium carbonate.

The mixture resulting from equation 2 may then be filtered by filter 1510 with solid impurities proceeding to dryer 1515 and liquids proceeding to reactor 1520. The dried solids may comprise carbon and silicates, in some embodiments. If an iron contaminant is present in the calcium carbonate product produced by the FGD conversion process, hydrogen peroxide ($H_2O_2$) may be added to reactor 1520 to oxidize ferrous iron to ferric iron. An amount of base such as calcium hydroxide (in depicted embodiment), sodium hydroxide, and/or sodium carbonate may also be added to reactor 1520 to raise the pH in the reactor to 3 or higher to precipitate ferric hydroxide. The advantage of using calcium hydroxide is that the amount of high purity precipitated calcium carbonate produced is increased by the amount of calcium neutralizing agent used, thus improving process economics. The amount of base added is the amount that is necessary to reach the desired pH value. This reaction with sodium hydroxide is shown in equation 3, below:

$$Fe^{++}+H_2O_2+NaOH \rightarrow Fe(III)(OH)_3(insoluble)+Na^+ \qquad (3)$$

The slurry resulting from equation 3 in reactor 1520 may be filtered with filter 1525 to remove ferric hydroxide solids. In some embodiments, some carbon impurity may also filter out with the ferric hydroxide. In some embodiments, the ferric hydroxide is transferred to calciner 1530 resulting in a ferric oxide product. The filtrate from filter 1525 comprises a purified calcium chloride solution, or a mixed calcium and sodium chloride solution depending on the base used, which may then be combined with sodium carbonate, carbon dioxide, or another soluble carbonate, in reactor 1535 to produce precipitated calcium carbonate. The mixture may proceed through filter 1540 to separate solids and liquids. The solids may proceed through dryer 1545 to produce a white and high purity (>98%) precipitated calcium carbonate product. The precipitation reaction with sodium carbonate is shown in equation 4.

$$Ca(Cl)_2+Na_2CO_3+2NaCl+CaCO_3(insoluble) \qquad (4)$$

The filtrate from filter 1540 may proceed through dryer 1555 to produce sodium chloride.

In some embodiments wherein HCl was used in the acid dissolution calcium carbonate whitening process, the economics of this purification of calcium carbonate can be significantly improved if the resultant NaCl filtrate is regenerated back to NaOH and HCl using a chlor-alkali cell process.

Figure 15:
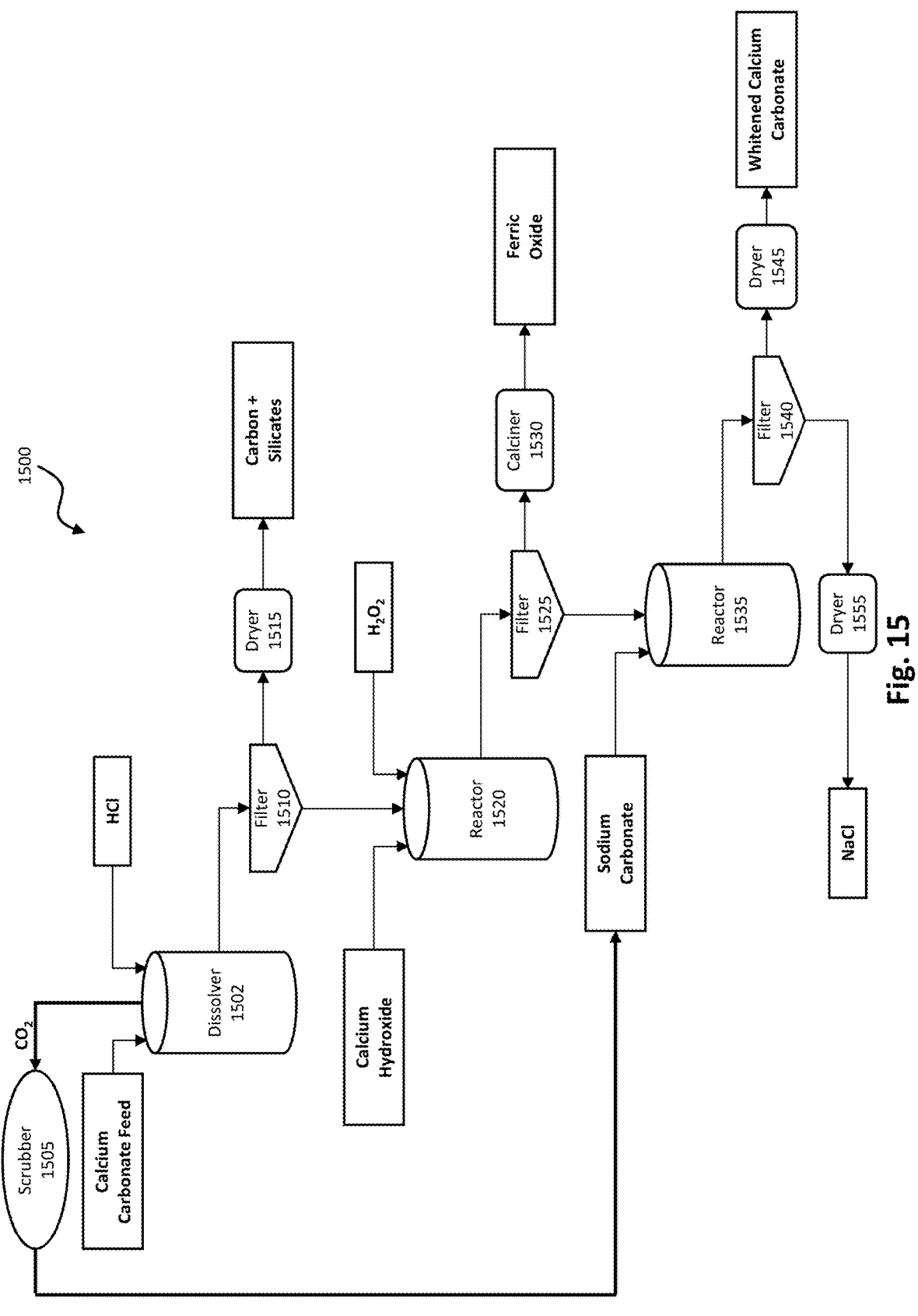
FIG. 15 depicts an embodiment of an acid dissolution calcium carbonate whitening process.
Figure 16:
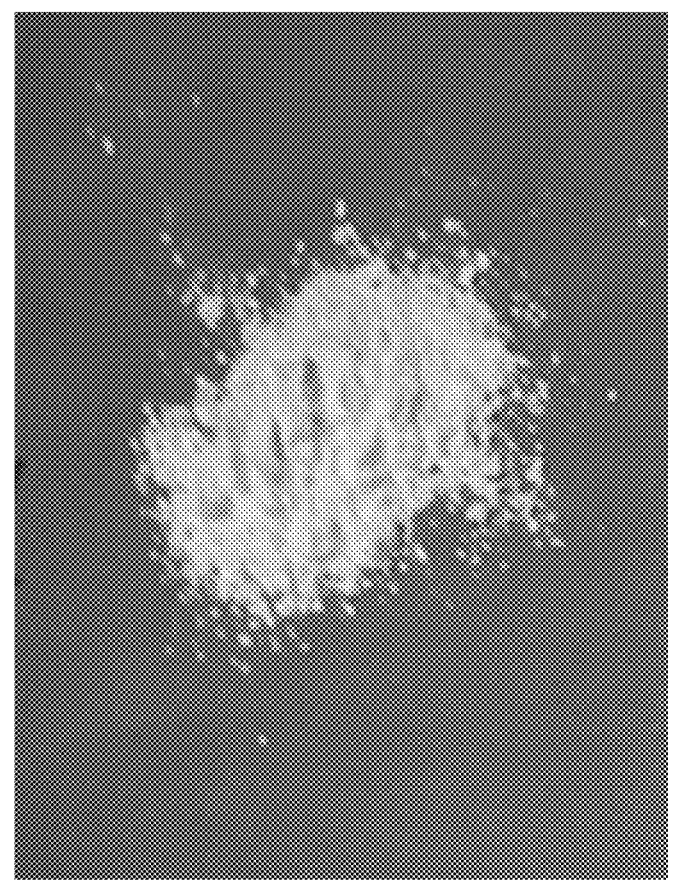
FIG. 16 depicts a whitened calcium carbonate product produced by the calcium carbonate whitening process depicted in FIG. 15.

FIG. 16 depicts a whitened calcium carbonate product generated by the calcium whitening process depicted in FIG. 15.

Catalyst

In some embodiments, a catalyst to delay the formation of calcium carbonate may be added to the reactor cascade 205 (FIG. 2) so that impurities (or impurities plus ash, in some embodiments) may be filtered out before the precipitate is formed. The addition of a catalyst results in a fine white and high purity (>98%) precipitated calcium carbonate product.

FGD gypsum feedstock may comprise contaminants including carbon and/or fly ash, in some embodiments. An example embodiment of a process for using a catalyst to separate impurities from calcium carbonate is depicted in FIG. 17. In some embodiments, a quantity of a catalyst (0.5-7% by weight, in some embodiments) may be added to an FGD gypsum slurry mixture in a reactor 1710 wherein the FGD gypsum slurry mixture comprises a suspension in the range of 1% to 25% (4%, in some embodiments) weight by mass of FGD gypsum feedstock in water. The catalyst is allowed to mix, by means of a stirring mechanism in some embodiments, with the slurry for several minutes (5-30 minutes, in some embodiments). After mixing, an ammonium hydroxide solution may be added to the reactor 1710 resulting in 1:1 ammonium hydroxide to slurry volumetric ratio. This addition of the ammonium hydroxide is immediately followed by the introduction of carbon dioxide gas at a rate of 4 L/minute ±1 L/minute, in some embodiments. The concentration of the ammonium hydroxide solution is chosen to be a concentration that will stoichiometrically react with all of the sulfate in the FGD gypsum slurry to form ammonium sulfate according to equation 5:

$$2NH_4OH+CaSO_4\cdot2H_2O+CO_2\longrightarrow[NH_4]_2SO_4+ \\ CaCO_3+3H_2O \qquad (5)$$

The progress of the reaction can be followed by monitoring the pH which starts out at approximately 11.6 and with time drops to pH 7. At pH 7 all hydroxide has reacted and the solution is filtered (immediately, in some embodiments) through a 0.45 to 0.7 micron filter 1730. Filtration of the reacted FGD gypsum solution results in the separation of tramp fly ash and carbon from the resulting liquid comprising dissolved calcium carbonate and ammonium sulfate. The calcium carbonate in solution will separate from the ammonium sulfate solution in delay holding tank 1735 and can be collected by an additional filtration step 1740 using a 0.45 to 0.7 micron. In some embodiments, one or more of the filtration steps may be carried out using a filter composed of glass fibers.

The precipitation of calcium carbonate may be aided by seeding the solution with the desired crystalline form of calcium carbonate. In some embodiments, a small amount of product slurry may be recycled back to the reactor cascade 205 (FIG. 2). The seeds may be calcite. In some embodiments, the CaCO₃ precipitate may be so fine it is nano-sized. In some embodiments, the solution containing the CaCO₃ may be heated to cause the CaCO₃ precipitate to coagulate to improve filtration. This process also allows a wider range of feedstocks such as FGD gypsum feedstock mixed with ash. The solution passing filtration step 1740 contains the ammonium sulfate which can be harvested by various crystallization methods known in the art. In some embodiments, a catalyst is used to slow down the precipitation of calcium carbonate in order to allow the solution to be filtered. Some of the catalyst may remain in the ammonium sulfate solution and/or the crystallized product. The catalyst does not react with the reactants therefore it may be recaptured and/or recycled, in some embodiments.

In some embodiments, the filtered ammonium sulfate solution may be returned to the beginning of the process to make up the FGD gypsum feedstock slurry. In some embodiments, the appropriate concentration of catalyst may remain in the recycled solution such that no further addition of the catalyst is necessary. In some embodiments, makeup catalyst may be added to the solution as needed.

The calcium carbonate whitening process with catalyst can also be performed in the production plant embodiment shown in FIG. 2 with some modifications. For instance, referring to FIG. 2, the calcium carbonate whitening process with catalyst may plug in in the place of filter 220. Reacted slurry from the reactor cascade 205 would proceed into reactor 1710 (FIG. 17) through the process depicted in FIG. 17 with the liquor from filter 1740 (FIG. 17) proceeding to evaporator 230 and the whitened calcium carbonate optionally proceeding through dryer 225. In some embodiments, the catalyst may be added to the reactor cascade directly and the reacted slurry with catalyst may proceed from the reactor cascade 205 to filter 1730 (FIG. 17) (i.e. reactor cascade 205 from FIG. 2 replaces reactor 1710 in FIG. 17).

Ash Conversion Systems and Methods

Described herein are systems and methods for generating valuable products from coal ash with near-zero waste. The systems and methods disclosed herein are unique in that they are the first demonstrated systems and methods that can convert coal ash feedstock (and other metal-bearing feedstocks) into marketable products of high value with near-zero waste.

The ash conversion process begins with a leach process. A leach process, in some embodiments, involved contacting, passing, and/or percolating an acid through a feedstock. In some embodiments, the leach process may be performed in one or more stages using one or more different acids or different concentrations of the same acids. In an exemplary embodiment, the leach process is performed in two-stages using different concentrations of hydrochloric acid.

In some embodiments, elements and/or compounds in leachate resulting from the leach process in the ash conversion process may then be further separated by selective precipitation at one or more different pHs. pH adjustments may be made to the leachate using a base such as calcium hydroxide (lime) or sodium hydroxide (caustic), or both in separate steps. Potassium and ammonium hydroxides are other possible bases that may be utilized for pH adjustment of the leachate. After each precipitation, the precipitate is separated by filtration and the filtrate proceeds to the next pH adjustment and precipitation. In some embodiments, one or more of hydroxides of iron, aluminum, mischmetals (rare earth elements (REEs) and transition metals), magnesium, and calcium may be separated sequentially. In some embodiments, the separations are quite clean and high purities (greater than 90%) may be obtained. Depending on the base(s) used in pH adjustments to the leachate, the final liquor at the end of the ash conversion process may comprise clean sodium chloride, resulting in near-zero waste streams.

Figure 18:
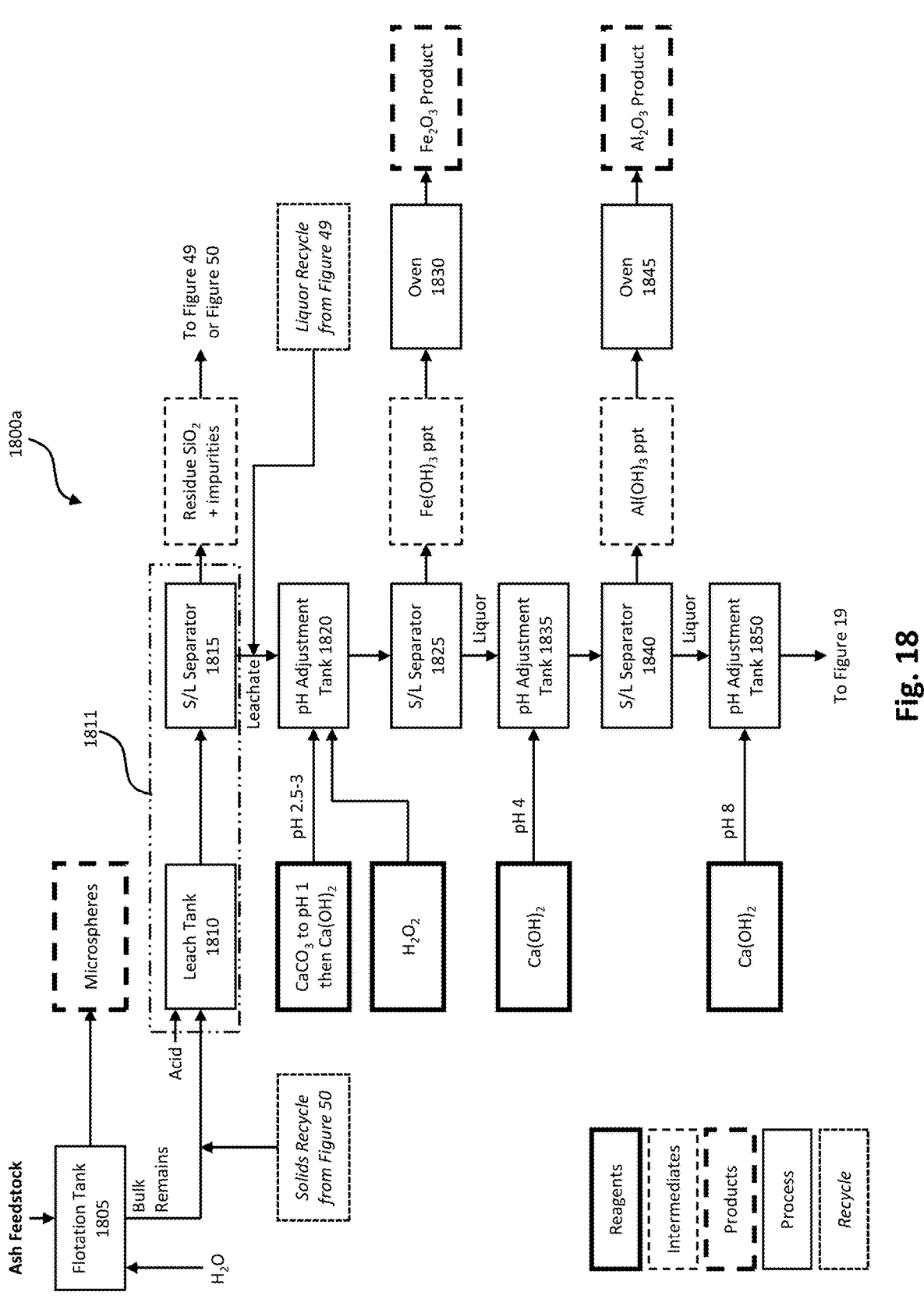
FIG. 18 depicts a lime embodiment of an ash conversion system and process.
Figure 19:
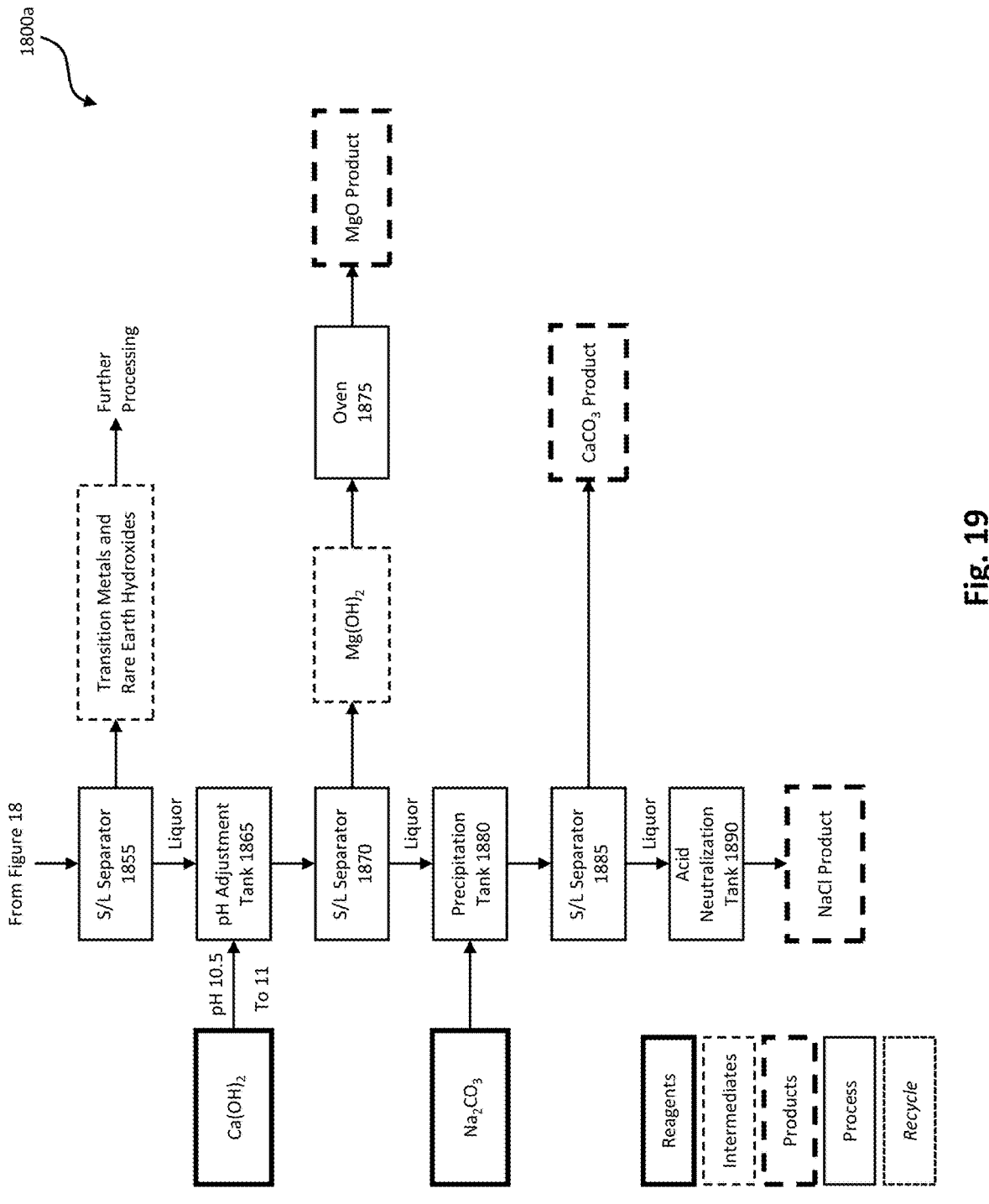
FIG. 19 is a continuation of the FIG. 18 flowsheet.
Figure 20:
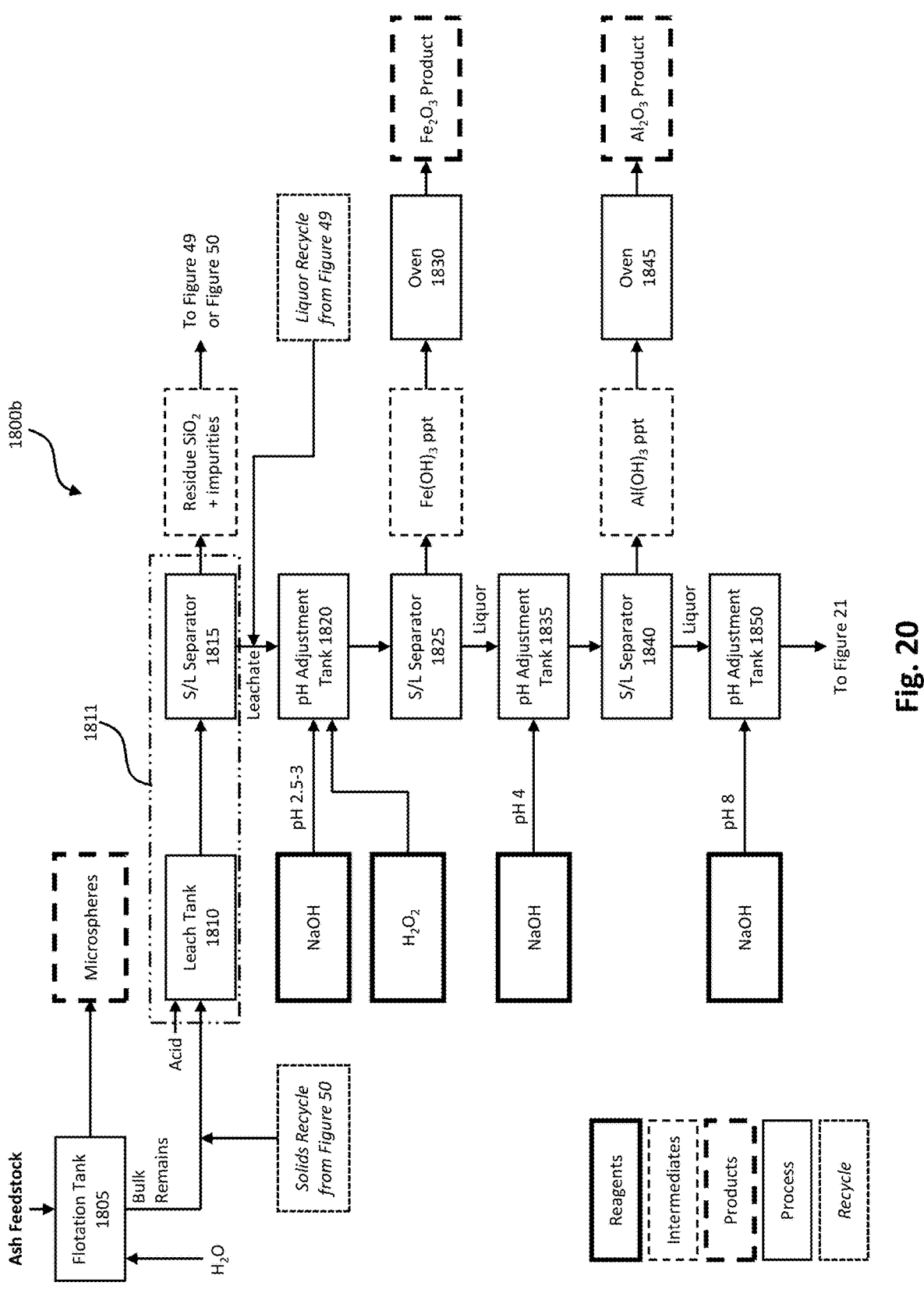
FIG. 20 depicts a caustic embodiment of an ash conversion system and process.
Figure 21:
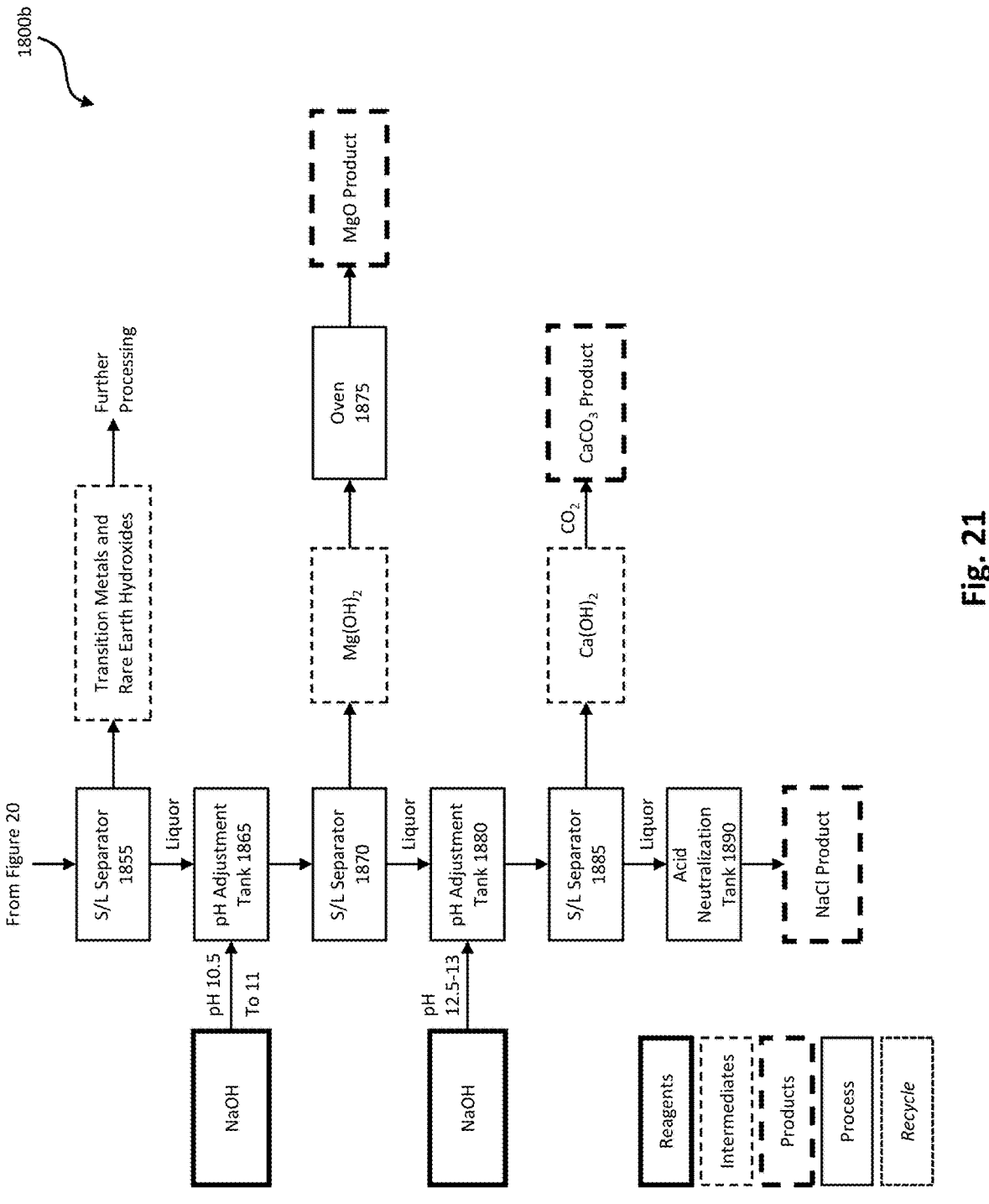
FIG. 21 is a continuation of the FIG. 20 flowsheet.
Figure 31:
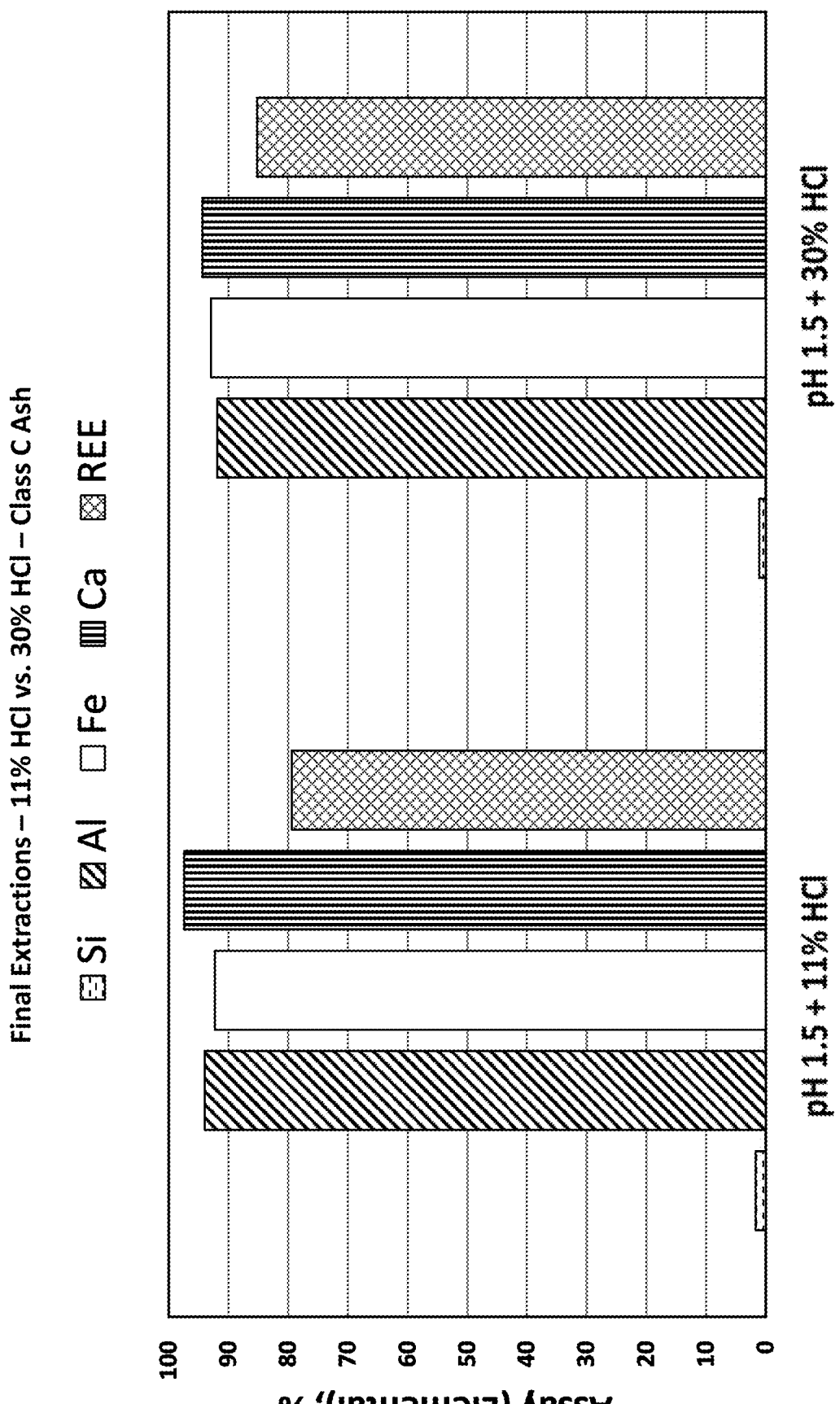
FIG. 31 graphically depicts 11% versus 30% hydrochloric acid leachates for class C ash feedstock.
Figure 32:
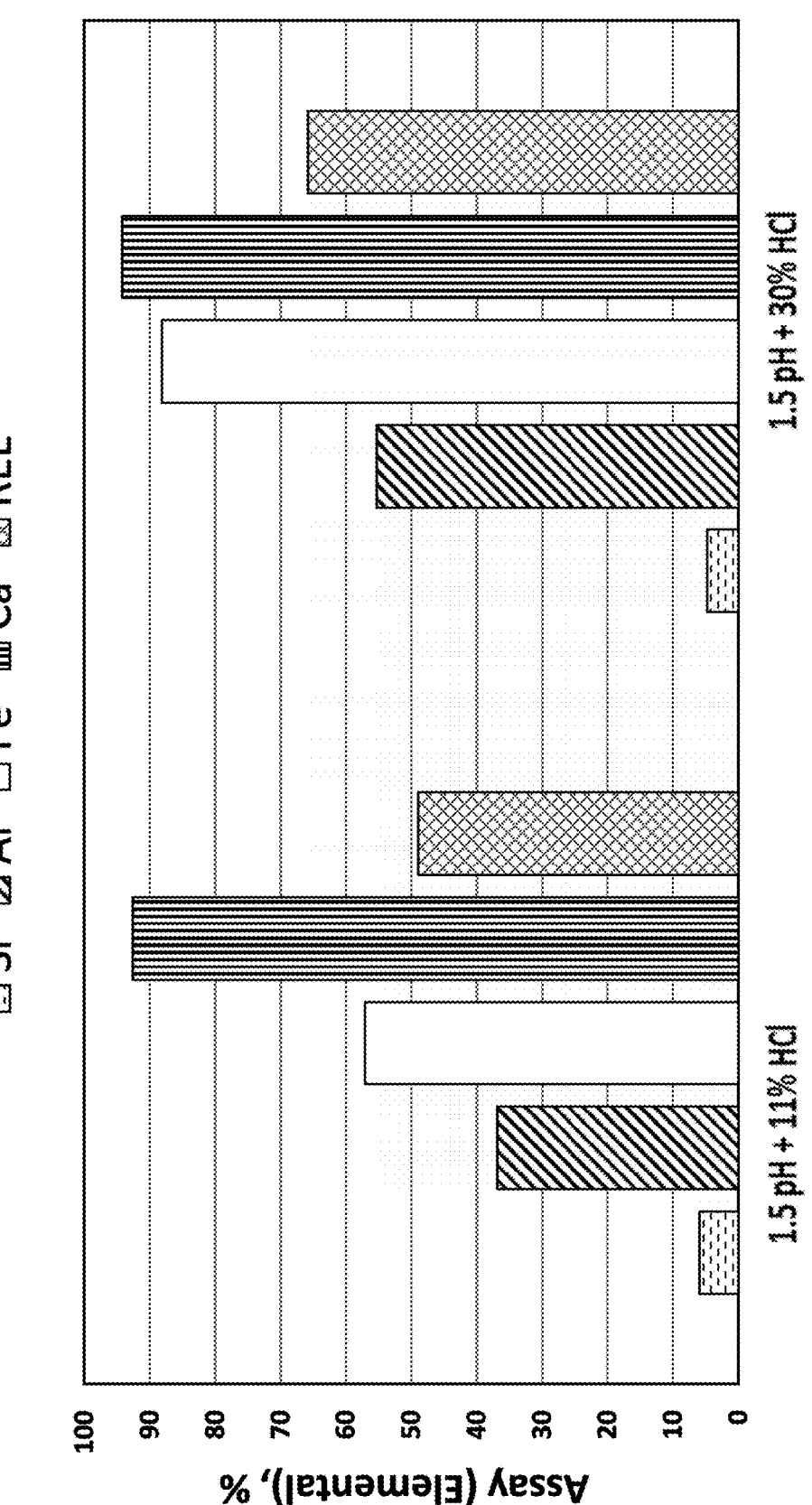
FIG. 32 graphically depicts 11% versus 30% hydrochloric acid leachates for class F ash feedstock.
Figure 33:
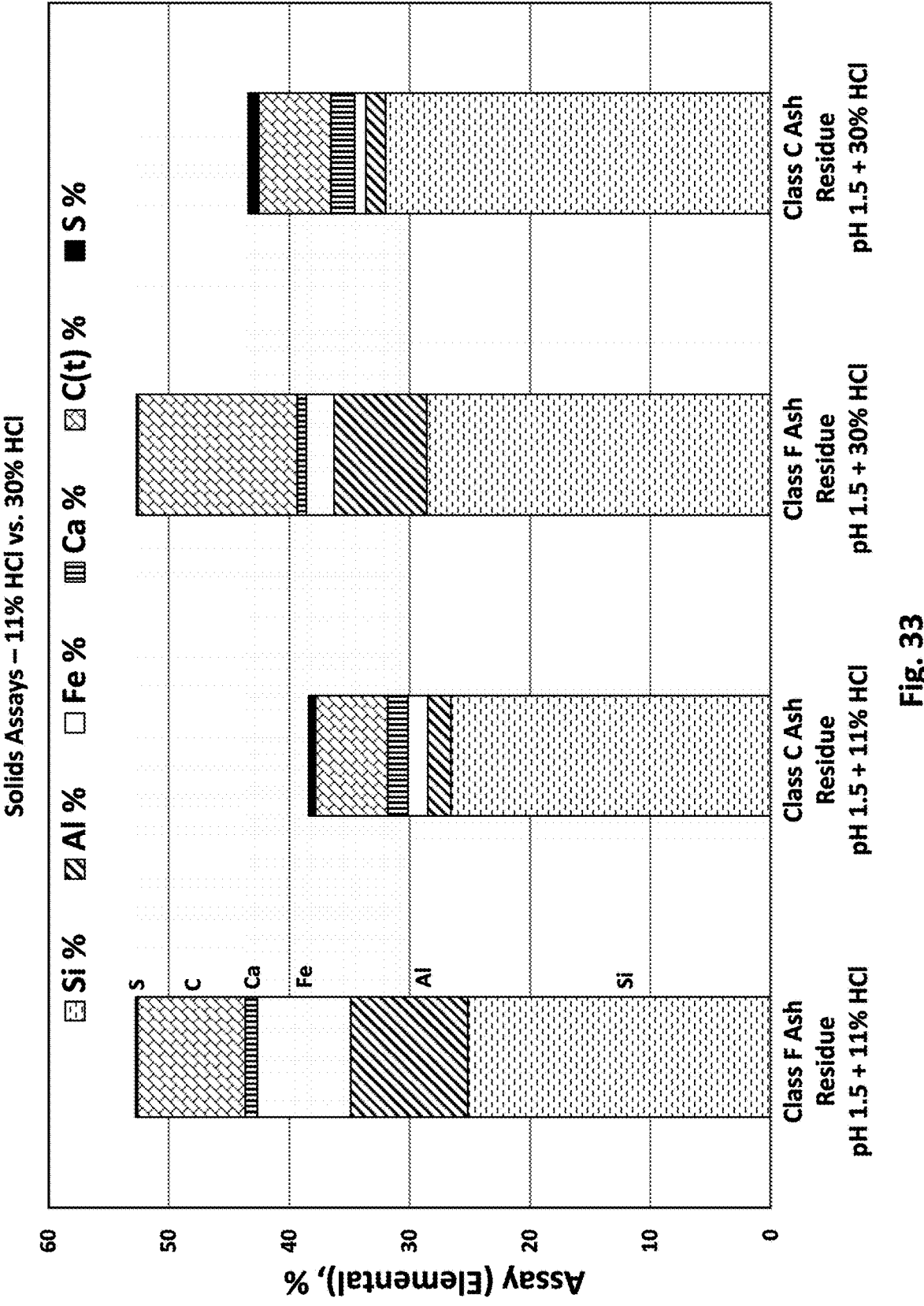
FIG. 33 graphically depicts elemental composition of 11% versus 30% hydrochloric acid residues for class C ash and class F ash feedstocks from FIGS. 28 and 29 leaches.

FIGS. 18 through 21 depict embodiments of an ash conversion system and method for producing valuable products from an ash feedstock with near zero waste. FIGS. 18 and 19 depict a lime embodiment of the ash conversion system and method and FIGS. 20 and 21 depict a caustic embodiment of the ash conversion system and method. In some embodiments, the ash feedstock is powdered. In some embodiments, the ash feedstock is slurried.

Lime Embodiment

FIGS. 18 and 19 depict a lime embodiment 1800*a* of the ash conversion system and method for producing valuable products from an ash feedstock with near-zero waste. In the depicted embodiment, ash feedstock is first floated with water in flotation tank 1805 to remove microspheres which can be marketed as a product. In some embodiments, microspheres make up 1-2% of the ash feedstock. The remainder of the ash feedstock, with optional solids recycle from a silica fusion process depicted in FIG. 50, proceeds to leach tank 1810 in leach process 1811. Leaching may be completed in one or two stages using one or more different acids or different concentrations of the same acids resulting in leached ash feedstock. In some embodiments, leaching is performed in two-stages with hydrochloric acid (HCl) of differing concentrations. The leach process 1811 is disclosed in more detail using examples and experimental data under the Examples heading and in FIG. 35.

Still referring to FIG. 18, the leached ash feedstock is separated in solid/liquid separator 1815 resulting in solids, comprising silica and other impurities in some embodiments, and liquor. The solids may proceed to either FIG. 49 or FIG. 50 for further processing. The liquor from solid/liquid separator 1815, along with optional liquor recycle from FIG. 49 proceeds to a pH adjustment tank 1820 where pH is adjusted to precipitate particular components. In the depicted embodiment, the pH is first adjusted to pH 1 using calcium carbonate ($CaCO_3$) then to between pH 2.5 to 3 using calcium hydroxide ($Ca(OH)_2$ or lime). Hydrogen peroxide ($H_2O_2$) may also be added to the pH adjustment tank 1820 to convert ferrous iron to ferric iron. The pH adjusted solution from pH adjustment tank 1820 proceeds to solid/liquid separator 1825 resulting in solids comprising predominantly iron hydroxide ($Fe(OH)_3$) precipitate and liquor. The $Fe(OH)_3$ may be marketed as-is or calcined in an oven 1830 (at 300° C., in some embodiments) with air circulation to iron oxide (alpha-$Fe_2O_3$). The liquor from solid/liquid separator 1825 proceeds to a second pH adjustment tank 1835 where the pH is adjusted to pH 4 using $Ca(OH)_2$, in the depicted embodiment. The pH adjusted solution from pH adjustment tank 1835 proceeds to solid/liquid separator 1840 resulting in solids comprising predominantly aluminum hydroxide ($Al(OH)_3$) and liquor. The $Al(OH)_3$ can be marketed as-is or calcined in an oven 1845 (at 250° C., in some embodiments) to alumina ($Al_2O_3$). The liquor from solid/liquid separator 1840 proceeds to a third pH adjustment tank 1850 where the pH is adjusted to pH 8 using $Ca(OH)_2$, in the depicted embodiment. The pH adjusted solution from pH adjustment tank 1850 proceeds to FIG. 19.

FIG. 19 is a continuation of FIG. 18. The pH adjusted solution from the third pH adjustment tank 1850 proceeds to solid/liquid separator 1855 resulting in solids comprising predominantly rare earth hydroxides and some transition metals. The transition metals and rare earth hydroxides may be sold as-is or may proceed to further separation/processing disclosed in more detail under the Products heading. The liquor from solid/liquid separator 1855 proceeds to a fourth pH adjustment tank 1865 where the pH is adjusted to pH 10.5 to 11 using $Ca(OH)_2$, in the depicted embodiment. The pH adjusted solution from pH adjustment tank 1865 proceeds to solid/liquid separator 1870 resulting in solids comprising predominantly magnesium hydroxide ($Mg(OH)_2$) and liquor. The $Mg(OH)_2$ may be marketed as-is or may be calcined in an oven 1875 (at 250° C., in some embodiments) to magnesium oxide (MgO). The liquor from solid/liquid separator 1870, which contains calcium ions, proceeds to precipitation tank 1880 where a stoichiometric amount of sodium carbonate ($Na_2CO_3$) is added to precipitate calcium carbonate. The solution from the precipitation tank 1880 proceeds to solid/liquid separator 1885 resulting in solid calcium carbonate ($CaCO_3$) and a liquor. The total calcium carbonate produced is the sum of the calcium in the ash feed plus the lime reagent ($Ca(OH)_2$) used for pH adjustment. The liquor from solid/liquid separator 1885 proceeds to an acid neutralization tank 1890 where the hydroxides used in the solid/liquid separation steps (1815, 1825, 1840 FIGS. 18 and 1855, 1870, 1885 FIG. 19) are neutralized to pH 7 with HCl. The final product is sodium chloride (NaCl) and may be marketed as a solution (brine) or the NaCl salt may be crystallized out of the solution using a crystallizer or spray dryer (not depicted).

Caustic Embodiment

The caustic embodiment 100*b* (FIGS. 20 and 21) of the ash conversion process comprises essentially the same steps and equipment as the lime embodiment 100*a* (FIGS. 18 and 19) of the ash conversion process with the primary difference being in the reagent used in pH adjustment steps. In the caustic embodiment, caustic (NaOH) is used in place of lime ($Ca(OH)_2$ in the pH adjustment steps. In some embodiments, the NaOH may be 20%.

FIGS. 20 and 21 depict a caustic embodiment 1800*b* of the ash conversion system and method for producing valuable products from an ash feedstock with near-zero waste. In the depicted embodiment, ash feedstock is first floated with water in flotation tank 1805 to remove microspheres which can be marketed as a product. In some embodiments, microspheres make up 1-2% of the ash feedstock. The remainder of the ash feedstock, with optional solids recycle from a silica fusion process depicted in FIG. 50, proceeds to leach tank 1810 in leach process 1811. Leaching may be completed in one or two stages using one or more different acids or different concentrations of the same acids resulting in leached ash feedstock. In some embodiments, leaching is performed in two-stages with hydrochloric acid (HCl) of differing concentrations. The leach process 1811 is disclosed in more detail using examples and experimental data under the Examples heading and in FIG. 35.

Still referring to FIG. 20, the leached ash feedstock is separated in solid/liquid separator 1815 resulting in solids, comprising silica and other impurities in some embodiments, and liquor. The solids may proceed to either FIG. 49 or FIG. 50 for further processing. The liquor from solid/liquid separator 1815, along with optional liquor recycle from FIG. 49 proceeds to a pH adjustment tank 1820 where pH is adjusted to precipitate particular components. In the depicted embodiment, the pH is adjust to 2.5-3 using sodium hydroxide (NaOH or caustic). Hydrogen peroxide ($H_2O_2$) may also be added to the pH adjustment tank 1820 to convert ferrous iron to ferric iron. The pH adjusted solution from pH adjustment tank 1820 proceeds to solid/liquid separator 1825 resulting in solids comprising predominantly iron hydroxide ($Fe(OH)_3$) precipitate and liquor. The $Fe(OH)_3$ may be marketed as-is or calcined in an oven 1830 (at 300° C., in some embodiments) with air circulation to iron oxide (alpha-$Fe_2O_3$). The liquor from solid/liquid separator 1825 proceeds to a second pH adjustment tank 1835 where the pH is adjusted to pH 4 using NaOH, in the depicted embodiment. The pH adjusted solution from pH adjustment tank 1835 proceeds to solid/liquid separator 1840 resulting in solids comprising predominantly aluminum hydroxide (Al (OH)$_3$) and liquor. The Al(OH)$_3$ can be marketed as-is or calcined in an oven 1845 (at 250° C., in some embodiments) to alumina (Al$_2$O$_3$). The liquor from solid/liquid separator 1840 proceeds to a third pH adjustment tank 1850 where the pH is adjusted to pH 8 using NaOH, in the depicted embodiment. The pH adjusted solution from pH adjustment tank 1850 proceeds to FIG. 21.

FIG. 21 is a continuation of FIG. 20. The pH adjusted solution from the third pH adjustment tank 1850 proceeds to solid/liquid separator 1855 resulting in solids comprising predominantly rare earth hydroxides and some transition metals. The transition metals and rare earth hydroxides may be sold as-is or may proceed to further separation/processing disclosed in more detail under the Products heading. The liquor from solid/liquid separator 1855 proceeds to a fourth pH adjustment tank 1865 where the pH is adjusted to pH 10.5 to 11 using NaOH, in the depicted embodiment. The pH adjusted solution from pH adjustment tank 1865 proceeds to solid/liquid separator 1870 resulting in solids comprising predominantly magnesium hydroxide (Mg(OH)$_2$) and liquor. The Mg(OH)$_2$ may be marketed as-is or may be calcined in an oven 1875 (at 250° C., in some embodiments) to magnesium oxide (MgO). The liquor from solid/liquid separator 1870 proceeds to a fifth pH adjustment tank 1880 where the pH is adjusted to between 12.5-13 using NaOH, in the depicted embodiment. The pH adjusted solution from pH adjustment tank 1880 proceeds to solid/liquid separator 1885 resulting in solid calcium hydroxide (Ca(OH)$_2$) and liquor. In some embodiments, sodium carbonate may be added to the liquor from 1885 to precipitate traces of barium and strontium before neutralization in tank 1890. The Ca(OH)$_2$ may be converted to calcium carbonate (CaCO$_3$) with the addition of CO$_2$. The liquor from solid/liquid separator 1885 proceeds to an acid neutralization tank 1890 where the hydroxides used in the solid/liquid separation steps (1815, 1825, 1840 FIG. 20 and 1855, 1870, 1885 FIG. 21) are neutralized to pH 7 with HCl. The final product is sodium chloride (NaCl) and may be marketed as a solution (brine) or the NaCl salt may be crystallized out of the solution using a crystallizer or spray dryer (not depicted). In some embodiments of the caustic flowsheet, the final calcium precipitation is not performed, and the final product is a sodium chloride/calcium chloride blend.

Process Equipment Options

The solid/liquid separators depicted in FIGS. 18 through 21 may be any one or more of centrifuges, disc, pan, belt, or drum filters, or other solid/liquid separators. To help coagulation of the precipitate and ease filtration, techniques such as heating or seeding with recycled product (10-30%) could be used. Calcine temperatures may be between 250° C. and 300° C. Material transfer between processes/equipment may be carried out with the use of pumps, etc.

Feedstocks

The ash conversion systems and methods disclosed herein are capable of being applied to waste streams other than coal ash such as red mud waste from the bauxite (comprising Fe$_2$O$_3$, Al$_2$O$_3$, SiO$_2$, CaO, Na$_2$O, TiO, K$_2$O and MgO) in the synthesis of aluminum, slag from the steel furnaces (comprising CaO, SiO$_2$, Al$_2$O$_3$, FeO, and MgO), municipal incinerator solid waste, acid mine drainage, mine tailings, and other metal bearing waste streams, because of their similar compositions. Some variations in type and composition of feedstock may require additional or fewer processing steps. In some embodiments, feedstock may require grinding to reduce particle size prior to processing in the ash conversion process. The feedstock may be in powder form wherein powder is a bulk solid composed of many very fine particles. In some embodiments, feedstock may need to be dispersed in slurry prior to processing in the ash conversion process. The feedstock may be a slurry of metal-bearing solids suspended in liquid.

Products

The products are generally 1) silica, 2) ferric oxide, 3) aluminum oxide, 4) a mixture of REE and transition elements that are concentrated between 20 to 100-fold from the original coal ash, 5) magnesium oxide, 6) calcium carbonate, and 7) sodium chloride. The oxides originally precipitate as hydroxides and may optionally be marketed as such. In some embodiments, the hydroxides may be converted to carbonates using reactants such as carbon dioxide. In some embodiments, manganese may be precipitated between the REEs and the magnesium at a pH of 9.

The leach residue from solid/liquid separator 1815 (FIGS. 18 and 20) is predominantly amorphous and crystalline silica, technical grade, which has commercial applications. Commercial applications for the silica product include: as additives in tires, elastomers, and plastics; in the construction industry as an anti-caking agent; for sand casting for manufacture of metallic components; and for use in glass-making and ceramics. The value improves with higher purity, smaller particle size, and larger surface areas. With some ash feedstocks, the silica also contains some aluminum silicate such as fibrous mullite or high aspect ratio mullite. This mullite could have its own intrinsic high value for uses in high temperature applications as in ceramic-in-ceramic fiber reinforcements for ceramic engines.

Ferric oxide is used primarily as a pigment in paints, glazes, coatings, colored concrete, mulches, mordant, coating for magnetic recording tapes, the manufacturing of polishing compounds and as an abrasive for glass, precious metals, and diamonds.

Aluminum hydroxide is often used as a feedstock for the manufacture of other aluminum compounds and in the manufacture of abrasives, water-proofing, water treatment, and as a filter medium. Additional uses include the manufacture of aluminosilicate glass, a high melting point glass used in cooking utensils and in the production of fire clay, pottery, and printing ink. Aluminum oxide is often used in glass, water purification, paint, and as a filler in plastics and cosmetics.

Magnesium hydroxide is used in the waste water treatment process; as a flame or fire retardant filler; as a fuel additive to treat heavy fuel oils; as well as in the ceramic glazing process. Magnesium oxide is used as an anticaking agent in foods, in ceramics to improve toughness, and in optics. Magnesium carbonate is used in fireproofing, a smoke suppressant in plastics, and a reinforcing agent in rubber.

Calcium carbonate has a plethora of uses in many diverse industries including: the oil and gas industry as drilling fluid make-up to increase the fluid density, as an additive to control fluid loss to formation, the oilfield cementing industry as a loss circulation material; the building materials and construction industry for roofing shingles, tiles, cement, brick, and concrete block manufacture; and commercial applications such as industrial filler in the paper, paint, plastics, and rubber industries.

Sodium chloride solution is used in a myriad of industrial applications. It is used in the chlor-alkali process, the process to produce chlorine and sodium hydroxide (see Examples for more detail). It is also widely used as a de-icing and anti-icing agent in winter climate road applications and as a dust suppressant in many mining operations. Crystallization of sodium chloride solution will produce dry sodium chloride crystals, commonly referred to as salt. Sodium chloride crystals are used across oil and gas exploration activities as an additive to drilling fluids as well as cementing operations, in the pulp and paper industry as a bleaching product for wood pulp, in the water softening industry, swimming pool chemical industry as pool salt and in a great number of other industrial applications.

EXAMPLES

Preliminary Testing

Class F ash feedstock from Northern Appalachian coal and class C ash feedstock from Powder River Basin Coal were used in preliminary testing of the ash conversion process to ensure wide applicability. Class C ash feedstock contains more calcium and less silica while class F ash feedstock contains less calcium and more silica and is more difficult to acid leach. FIGS. 22 through 24 depict the compositions (elemental composition as well as mineral compounds by XRD) of the class F and class C ash feedstocks used in preliminary testing of the ash conversion process.

Leach Process Testing

Several different acid lixiviant combinations were tested in initial leach scout testing to determine the best acid lixiviants to obtain the largest extraction of all the elemental components in the ash feedstock, except for silica which is left as a marketable residue. The acid lixiviants used in initial leach scouting tests were nitric acid, hydrochloric acid, sulfuric acid, sulfuric with sodium fluoride and calcium fluoride, 6N aqua regia, and strong caustic. After the initial leach scouting tests, the following leach tests were performed on both class F and class C ash feedstocks: 6N aqua regia (HCl & $HNO_3$) (FIG. 25), 6N $H_2SO_4$+0.006N NaF (FIG. 26), 6N $H_2SO_4$+0.05% $CaF_2$ (FIG. 27), 2-stage HCl pH 1.5 then 11% HCl (FIG. 28), and 2-stage HCl pH 1.5 then 30% HCl (FIG. 29). All leach tests were performed at 90° C., a solids ratio of 14%, and five sampling times, 0.5, 1, 2, 4, and 6 hours. The results depicted in FIGS. 25 through 27 are for 6 hour sample times and FIGS. 28 through 29 are for four hour each stage sample times. 90° C. is the maximum temperature without boiling the solution and, theoretically, should result in maximum dissolution. All leachates and residues from leach testing were analyzed compositionally and mineralogically.

The leach test procedure described below is for exemplary purposes only and should not be considered limiting.

1. Prepare initial lixiviant solution in a reactor (all in a fumehood, in some embodiments). Slowly add the ash feedstock solids (200 g) to the solution a few grams at a time. Target 14% solids.
2. Equip reactor with a lid and condenser, agitate pulp with a mixer and impellor.
3. Heat to target temperature (90° C.) with heating mantle or other heating method. Time zero occurs when target temperature is achieved.
4. Collect pulp samples of about 40 mL at different time intervals to determine the effect of time on leaching. Record net weight, filter, collect the filtrate, and record key data. Return solids to reactor. Keep filtrate for assay.
5. After required test time, record the net pulp weight, filter and collect filtrate, record filtration properties (time, color, paper type, etc.), determine weight, specific gravity, pH, and oxidation reduction potential (ORP).
6. Re-pulp the residue with the target amount of wash water (200 mL).
7. Displacement wash three times with 70 mL water. Displacement washing may be done two to four times in water.
8. Collect the combined wash liquors, record filtration properties (time, color, paper type, etc.), determine weight, specific gravity, pH, and ORP.
9. Dry solids at 95° C. or lower until weight of solids remains constant.
10. Submit samples for assay.

Leach test results are labeled as poor, good, or excellent. Poor results are when less than 65% dissolution is achieved for the target elements, good results are when 65% to 90% dissolution is achieved, and excellent results are when 90% to 100% dissolution is achieved.

FIG. 25 is a table depicting leach test results of class F and class C ash feedstocks using 3:1 6N hydrochloric acid (HCl) to 6N nitric acid ($HNO_3$) for 6 hours. FIG. 25 indicates good leaching results but the reaction was very vigorous and NOx fumes were liberated. The 6N aqua regia was found to be effective for the more difficult to dissolve class F ash feedstock; however, the aqua regia adds nitrate to the final sodium chloride product of the ash conversion process which is not ideal because it results in a sodium chloride/sodium nitrate mixture which is more difficult to market than sodium chloride.

FIG. 26 is a table depicting leach test results of class F and class C ash feedstocks using 6N sulfuric acid ($H_2SO_4$) and 0.006N sodium fluoride (NaF). This reaction forms insoluble sulfates with calcium so it remains with the insoluble silica. Class F ash feedstock dissolution was poor.

FIG. 27 is a table depicting leach test results of class F and class C ash feedstocks using 6N sulfuric acid ($H_2SO_4$) and 0.05% calcium fluoride ($CaF_2$). This testing had similar results to FIG. 26 (6N sulfuric acid and 0.006N sodium fluoride).

FIG. 28 is a table depicting leach test results of class F and class C ash feedstocks using HCl to pH 1.5 in a first stage then 11% HCl in a second stage. The dissolution of the class C ash feedstock was excellent but class F ash feedstock did not perform as well. Most of the calcium dissolves in the first stage at pH 1.5. There is improved dissolution at the higher acid concentration for the other major elements. Dissolution continued to improve with time.

FIG. 29 is a table depicting leach test results of class F and class C ash feedstocks using HCl to pH 1.5 in a first stage then 30% HCl in a second stage. The class F ash feedstock had much better dissolution at 30% HCl in the second stage compared to the 11% HCl in FIG. 11. The class C ash feedstock dissolution, on the other hand, only improved slightly compared to the 11% HCl second stage in FIG. 28. The class F ash feedstock showed that the leaching improved with time.

FIG. 30 is a table depicting leach test results for continuing the second-stage (30% HCl) leach of FIG. 29 for class C ash feedstock for 24 hours. The longer leach test time improved dissolution for all elements and results in improved quality of silica residue.

It should be noted that better extractions are obtained by leaching for longer times (up to 24 hours was tested) and can be used to optimize the dissolution. In theory, leaching times in excess of 24 hours are feasible but further increases in dissolution of the elements reduces exponentially over time.

Comparisons of the leach test results between 11% HCl and 30% HCl on both class F and class C ash feedstocks are shown in FIGS. 31 through 34. The results for class F ash feedstock shows that the 30% acid is significantly more effective than the 11% acid. However, the benefit for class C ash feedstock is minor, therefore the 11% is a better selection from a reagent consumption consideration since the acid(s) used in the leaching step need to be neutralized in the next process steps with the addition of lime (FIGS. 18-19) or caustic (FIGS. 20-21), in some embodiments. For a lime production plant 1800a (FIGS. 18-19) and a caustic production plant 1800b (FIGS. 20-21), in some embodiments, concentrations around 30% HCl may be used for class F ash feedstocks and around 11% HCl for class C ash feedstocks.

Figure 35:
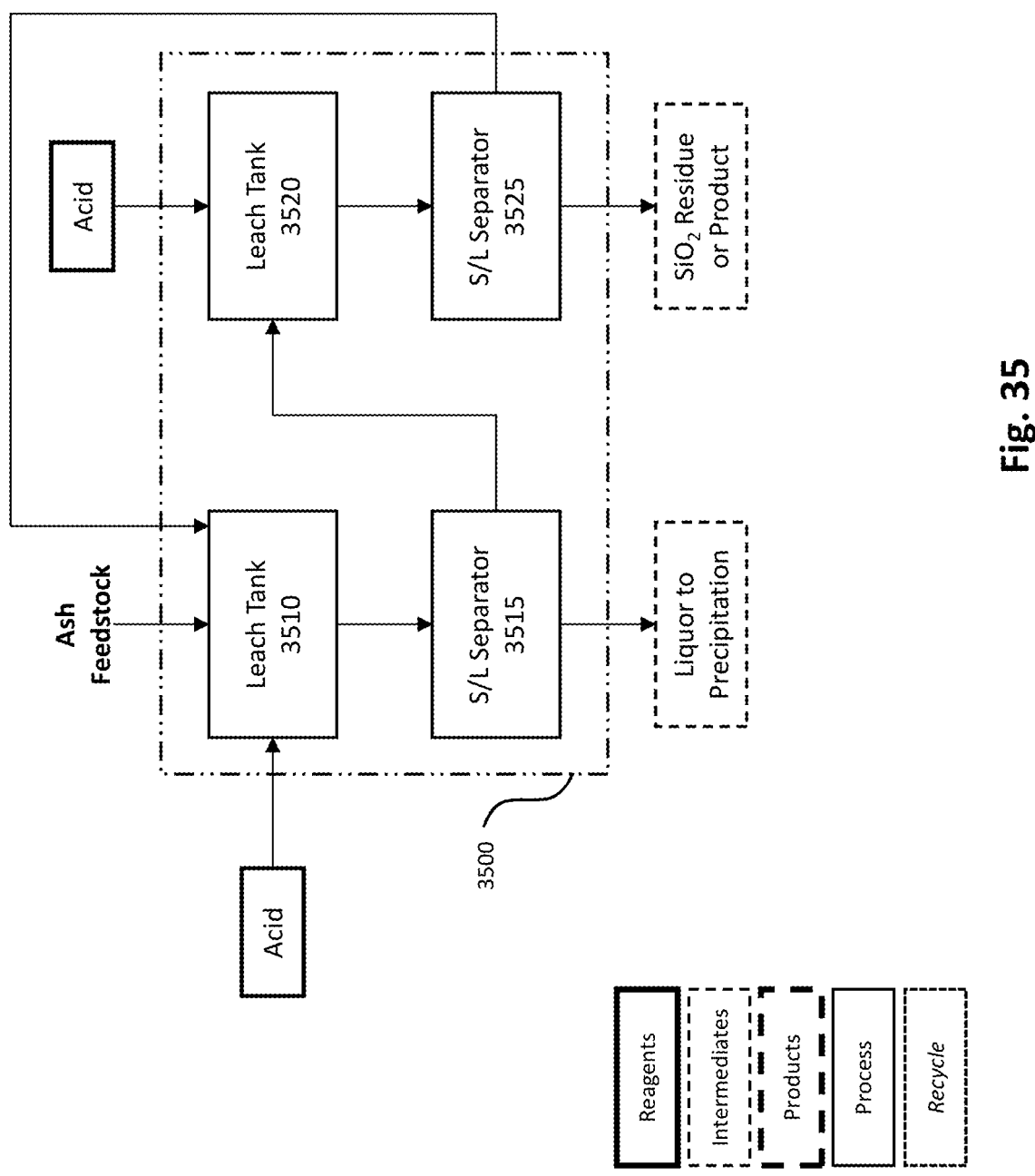
FIG. 35 is a flowsheet depicting a two-stage leach embodiment.

FIG. 35 depicts a two-stage leach process 3500. This process may replace the single stage leach process 1811 depicted in FIGS. 18 and 20. In the two-stage leach process 3500, ash feedstock enters a first leach tank 3510 where it is leached with acid resulting in a first leachate. The first leachate proceeds to solid/liquid separator 3515 resulting in a liquor which proceeds to precipitation steps and a residue. The residue proceeds to a second leach tank 3520 resulting in a second leachate. The second leachate proceeds to solid/liquid separator 3525 resulting in a silica residue or product and a liquor. The liquor from solid/liquid separator 3525 is routed back to the first leach tank 3510. In some embodiments, the acid used in the first leach tank 3510 is HCl to pH 1.5. In some embodiments, the acid in the second leach tank is 11%-30% HCl.

X-ray Diffraction (XRD) patterns together with elemental analysis showed the final residues from the preliminary leach tests were primarily amorphous silica with minor amounts of crystalline silica, silicates (mullite), barite, phosphates, and titanates. The final residues from preliminary leach tests were grey in color due to a carbon impurity. Depending on the composition of the ash feedstock, residues may not have carbon impurities or may comprise other impurities. The silica residue may be calcined at 600° C. or higher to burn off all the carbon resulting in an off-white silica product with potentially improved market value over silica containing carbon impurities. These final residues can be further purified by an additional leaching in 30% HCl for 24 hours. The leachate may be combined with the other leachates and recycled through the ash conversion process, in some embodiments.

Precipitation Testing

In precipitation testing the liquors that resulted from leach testing were separated into value-added, marketable products. The separation was accomplished by adjusting the pH of the acidic solution using sodium hydroxide in precipitation testing. Calcium hydroxide, sodium carbonate, potassium hydroxide, or ammonium hydroxide may also be used to neutralize the acid. Sharp separations of numerous metals can be obtained by careful adjustment of the pH values. The general reactions are as follows:

$$MCl+NaOH \rightarrow MOH \text{ (insoluble)}+NaCl \text{ (M is a metal or non-metal cation)} \quad (1)$$

One adjustment that may be made prior to the first precipitation is to add hydrogen peroxide to oxidize ferrous ion to ferric ion. As shown in FIGS. 18-21 the sequence of precipitates is: Fe, Al, REEs and transition metals, Mg, and Ca for ash feedstock.

The precipitation test procedure described below is for exemplary purposes only and should not be considered limiting.

1. Add required amount of leachate feed solution (3000 mL) into a reactor (all in a fumehood, in some embodiments).
2. Prepare sufficient quantity (enough to increase the pH to the desired value) of neutralizing reagent (NaOH or $CaCO_3/Ca(OH)_2$) concentrated and dilute.
3. Equip reactor with lid; agitate pulp with mixer and impellor. pH, temperature, and ORP probes used.
4. No heat input required. Slowly begin to add neutralizing base reagent a few grams at a time. Use the more dilute reagent closer to the target pH. Time zero occurs when target pH is first achieved. Hold for one hour at target pH, with additional reagent additions as required.
5. Record all additions and temperature changes.
6. After required test time, record the net pulp weight, filter and collect filtrate, record filtration properties (time, color, paper type, etc.), determine weight, specific gravity, pH and ORP.
7. Displacement water wash three times with 100 mL of water. In some embodiments, displacement washing may be done two to four times in water.
8. Collect the combined wash liquors, record filtration properties (time, color, paper type, etc.), determine weight, specific gravity, pH, and ORP.
9. Dry solids at 95° C. or lower until weight of solids is constant.
10. Submit samples for assay as per requirements.

Figure 36:
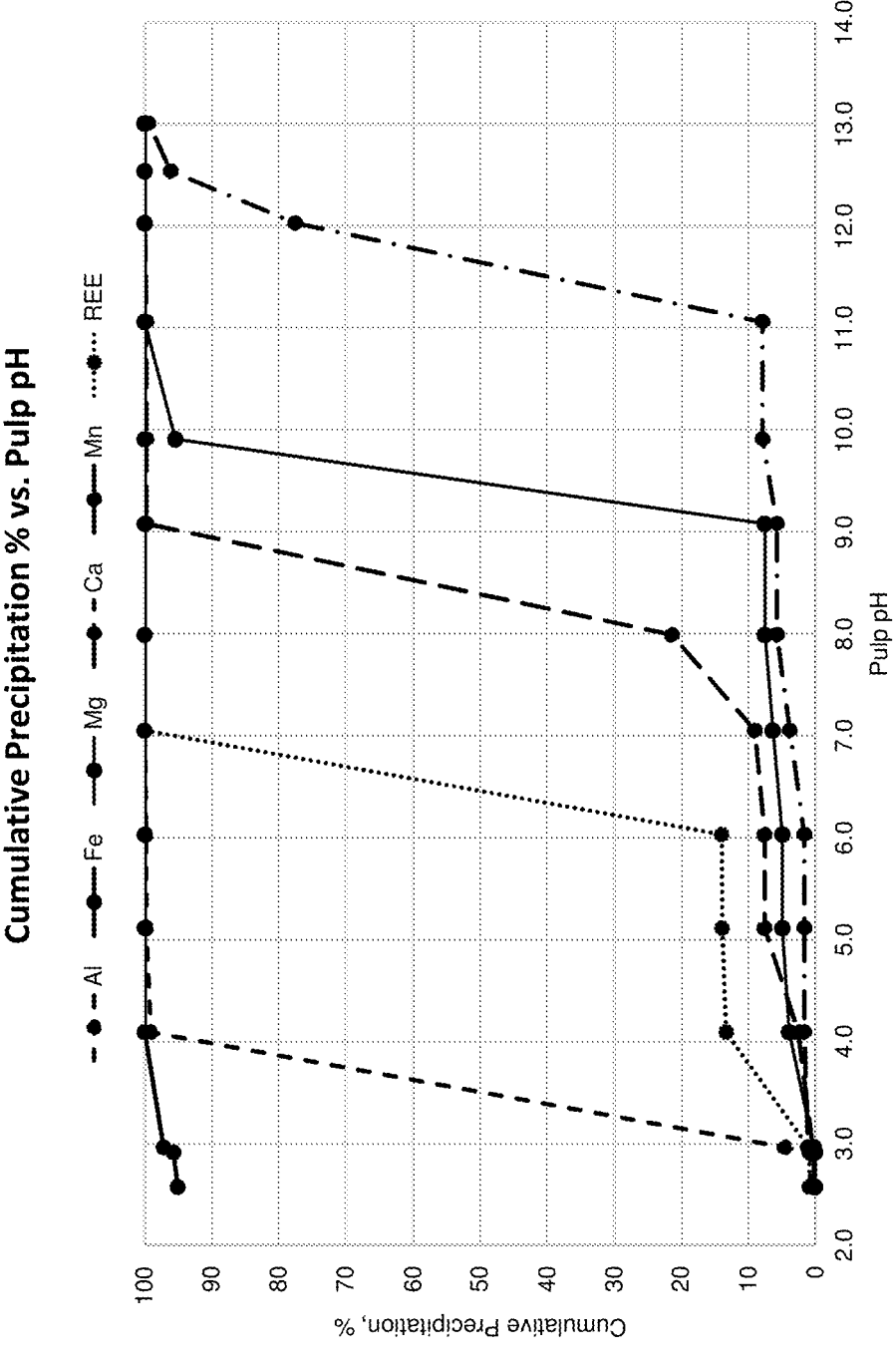
FIG. 36 is a chart depicting cumulative precipitation percent versus pulp pH for class C ash feedstock.
Figure 37:
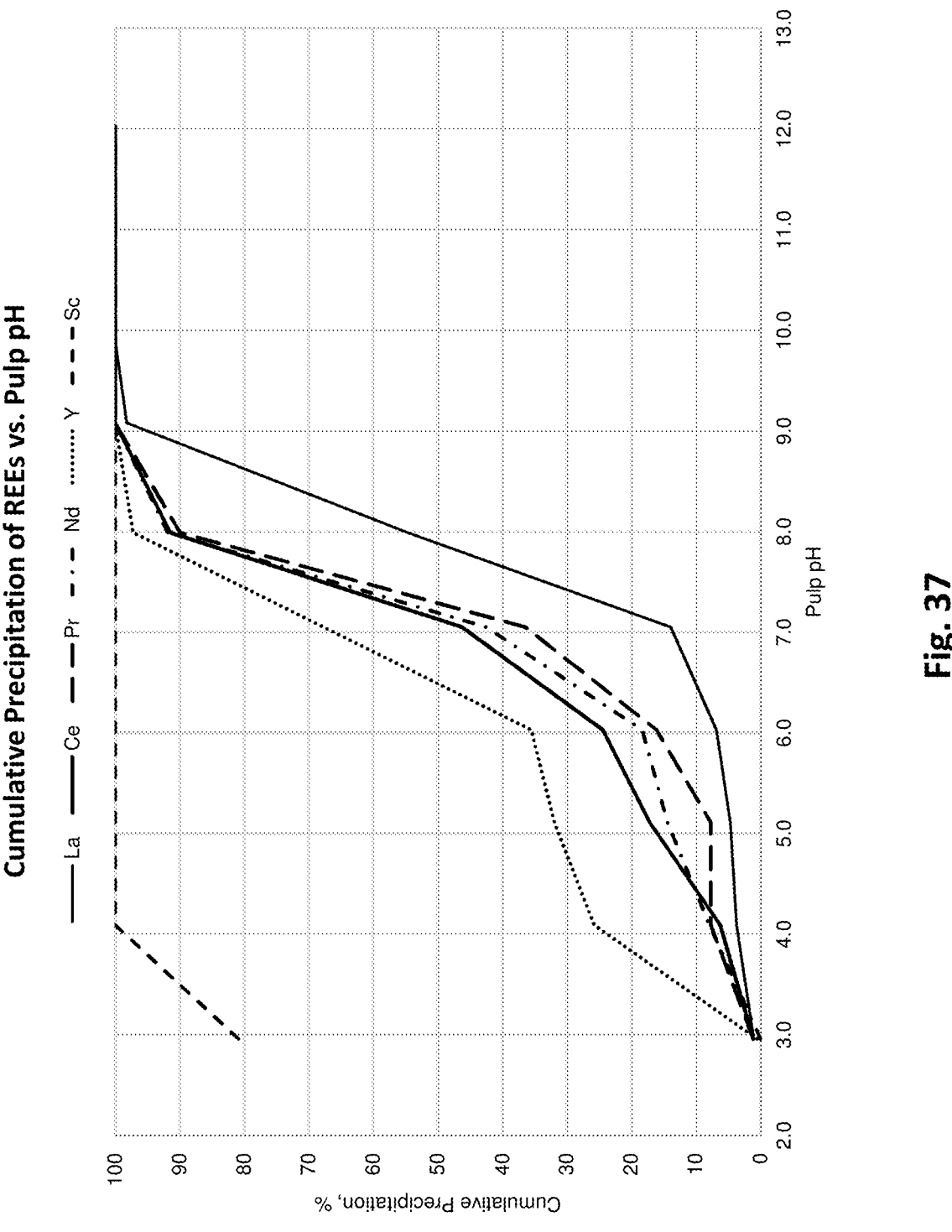
FIG. 37 is a chart depicting the cumulative precipitation of rare earth elements versus pulp pH for class C ash feedstock.

Precipitation testing identified target pHs (also referred to herein as pH cuts) at which one or more certain elements precipitated out of the leachate into the residue. FIG. 36 is a chart depicting cumulative precipitation percent versus pulp pH for class C ash. In some embodiments, after each pH cut, the liquor is filtered to separate a product and the filtrate is then subjected to the next pH condition. The precipitates for iron and aluminum are difficult to filter with simple vacuum filtration but that is facilitated by high speed centrifugation. Another approach is to seed the precipitation with 10-30% recycled product to produce more easily filterable solids (precipitate). Iron is best separated at pH 2.5 to 3 to minimize the amount of aluminum purities, and aluminum is then precipitated at pH 4. The precipitation of some of the rare earths is shown in FIG. 37. As can be seen, scandium precipitates with iron while most of the other REEs precipitate between pH 5 and pH 9. At pH 9, manganese may also be precipitated. Magnesium can be separated at pH 10.5-11 and calcium at pH 13. FIG. 38 is a table depicting the percent composition of precipitate hydroxides at different pHs resulting from precipitation testing.

The final liquor is a clean sodium chloride solution containing traces of strontium and barium when using sodium hydroxide as the base. It can be further purified by adding sodium carbonate and precipitating high value strontium and barium carbonates. At the end of this process, a marketable sodium chloride solution remains that can be marketed as a brine or dried to the salt. It should be noted that barium as the sulfate is mostly insoluble in the lixiviant so most of it is in the residue.

Figure 39:
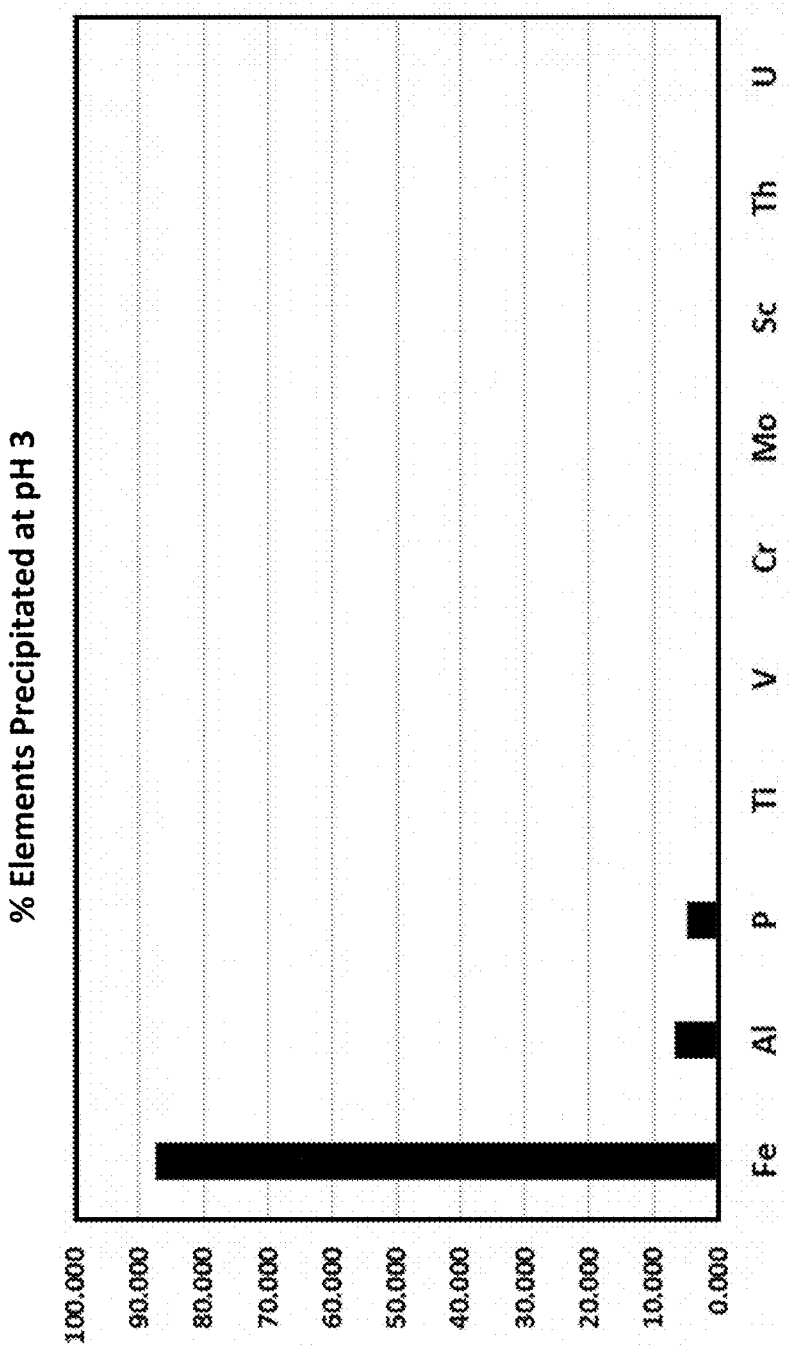
FIG. 39 is a chart depicting percent elements precipitated at pH 3 for class C ash feedstock.
Figure 40:
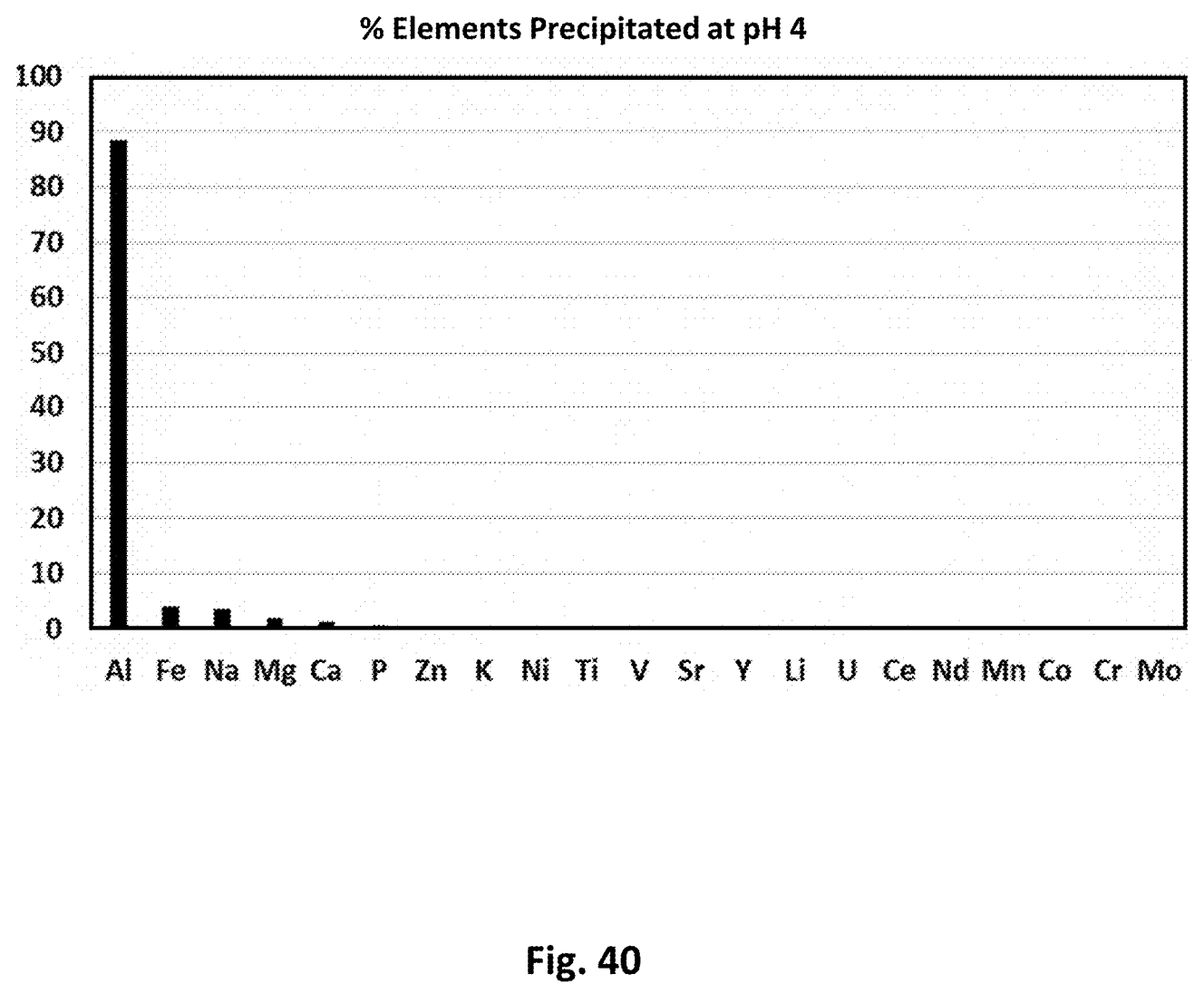
Figure 41:
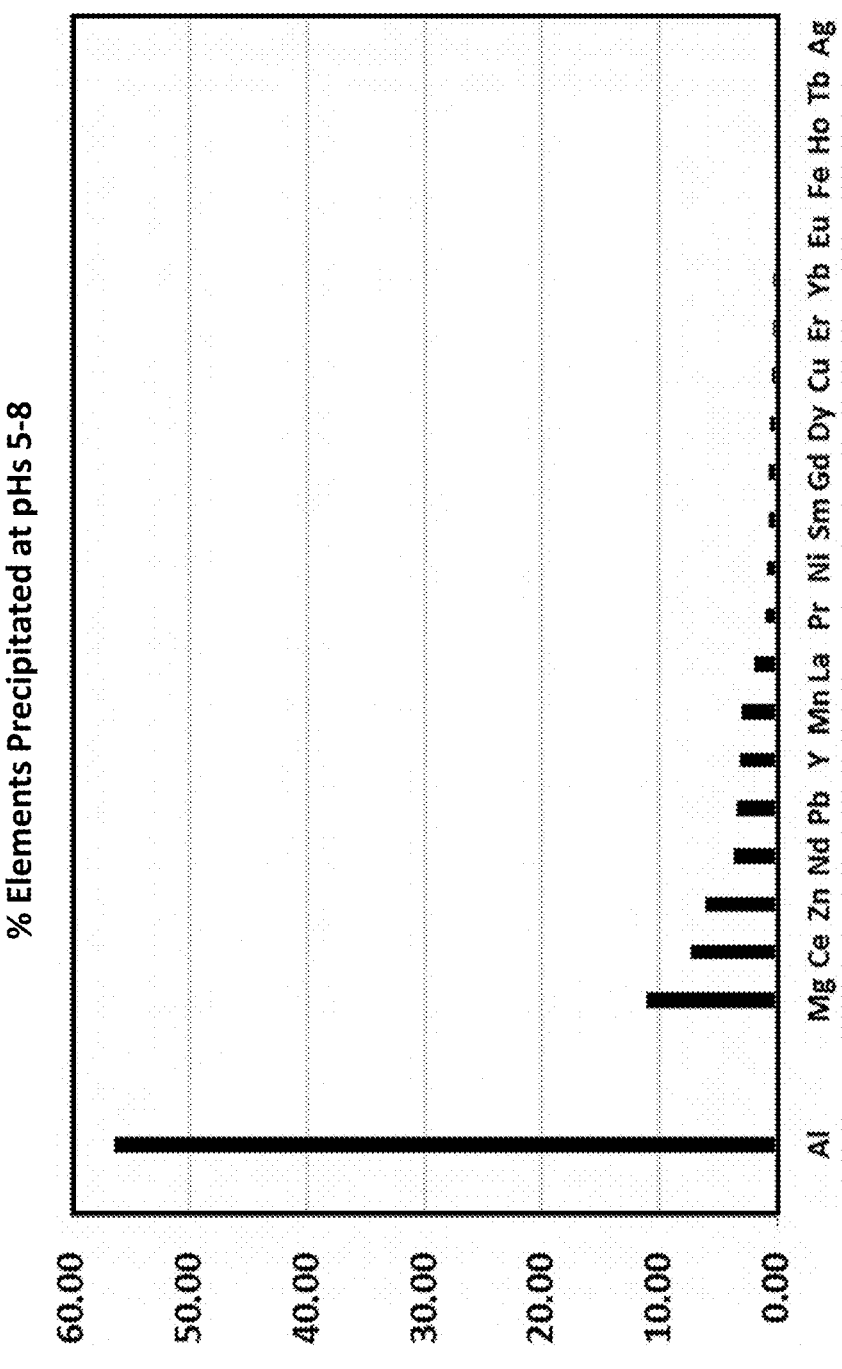
FIG. 41 is a chart depicting percent elements precipitated at pH 5-8 for class C ash feedstock.
Figure 42:
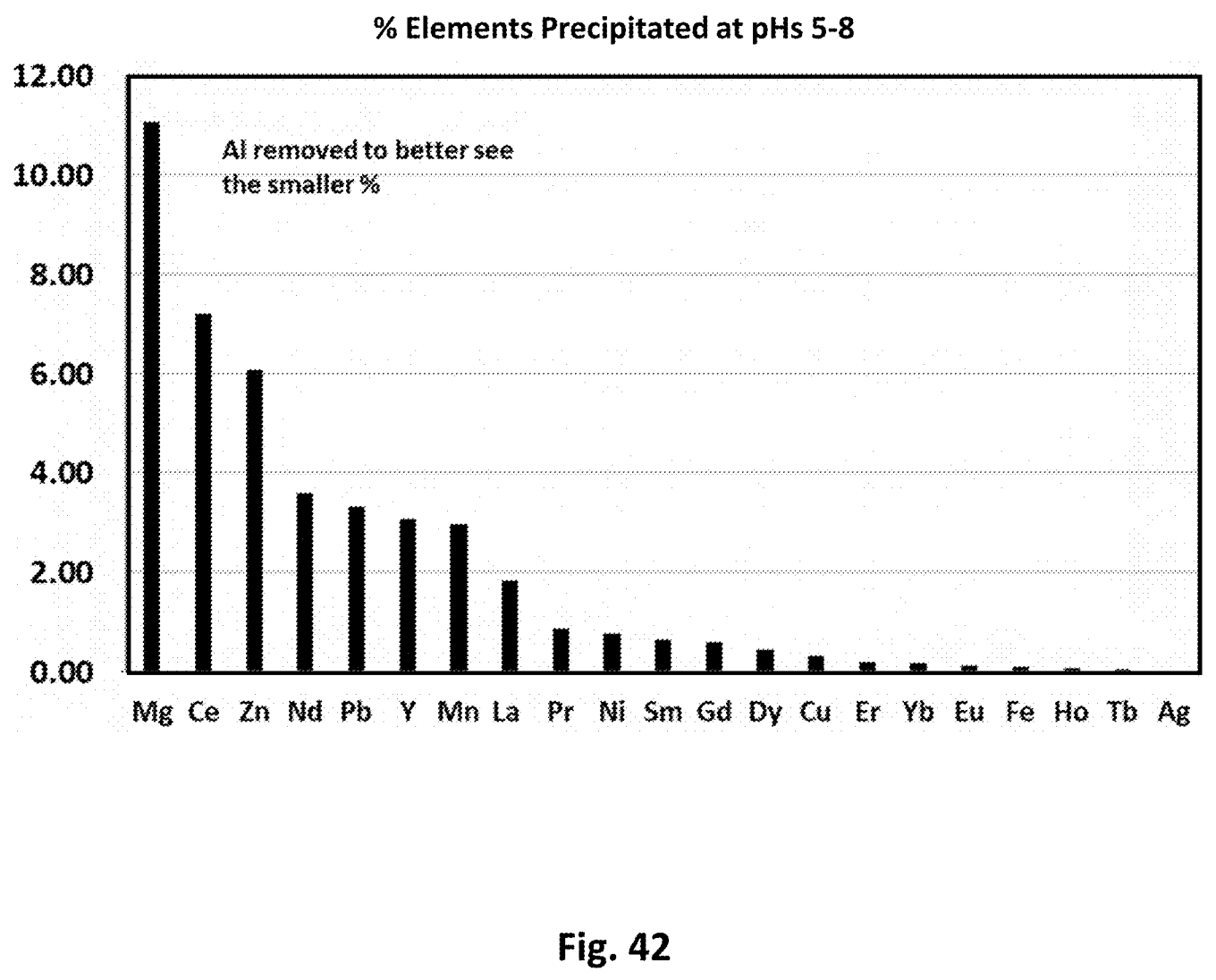
Figure 43:
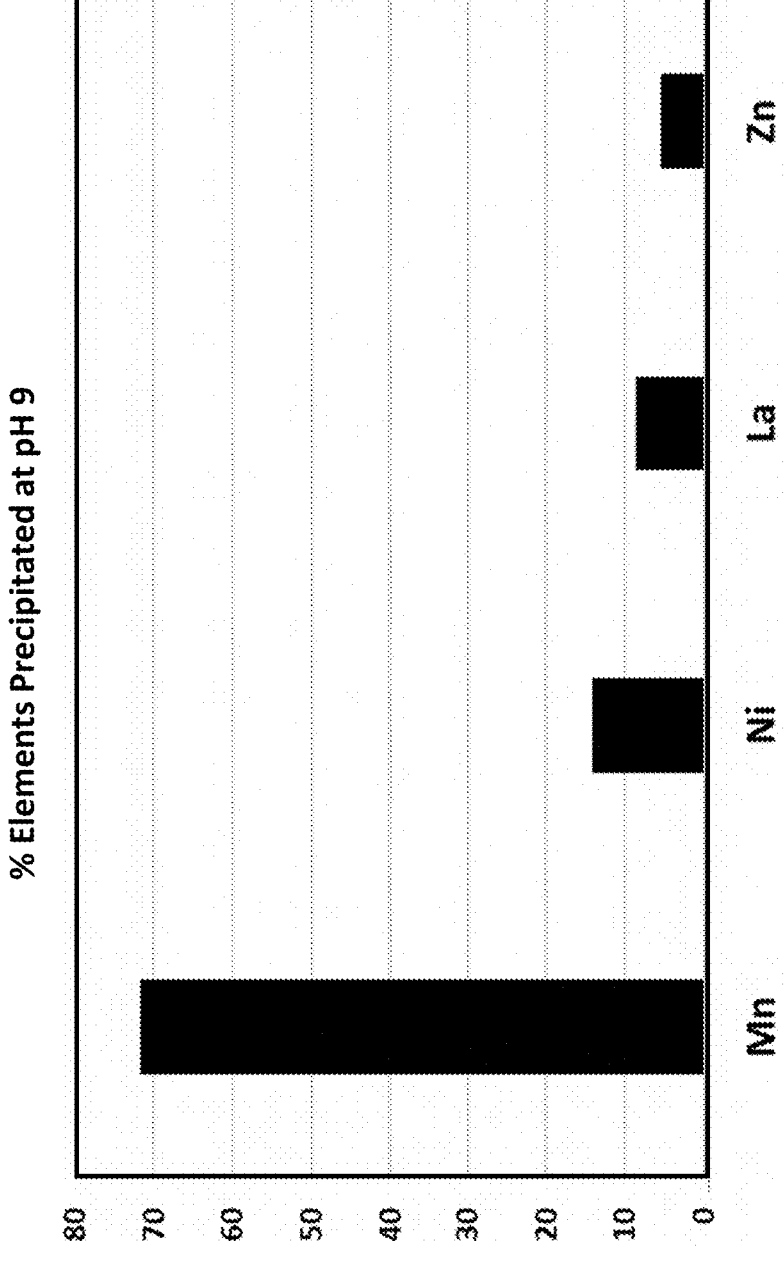
FIG. 43 is a chart depicting percent elements precipitated at pH 9 for class C ash feedstock.
Figure 44:
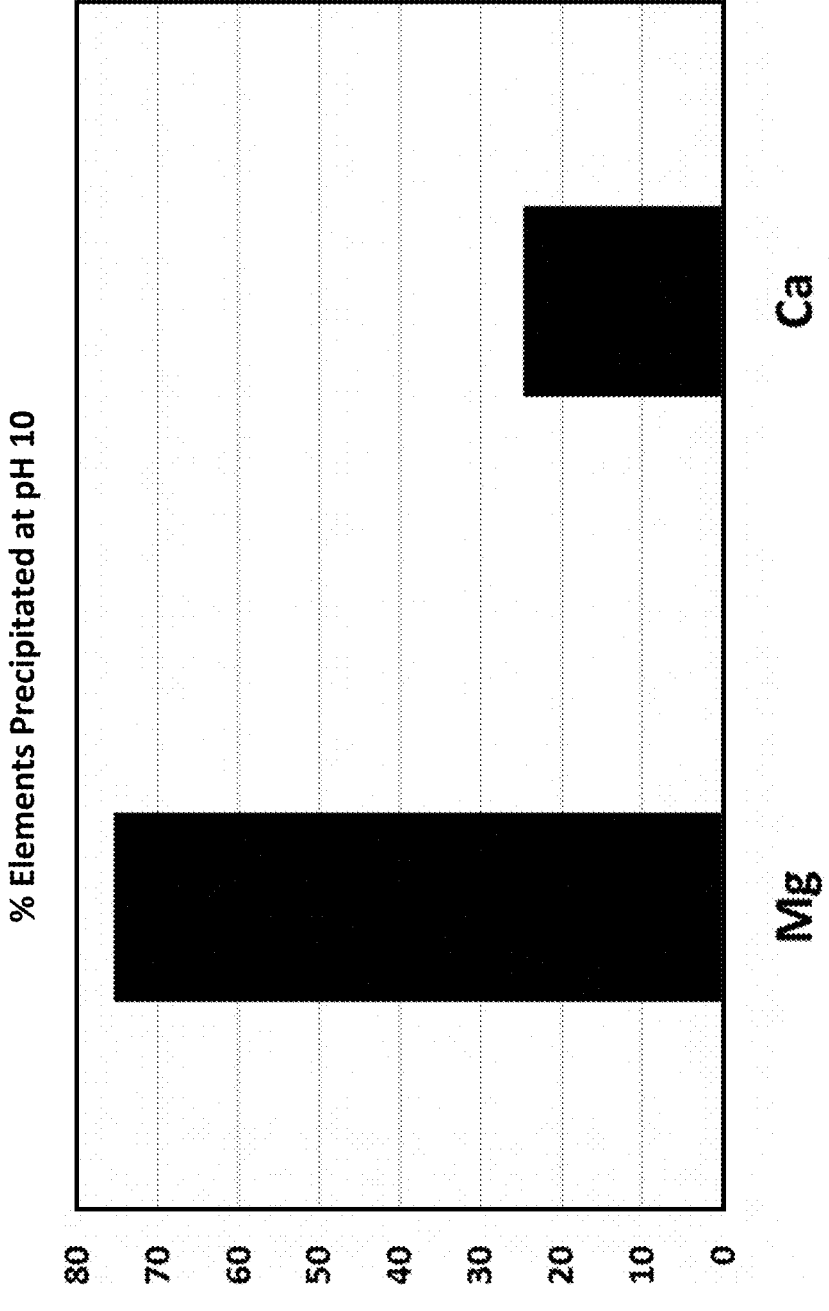
FIG. 44 is a chart depicting percent elements precipitated at pH 10 for class C ash feedstock.
Figure 45:
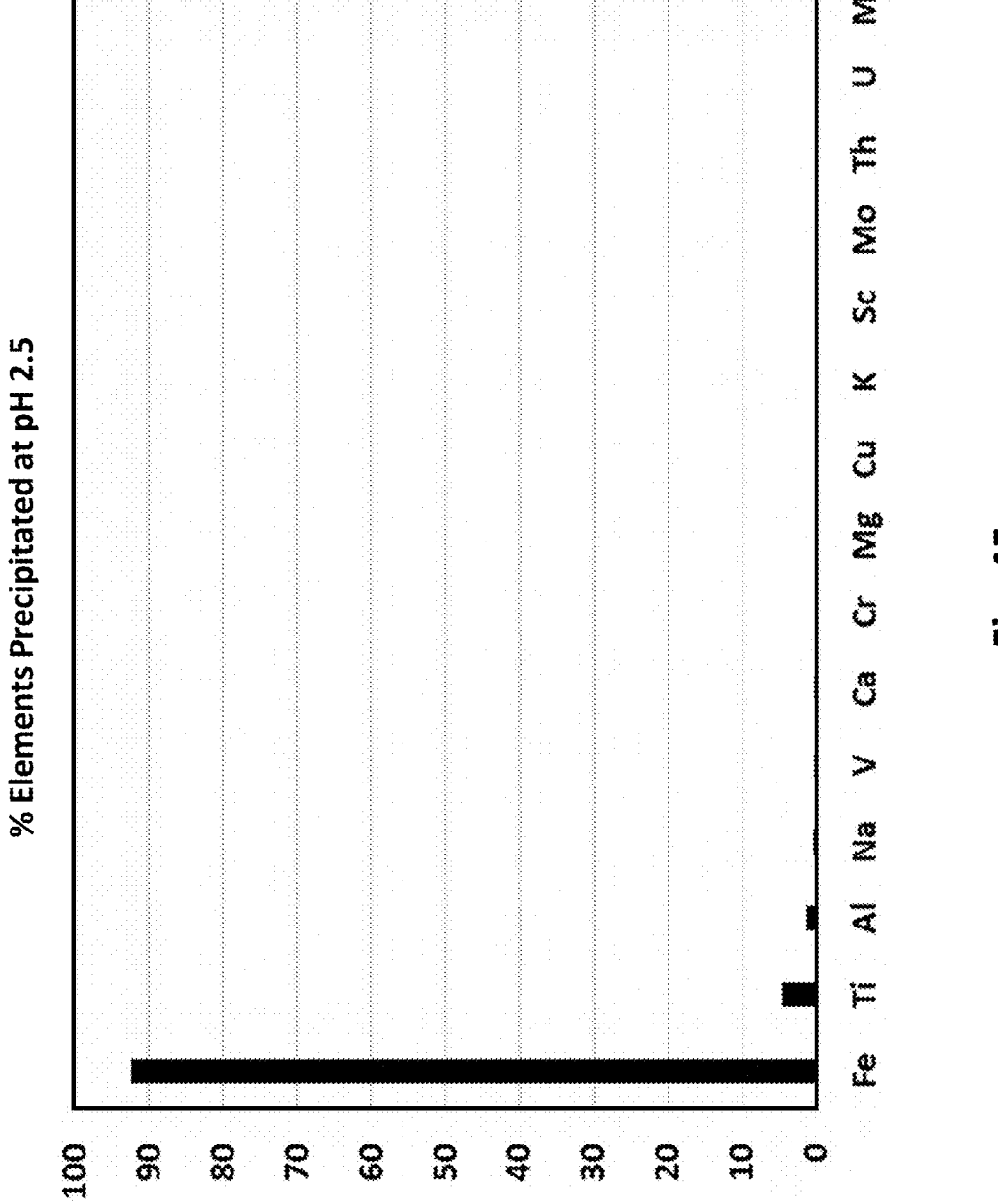
FIG. 45 is a chart depicting percent elements precipitated at pH 2.5 for class C ash feedstock.

FIGS. 39 through 45 depict the percent elements precipitated at each pH cut for class C ash feedstock. FIG. 39 depicts percent elements precipitated at pH 3. FIG. 40 depicts percent elements precipitated at pH 4. FIG. 41 depicts percent elements precipitated at pH 5-8. FIG. 42 depicts percent elements precipitated at pH 5-8 with aluminum removed to show the smaller percentages more clearly. FIG. 43 depicts percent elements precipitated at pH 9. FIG. 44 depicts percent element precipitated at pH 10. FIG. 45 depicts percent elements precipitated at pH 2.5. The iron purity shown precipitated at pH 3 can be improved to 92.5% by carrying out the precipitation at pH 2.5.

The percent element precipitated at pH 13 is >99% calcium. The remaining liquor is not a waste stream but a sodium chloride solution containing traces of strontium and barium. These can be precipitated with sodium carbonate to isolate high value products. The concentrations are 151 ppm strontium and 2 ppm barium. Since the solution is at pH 13, the excess hydroxide must be neutralized with HCl to pH 7 for the final product. The final product waste composition of the sodium chloride is shown in FIG. 46.

This final sodium chloride product is an important aspect of this disclosure which processes ash with minimal waste which differentiates it from previous attempts to separate products from CCP. For every 1 ton of ash feedstock this flowsheet generates 0.8 tons of NaCl. There is a market for this product as a solution or as a dried solid.

Figure 47:
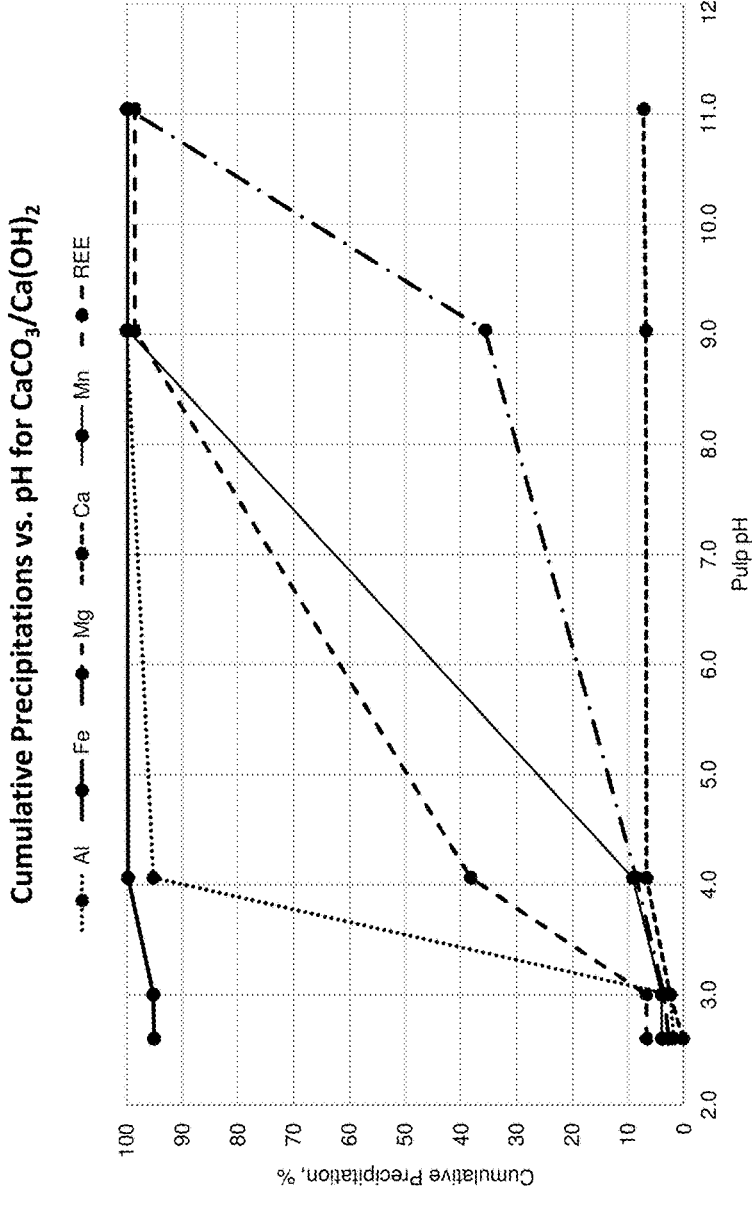
FIG. 47 is a chart depicting cumulative precipitations versus pH for calcium carbonate and calcium hydroxide for class C ash feedstock.

An alternative process embodiment is the use of calcium carbonate ($CaCO_3$) and calcium hydroxide ($Ca(OH)_2$) for the precipitation. Calcium carbonate can be used at the lower pHs up to pH 1 but then $Ca(OH)_2$ is used exclusively after that through the precipitation steps in the ash conversion process. FIG. 47 shows the precipitation as a function of pH for this reagent. FIG. 48 shows the elemental composition of all the precipitated products from $Ca(OH)_2$ precipitation testing.

In some embodiments of the caustic flowsheet, the final calcium precipitation is not performed, and the final product is a sodium chloride/calcium chloride blend.

Product Enhancement

Silica

In some embodiments, the residue after the leach process 1811 (FIGS. 18 and 20) is silica which may comprise up to 20% impurities comprising primarily aluminum and carbon and occasionally barium in the test examples. In some embodiments, impurities may be removed by at least one of calcining, caustic fusion and filtration. Carbon impurities, for instance, may be removed by calcining at 600° C. or higher.

In preliminary testing, two methods of caustic fusion were found to be successful: the first was a 300° C. fusion with caustic while the other was a dissolution in 8M NaOH at 90° C. The first method dissolved 68% of the residue while the second yielded 62%. However, the 8M NaOH dissolved less aluminum than the caustic fusion process. The dissolution of the silica residue can be greatly increased using higher temperatures closer to 1000° C. up to 1200° C. Caustic may be sodium or potassium hydroxide.

The reactions are shown below:

$$2NaOH + SiO_2 \rightarrow Na_2SiO_3 + H_2O \tag{2}$$

$$Al_2SiO_5 + 4NaOH \rightarrow 2NaAlO_2 + Na_2SiO_3 + 2H_2O \tag{3}$$

The sodium silicate formed from the fusion is dissolved in water and the mixture filtered to remove any insoluble impurities. In some embodiments, the solids may be recycled back to the front end of the process or to acid leaching (FIGS. 18 and 20, leach tank 1810).

In some embodiments, the filtrate is treated with HCl to drop the pH to at least 1 and precipitate silicic acid ($H_4SiO_4$). In some embodiments, the silicic acid may be filtered and then calcined, or spray dried then calcined, to convert it a high purity (greater than 99%), high value amorphous silica powder. In some embodiments, the silica powder has a BET-N2 surface area of greater than 160 $m^2$/g which has numerous applications as an additive in tires, elastomers, plastics, and rubber products.

$$H_4SiO_4 \text{ thermal decomposition to } SiO_2 + 2H_2O \tag{4}$$

In preliminary testing, a purity of 95.4% was obtained with the fusion product. In some embodiments, the filtrate is an acidic solution of sodium chloride containing some elements such as aluminum and may be recycled back to the precipitation start of the process (FIGS. 18 and 20, pH adjustment tank 1820).

Another option is to add sodium hydroxide to pH 4 and precipitate aluminum hydroxide. The hydroxide is then calcined to the oxide product. The remaining liquor is sodium chloride product as in the caustic and lime flowsheets the (FIGS. 19 and 21).

Example Process Embodiments for Silica Processing

Figure 49:
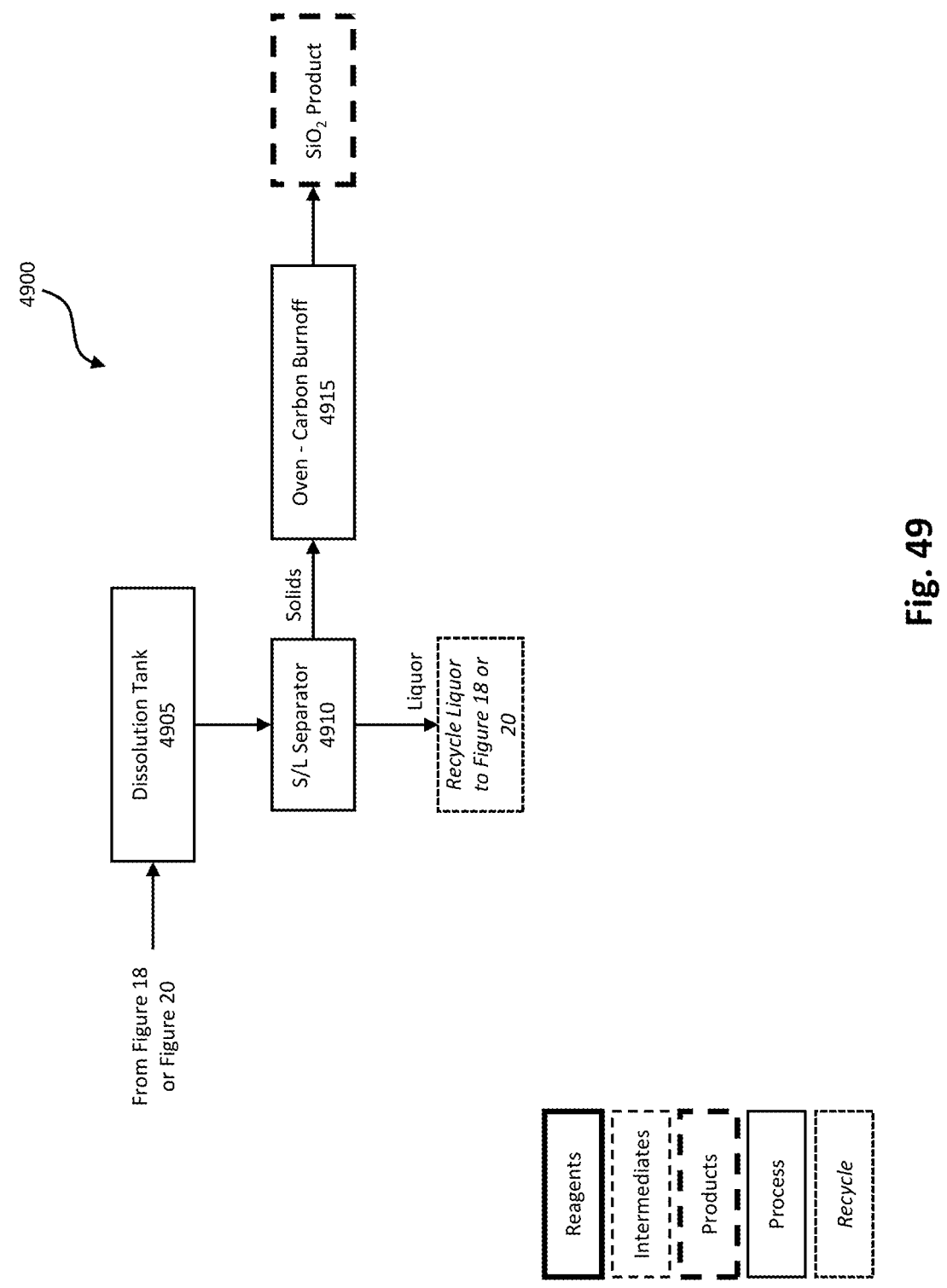
FIG. 49 depicts an optional process embodiment for refining a silica product.
Figure 50:
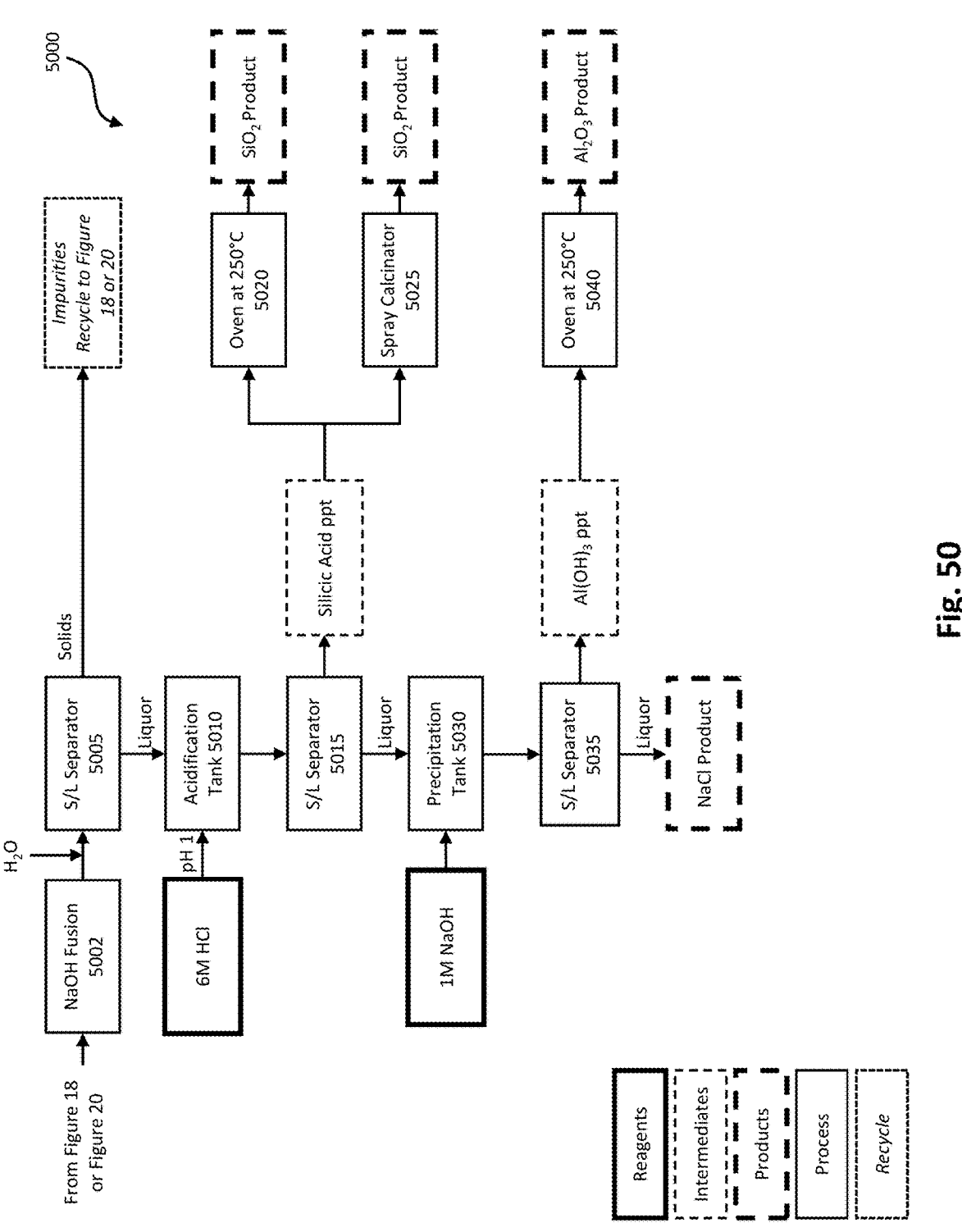
FIG. 50 depicts another optional process embodiment for refining a silica product.

FIGS. 49 and 50 depict two options for further processing of a silica product as optional continuations of FIGS. 18 and 20. FIG. 49 depicts an acid dissolution process 4900 and FIG. 50 depicts a sodium hydroxide fusion process 5000. In FIG. 49, residue silica and silicates from solid/liquid separation 1815 (FIGS. 18 and 20) proceed to dissolution tank 4905. In some embodiments, 30% hydrochloric acid (HCl) is applied for 24 hours in dissolution tank 4905. Following acid dissolution in dissolution tank 4905, the liquor proceeds to solid/liquid separator 4910 resulting in solids and a liquor. In embodiments where the solids comprise carbon, the solids proceed to an oven 4915 for carbon burnoff. In some embodiments, the solids are heated in oven 4915 for 6 hours at a minimum of 600° C. resulting in a purified silica ($SiO_2$) product. The liquor from solid/liquid separator 4910 may be recycled to the pH adjustment tank 1820 (FIGS. 18 and 20).

In FIG. 50, residue silica and silicates from solid/liquid separation 1815 (FIGS. 18 and 20) proceed to sodium hydroxide (NaOH) fusion 5002 (at 300° C. in some embodiments). Potassium hydroxide may be used instead of NaOH, in some embodiments. Water is added to the fused material and the liquor proceeds to solid/liquid separation 5005. Solids may optionally proceed to the leach tank 1810 (FIGS. 18 and 20) to recycle impurities, where impurities are dependent on the composition of the feedstock. The filtrate proceeds to acidification tank 5010 where acid, 6M HCl in the depicted embodiment, is added to reduce the pH to pH 1. The pH adjusted liquor proceeds to solid/liquid separation 5015. The solids are primarily silicic acid ($H_4SiO_4$) precipitate which may proceed to at least one of oven 5020, at 250° C. in the depicted embodiment, and spray calcination 5025 resulting in a high purity (greater than 99%) amorphous $SiO_2$ product. The $SiO_2$ product may be powdered, in some embodiments. Spray drying may preserve the small, submicron in some embodiments, particle size and prevent agglomeration. The liquor proceeds to precipitation tank 5030. In the depicted embodiment, 1M NaOH is added to the precipitation tank 5030 to raise pH above 7. The liquor proceeds to solid/liquid separation 5035. The solids are primarily aluminum hydroxide ($Al(OH)_3$) which may be marketed as-is or calcined in oven 5040, at 250° C. in the depicted embodiment, resulting in an alumina ($Al_2O_3$) product. The final liquor is sodium chloride (NaCl) which can be marketed as a product.

Material transfer between processes/equipment may be carried out with the use of pumps, etc.

Iron and Aluminum

Iron hydroxide is first precipitated together with scandium and other heavy elements. Aluminum hydroxide is precipitated next with some iron impurity and other minor elements. In some embodiments, the iron hydroxide and the aluminum hydroxide are both around 90% pure but are contaminated with a small amount of the other product. These products may be further purified by first dissolving them in excess NaOH at 90° C. The aluminum hydroxide dissolves to form a soluble aluminate which can then be separated from the iron hydroxide. After the solid-liquid separation, the aluminum can be reprecipitated by adding acid to get back to the insoluble hydroxide.

Manganese

In some embodiments, minor levels of manganese (0.02-0.03%) may be separately precipitated in either the caustic or the lime flowsheets at a pH of 9. The major impurity is magnesium.

Barium and Strontium

In some embodiment of the caustic flowsheet, after the calcium is precipitated as calcium hydroxide, sodium carbonate can be added to separate barium and strontium carbonates before the final liquor is neutralized to yield sodium chloride.

REEs and Transition Metals

In some embodiments, rare earth elements (REEs) and transition metals may be separated from each other using ion exchange, solvent extraction, adsorption, or a combination thereof. In some embodiments, the process may concentrate REEs and transition metals (also referred to as mischmetals) from 20 to 100-fold. Mischmetals are mixed metal alloys of rare-earth elements. Cerium mischmetal is a cerium rich misch and rare-earth mischmetal is rare earth rich. In some embodiments, rare-earth mischmetal comprises at least one of cerium, lanthanum, and neodymium. A typical composition includes approximately 55% cerium, 25% lanthanum, and 15-18% neodymium with other rare earth metals following. The mischmetals may be marketed as is to vendors specializing in separating these products or treated as a separate process.

Chlor-Alkali

A synergy exists between the process depicted in FIGS. 18 through 20 and a chlor-alkali plant. The sodium chloride product from FIGS. 19 and/or 21 could be used as feed to a chlor-alkali plant, and a discounted supply of hydrochloric acid could be used in one or more leaching steps and caustic used either directly, or with the addition of a carbon dioxide stream, as sodium carbonate.

Embodiment A

Some embodiments use the well-established technology of a chlor-alkali plant to convert sodium chloride rich final product from FIGS. 19 and/or 21 to sodium hydroxide, hydrogen, and chlorine. Hydrogen and chlorine are then combined to produce HCl gas which is then dissolved in water to produce hydrochloric acid. By recycling the sodium chloride final process stream to replenish the starting reagent materials, hydrochloric acid and sodium hydroxide, a significant savings is achieved at the cost of capital investment in a chlor-alkali plant. In some embodiments, hydrochloric acid is used as the leaching agent in FIGS. 18 and/or 20 and sodium hydroxide can be used directly in the caustic flowsheet embodiment 1800b (FIGS. 20 and 21) or converted to sodium carbonate by bubbling $CO_2$ (exhaust gas from a fossil fuel power plant, in some embodiments) into sodium hydroxide to be used as a reagent to precipitate a $CaCO_3$ product in the lime flowsheet embodiment 1800a (FIGS. 18 and 19). In some embodiments, the $CaCO_3$ product is high purity (>99%).

Embodiment B

Some embodiments use a side stream from a fossil fuel plant gaseous discharge containing carbon dioxide ($CO_2$) to use directly in the process thereby saving a significant reagent cost in purchased $CO_2$ gas and at the same time achieving an environmental benefit by capturing a greenhouse gas into commercial products (carbonates).

One of the reactions used to capture the $CO_2$ is by absorbing it in sodium hydroxide from the chlor-alkali plant to form sodium carbonate, which is used as a process reagent, in some embodiments. The acid-base reaction is rapid and one of the ways the reaction can be monitored is by tracking the pH from the higher sodium hydroxide value to the lower sodium carbonate value, in some embodiments. This conversion can be done in a batch mode or a continuous mode through pipes with one or more $CO_2$ entry points to react with the caustic to quantitatively produce sodium carbonate and save the cost of another purchased reagent.

In some embodiments, $CO_2$ may be provided from other processes, plants, or sources. In some embodiments, naturally occurring or stored $CO_2$ may be pumped from underground formations. Any use of carbon dioxide could be beneficially used for carbon sequestration from a slip stream off of a coal power plant exhaust.

Process Control

In some embodiments, one or more processors may be used to control and manage one more aspects of the systems and methods disclosed herein.

Disclosed herein are systems and methods for processing a metal-bearing waste streams. In some embodiments, the feedstock is a powder that comprises metal-bearing components and sulfur components. The feedstock may be loaded into a first reactor to begin processing. In some embodiments, a processor is configured to operate a processing sequence comprising at least one of a dissolution process and a precipitation process wherein the dissolution process and/or precipitation process take place in one or more reactors. The processor may be configured to perform one or more of the following steps: using a first dissolution process, wherein the first dissolution process comprises using a leach process performed by at least one of contacting, passing, and percolating an acid through the powder feedstock and collecting a leachate formed in a second reactor; responsive to collecting the leachate, use a sequential selective precipitation process at a predetermined pH to sequentially precipitate components, wherein a first predetermined pH is used to precipitate a first component from the leachate; responsive to precipitating the first component, separate by filtration the first component, and collect the first filtrate in at least one of the second reactor and a third reactor; responsive to collecting the first filtrate, use a base component to adjust the first filtrate to a second predetermined pH; using the sequential precipitation process at the second predetermined pH, precipitate a second component, separate by filtration the second component and generate a second filtrate; and using the sequential precipitation process to separate additional components based on the predetermined pHs of the component of interest. The steps may be performed in orders other than the order presented herein and additional or fewer steps may be performed. In some embodiments, the processor is configured to use to use a predetermined pH to separate components from the leachate based on predetermined logic.

Non-Transitory Computer Readable Medium

The systems and methods described above can use dedicated processor systems, micro controllers, programmable logic devices, or microprocessors that perform some or all of the communication operations. Some of the operations described above may be implemented in software and other operations may be implemented in hardware.

The systems and methods described above can use dedicated processor systems, micro controllers, programmable logic devices, or microprocessors that perform some or all of the communication operations. Some of the operations described above may be implemented in software and other operations may be implemented in hardware.

The various operations of methods described above may be performed by any suitable means capable of performing the operations, such as various hardware and/or software component(s), circuits, and/or module(s).

The various illustrative logical blocks, modules, and circuits described in connection with the present disclosure may be implemented or performed with a hardware processor, a digital signal processor (DSP), an application specific integrated circuit (ASIC), a field programmable gate array signal (FPGA) or other programmable logic device (PLD), discrete gate or transistor logic, discrete hardware components, or combinations thereof designed to perform the functions described herein. A hardware processor may be a microprocessor, commercially available processor, controller, microcontroller, or state machine. A processor may also be implemented as a combination of two computing components, e.g., a combination of a DSP and a microprocessor, a plurality of microprocessors, one or more microprocessors in conjunction with a DSP core, or any other such configuration.

In one or more aspects, the functions described may be implemented in software, firmware, or any combination thereof executing on a hardware processor. If implemented in software, the functions may be stored as one or more executable instructions or code on a non-transitory computer-readable storage medium. A computer-readable storage media may be any available media that can be accessed by a processor. By way of example, and not limitation, such computer-readable storage media can comprise RAM, ROM, EEPROM, CD-ROM or other optical disk storage, magnetic disk storage or other magnetic storage devices, or any other medium that can be used to store executable instructions or other program code or data structures and that can be accessed by a processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. Processes or steps described in one implementation can be suitably combined with steps of other described implementations.

Certain aspects of the present disclosure may comprise a computer program product for performing the operations presented herein. For example, such a computer program product may comprise a computer readable storage medium having instructions stored (and/or encoded) thereon, the instructions being executable by one or more processors to perform the operations described herein.

Software or instructions may be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a terminal and/or base station can obtain the various methods upon coupling or providing the storage means to the device.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

To facilitate the understanding of the embodiments described herein, a number of terms are defined below. The terms defined herein have meanings as commonly understood by a person of ordinary skill in the relevant art. Terms such as "a," "an," and "the" are not intended to refer to only a singular entity, but rather include the general class of which a specific example may be used for illustration. The terminology herein is used to describe specific embodiments, but their usage does not delimit the disclosure, except as set forth in the claims.

Batch Process: A batch process operates in separate discrete operations that are connected in a stepwise fashion with the materials processed being fed in batches.

Catalyst: A catalyst is an agent that can either accelerate or decelerate a chemical reaction without reacting with the reactants or products.

Continuous Process: A continuous process is designed to operate without interruptions. The materials being processed, either bulk dry or fluids, are continuously in motion undergoing chemical reactions or subject to mechanical or heat treatment.

Rare Earth Elements (REEs): REEs are any of a group of chemically similar metallic elements comprising the lanthanide series and (usually) scandium and yttrium.

Transition Elements: Transition elements are any of the set of metallic elements occupying a central block (Groups IVB-VIII, IB, and IIB, or 4-12) in the periodic table, e.g., manganese, chromium, and copper.

Having described and illustrated the principles of the systems, methods, processes, and/or apparatuses disclosed herein in a preferred embodiment thereof, it should be apparent that the systems, methods, processes, and/or apparatuses may be modified in arrangement and detail without departing from such principles. Claim is made to all modifications and variation coming within the spirit and scope of the following claims.

What is claimed is:

1. A method for processing a waste stream, the method comprising:

configuring a processor to operate a process comprising:

loading a first powder feedstock into a first reactor, wherein the first powder feedstock comprises a calcium sulfate component;

introducing an ammonium carbonate reagent to the first reactor to produce ammonium sulfate and calcium carbonate in a reaction slurry;

pumping the reaction slurry to a second reactor when a reaction to produce ammonium sulfate and calcium carbonate is complete thereby forming a reacted slurry;

filtering the reacted slurry resulting in a calcium carbonate residue and ammonium sulfate filtrate liquor;

loading a second powder feedstock into a third reactor, wherein the second powder feedstock comprises a metal-bearing component, a silica component, and an aluminosilicate component;

leaching the second powder feedstock by at least one of contacting, passing, and percolating an acid and hydrogen peroxide through the second powder feedstock and collecting a metal-bearing leachate formed in the third reactor, wherein after collecting the metal bearing leachate, the third reactor comprises dried solids comprising silicates;

responsive to collecting the metal-bearing leachate, adjusting a pH value of the metal-bearing leachate to a first predetermined pH value to precipitate a first component from the metal-bearing leachate, wherein the first predetermined pH value is 4, and wherein the first component comprises iron and aluminum;

responsive to precipitating the first component, separating by filtration the first component, and collecting a first filtrate in a fourth reactor; and responsive to collecting the first filtrate, adjusting the first filtrate to a second predetermined pH value to precipitate a second component from the first filtrate, separating by filtration the second component to result in a second filtrate, and collecting the second filtrate in a fifth reactor.

2. The method of claim 1, wherein the processor uses the predetermined pH values to separate the components based on predetermined logic.

3. The method of claim 1, wherein leaching the second powder feedstock is performed in one or more stages.

4. The method of claim 1, wherein the acid comprises sulfuric acid, nitric acid, hydrochloric acid, or any combination thereof.

5. The method of claim 1, further comprising adjusting the first filtrate to the second predetermined pH value using a base component that is at least one of calcium hydroxide, sodium hydroxide, potassium hydroxide, and ammonium hydroxide.

6. The method of claim 1, wherein the first component and the second component are hydroxides of at least one of iron, aluminum, and a mischmetal, wherein the mischmetal is a mixed metal alloy of rare-earth elements.

7. The method of claim 1, wherein the first component or the second component includes a mischmetal, wherein the mischmetal is a mixed metal alloy of rare-earth elements and wherein the mischmetal is at least one of a cerium mischmetal and a rare-earth mischmetal, wherein the rare-earth mischmetal comprises at least one of cerium, lanthanum, scandium, and neodymium.

8. The method of claim 1, wherein the first component further comprises scandium or uranium.

9. The method of claim 1, wherein the process further comprises calcining the first component.

10. The method of claim 9, wherein the first component comprises iron in the form of ferric hydroxide, and wherein calcining the first component results in the formation of a ferric oxide product.

11. The method of claim 1, wherein the pH of the metal-bearing leachate is about 1.5.

* * * * *